United States Patent
Komatsuzaki et al.

(10) Patent No.: US 7,565,107 B2
(45) Date of Patent: Jul. 21, 2009

(54) COMMUNICATION SYSTEM, INFORMATION PROCESSING DEVICE, AND METHOD

(75) Inventors: Yoriko Komatsuzaki, Tokyo (JP); Makoto Sato, Tokyo (JP); Takuro Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 10/512,311

(22) PCT Filed: Apr. 7, 2003

(86) PCT No.: PCT/JP03/04384

§ 371 (c)(1),
(2), (4) Date: Oct. 22, 2004

(87) PCT Pub. No.: WO03/092222

PCT Pub. Date: Nov. 6, 2003

(65) Prior Publication Data
US 2005/0272371 A1    Dec. 8, 2005

(30) Foreign Application Priority Data
Apr. 25, 2002 (JP) ............................. 2002-123361
Sep. 17, 2002 (JP) ............................. 2002-269953

(51) Int. Cl.
*H04B 5/00* (2006.01)
(52) U.S. Cl. .................... 455/41.1; 455/41.2; 455/90.3; 455/550.1; 340/10.1; 340/10.3; 340/10.4
(58) Field of Classification Search ............... 455/41.1, 455/41.2, 90.3, 550.1; 340/10.1, 10.3, 10.4, 340/10.42, 10.51, 10.52
See application file for complete search history.

(56) References Cited

U.S. PATENT DOCUMENTS

| | | | |
|---|---|---|---|
| 6,876,295 B1* | 4/2005 | Lewis | 340/10.34 |
| 7,188,358 B1* | 3/2007 | Hisada et al. | 726/2 |
| 2002/0020743 A1 | 2/2002 | Sugukawa et al. | |
| 2003/0142990 A1* | 7/2003 | Weaver | 399/80 |

FOREIGN PATENT DOCUMENTS

| | | |
|---|---|---|
| EP | 1 102 454 | 5/2001 |
| EP | 1 182 833 | 2/2002 |
| JP | 2000-148637 | 5/2000 |
| JP | 2001-77878 | 3/2001 |
| JP | 2002-16988 | 1/2002 |
| JP | 2002-24109 | 1/2002 |
| JP | 2002-63652 | 2/2002 |
| WO | WO 01/01655 | 1/2001 |

\* cited by examiner

*Primary Examiner*—Tuan A Pham
(74) *Attorney, Agent, or Firm*—Finnegan, Henderson, Farabow, Garett & Dunner, L.L.P.

(57) ABSTRACT

The present invention relates to a communication system, an information processing apparatus and method which enable communication setting to be performed through easy operations. An access point 11 has communication setting information for allowing wireless communication to be performed between a terminal apparatus 13 and the access point 11. The communication setting information is supplied to a tag 12 through contactless communication at close range between an IC tag reader/writer 21 and the tag (IC card) 12 and stored therein. When the tag 12 is put over an IC tag reader/writer 31 of the terminal apparatus 13, the IC tag reader/writer 31 reads the communication setting information from the tag 12 and stores it. The terminal apparatus 13 performs setting for communicating with the access point 11 based on the stored communication setting information and then performs wireless communication with the access point 11.

34 Claims, 41 Drawing Sheets

FIG. 2

| NETWORK NAME | TEST AP |
|---|---|
| SSID | 0x123456 |
| WEP KEY | 0x1234567890 |
| COMMUNICATION NETWORK MODE | INFRASTRUCTURE |

FIG. 3

| ASSOCIATED URI | http://xxx.xxx |
|---|---|
| HOLDING PERMISSION | PERMITTED |
| SUPPLY PERMISSION | PERMITTED |
| COMMUNICATION VALIDITY TERM | 2002/05/06 |
| INFORMATION VALIDITY TERM | 2002/04/05 |
| INFORMATION UPDATE CONDITION | SAME EXCEPT WEP KEY |

FIG. 10

```
<infra>
 <title>TEST AP</title>
 <IEEE802.11a>
  <ssid>0x123456</ssid>
  <wepkey>0x1234567890</wepkey>
 <IEEE802.11a>
</infra>
```

FIG. 11

```
<title>TEST Management</title>
<Uri>http://www.wi-fi.org</uri>
<infra>COMMUNICATION GROUP FORMATION INFORMATION</infra>
<HOLDING PERMISSION>OK</HOLDING PERMISSION>
<SUPPLY PERMISSION>OK</SUPPLY PERMISSION>
<COMMUNICATION VALIDITY PERIOD>20020506</COMMUNICATION VALIDITY PERIOD>
<INFORMATION VALIDITY TERM>20020405</INFORMATION VALIDITY TERM>
<INFORMATION UPDATE PERIOD>SAME EXCEPT WEP</INFORMATION UPDATE PERIOD>
```

FIG. 28

```
<HOLDING PERMISSION>NG</HOLDING PERMISSION>
<SUPPLY PERMISSION>NG</SUPPLY PERMISSION>
<COMMUNICATION VALIDITY TERM>Unlimited</COMMUNICATION VALIDITY TERM>
<INFORMATION VALIDITY TERM>INVAL ID</INFORMATION VALIDITY TERM>
<INFORMATION UPDATE CONDITION>INVAL ID</INFORMATION UPDATE CONDITION>
```

FIG. 34

| NETWORK NAME | TEST AP |
|---|---|
| SSID | 0x123456 |
| WEP KEY | 0x1234567890 |
| COMMUNICATION NETWORK FORM | Infrastructure |
| HOLDING APPARATUS IP ADDRESS | 12.34.56.78 |

FIG. 35

```
<infra>
 <title>TEST AP</title>
 <IEEE802.11a>
   <ssid>0x123456</ssid>
   <wepkey>0x1234567890</webkey>
 </IEEE802.11a>
 <IPaddress>12.34.56.78</IPaddress>
</infra>
```

FIG. 39

```
<accessPoint>
    <title>local-net</title>
    <802.11b>
        <essid>0000</essid>
        <wepkey>sampl</wepkey>
    </802.11b>
</accessPoint>
```

FIG. 43

```
<localNetwork>
    <title>local-net</title>
    <802.11b>
        <essid>0000</essid>
        <wepkey>sampl</wepkey>
    </802.11b>
</localNetwork>
```

COMMUNICATION SYSTEM, INFORMATION PROCESSING DEVICE, AND METHOD

TECHNICAL FIELD

The present invention relates to a communication system, an information apparatus and method, and particularly, to a communication system, an information processing apparatus and method which enable communication setting to be performed through easy operations.

BACKGROUND ART

In recent years, as a wireless data communication technique, a wireless LAN (Local Area Network) system of IEEE (The Institute of Electrical and Electronics Engineers) 802.11 standard has been considered as useful. Since the wireless LAN of the IEEE 802.11 standard has no directivity and radially transmits wireless waves, connection among apparatuses can be made over a wide range.

The IEEE 802.11 standard includes the IEEE 802.11a scheme which uses a 5 GHz bandwidth and allows data transfer at the maximum speed of 54 Mbps and the IEEE 802.11b scheme which uses a 2.4 GHz bandwidth and allows data transfer at the maximum speed of 11 Mbps.

In a communication system with strong directivity like those according to the IrDA (InfraRed Data Association) and the like, it is necessary to appropriately oppose apparatuses to be connected to specify targets for which communication is established. In the wireless LAN of the IEEE 802.11 standard, however, such positional limitation is not required.

Connection patterns of the wireless LAN of the IEEE 802.11 standard include two types, that is, an Infrastructure mode (one-to-many communication) which is a network formation in which stations, for example general-purpose personal computers or the like, are connected to an access point serving as a relay, and an Ad hoc mode (one-to-one communication) which is a network formation among stations.

A range in which one access point can communicate with a station is referred to as a basic service area (hereinafter referred to also as a BSA). Since a station moves as a user moves, communication may become impossible when a station goes out of the basic service area. Thus, to allow wireless communication to be used even when the station moves to the outside of the basic service area of an access point, a roaming technique has been realized in which a plurality of access points interconnected to each other through a wired LAN (a distributed system) are provided and a station can be connected seamlessly to a new access point in an area to which the station moves.

A communication-enabling range extended by providing a plurality of access points in this manner is called an extended service area (ESA). In this case, a station may receive signals from a plurality of access points, but in such a case, performs communication with an access point from which a stronger signal is received.

Conventionally, however, in wireless communication using the wireless LAN of the IEEE 802.11 standard and the like, when a network is formed by access points, stations and the like, there has been a problem that a user must set information inherent in the network to be formed in all the stations to result in poor usability.

In addition, when a station performs communication with another station, if a plurality of stations is present in a search range of the station, the station can detect a plurality of other stations present in the search range. Thus, there has been a problem that a user may connect a station held by him to a station other than a desired station.

DISCLOSURE OF THE INVENTION

The present invention has been conceived in view of such situations, and it is an object thereof to enable communication setting between apparatuses to be performed easily and quickly.

A communication system according to the present invention is characterized in that a first information processing apparatus has a supply means for supplying communication setting information for establishing communication to a second information processing apparatus and a first communicating means for communicating with the second information processing apparatus, and the second information processing apparatus has an acquiring means for acquiring the communication setting information from the first information processing apparatus and a second communicating means for communication with the first information processing apparatus based on the communication setting information acquired by the acquiring means.

The first information processing apparatus of the present invention is characterized by having a supply means for supplying communication setting information for establishing communication to a first other information processing apparatus and a first communicating means for communicating with the first other information processing apparatus.

The first communicating means can be formed to wirelessly communicate with the first other information processing apparatus.

It is possible that a storage means is further provided for storing the communication setting information and the supply means is formed to read the communication setting information stored by the storage means and supplies it to the first other information processing apparatus.

The supply means can be formed to have a recording means for recording the communication setting information in a record medium and the first other information processing apparatus reading the communication setting information from the record medium and use it.

The record medium can be a portable card.

The recording means can be formed to record the communication setting information on the record medium through contactless communication.

The recording means can be formed to record the communication setting information on the record medium through contact communication.

The supply means can have a second communicating means for performing contactless wireless communication with the first other information processing apparatus, and the second communication means can be formed to supply the communication setting information to the first other information processing apparatus through the contactless wireless communication.

The supply means can have a second communicating means for performing infrared communication with the first other information processing apparatus, and the second communication means can be formed to supply the communication setting information to the first other information processing apparatus through the infrared communication.

The communication setting information can be formed to include information indicating whether or not the first other information processing apparatus which has acquired the communication setting information can supply the communication setting information to a second another information processing apparatus different from the first other information processing apparatus.

The communication setting information can be formed to include information indicating whether or not the first other information processing apparatus which has acquired the communication setting information can hold the communication setting information.

The communication setting information can be formed to include information on an information validity term for limiting the period in which the first other information processing apparatus which has acquired the communication setting information is permitted to hold the communication setting information.

The communication setting information can be formed to include information on a communication validity term for limiting the period in which the first other information processing apparatus which has acquired the communication setting information is permitted to perform the communication.

The communication setting information can be formed to include information on whether or not the already acquired communication setting information is updated to newly acquired communication setting information when the first other information processing apparatus which has acquired the communication setting information newly acquired the communication setting information.

The communication setting information can be formed to include an IP address of a second other information processing apparatus different from the first other information processing apparatus which has acquired the communication setting information for allowing the first other information processing apparatus to perform communication with the second other information processing apparatus through the information processing apparatus.

The first communicating means can be formed to connect the first other information processing apparatus to the Internet.

A first information processing method of the present invention is characterized by including a supply step of supplying communication setting information for establishing communication to another information processing apparatus and a communicating step of communicating with the other information processing apparatus.

A first program on a record medium of the present invention is characterized by including a supply step of supplying communication setting information for establishing communication to another information processing apparatus and a communication control step of controlling communication with the other information processing apparatus.

A first program of the present invention causes a computer for controlling an information processing apparatus to perform a supply step of supplying communication setting information for establishing communication to another information processing apparatus and a communication control step of controlling communication with the other information processing apparatus.

A second information processing apparatus of the present invention is characterized by having an acquiring means for acquiring communication setting information for establishing communication from a first other information processing apparatus and a first communicating means for communicating with the first other information processing apparatus based on the communication setting information acquired by the acquiring means.

The first communicating means can be formed to wirelessly communicate with the first other information processing apparatus.

The acquiring means can be formed to have a reading means for reading the communication setting information from a record medium having the communication setting information recorded thereon by the first other information processing apparatus.

The record medium can be a portable card.

The reading means can be formed to read the communication setting information recorded on the record medium through contactless communication.

The reading means can be formed to read the communication setting information recorded on the record medium through contact communication.

A storage means can be provided for storing the communication setting information acquired by the acquiring means.

The communication setting information can be formed to include information indicating whether or not the information processing apparatus which has acquired the communication setting information can hold the communication setting information, and when the information indicates that the holding of the communication setting information is not permitted, a control means can be provided for performing control to delete the communication setting information from the storage means.

The communication setting information can be formed to include information on an information validity term for limiting the period in which the information processing apparatus which has acquired the communication setting information is permitted to hold the communication setting information, and when the information validity term has elapsed, a control means can be provided for performing control to delete the communication setting information from the storage means.

A recording means can be provided for recording the communication setting information stored by the storage means in a recording medium, and the communication setting information recorded on the recording medium by the recording means can be read from a second another information processing apparatus different from the first other information processing apparatus.

The communication setting information can be formed to include information indicating whether or not the information processing apparatus which has acquired the communication setting information can supply the communication setting information to a second other information processing apparatus different from the first other information processing apparatus, and when the information indicates that the supply of the communication setting information is not permitted, a control means can be provided for performing control such that the recording means does not record the communication setting information on the record media.

The communication setting information can be formed to include information on a communication validity term for limiting the period in which the information processing apparatus which has acquired the communication setting information is permitted to perform the communication, and when the communication validity term has elapsed, a control means can be provided for performing control such that the first communication means does not perform communication with the first other information communication apparatus.

The communication setting information can be formed to include an IP address of a second other information processing apparatus different from the first other information processing apparatus for allowing the information processing apparatus which has acquired the communication setting information to perform communication with the second other information processing apparatus through the first information processing apparatus.

The acquiring means can be formed to have a second communication means for performing contactless wireless communication with the first other information processing apparatus, and the second communication means can be formed to acquire the communication setting information from the first other information processing apparatus through the contactless wireless communication.

The acquiring means can be formed to have a second communication means for performing infrared communication with the first other information processing apparatus, and the second communication means can be formed to acquire the communication setting information from the first other information processing apparatus through the infrared communication.

A second information processing method of the present invention is characterized by including an acquiring step of acquiring communication setting information for establishing communication from another information processing apparatus and a communicating step of communicating with the other information processing apparatus based on the communication setting information acquired with the processing of the acquiring step.

A second program on a record medium of the present invention is characterized by including an acquiring step of acquiring communication setting information for establishing communication from another information processing apparatus and a communication step of controlling communication with the other information processing apparatus based on the communication setting information acquired with the processing of the acquiring step.

A second program of the present invention causes a computer for controlling an information processing apparatus to perform an acquiring step of acquiring communication setting information for establishing communication from another information processing apparatus and a communication control step of controlling communication with the other information processing apparatus based on the communication setting information acquired with the processing of the acquiring step.

In the communication system of the present invention, the first information processing apparatus supplies the communication setting information for establishing communication to the second information processing apparatus to perform communication with the second information processing apparatus. In addition, the second information processing apparatus acquires the communication setting information from the first information processing apparatus to perform communication with the first information processing apparatus based on the acquired information processing apparatus.

In the first information processing apparatus and method, recording medium, and program of the present invention, the first other information processing apparatus is supplied with the communication setting information for establishing communication to perform communication with the first other information processing apparatus.

In the second information processing apparatus and method, recording medium, and program of the present invention, the communication setting information is acquired from the first other information processing apparatus to perform communication with the first other information processing apparatus based on the communication setting information.

BRIEF DESCRIPTION OF THE DRAWINGS

FIG. 2 is a diagram showing a configuration example of communication group formation information;

FIG. 3 is a diagram showing a configuration example of management conditions;

FIG. 10 is a diagram showing a description example of the communication group formation information;

FIG. 11 is a diagram showing a description example of the management conditions;

FIG. 28 is a diagram showing a description example of the management conditions;

FIG. 34 is a diagram showing a configuration example of the communication group formation information;

FIG. 35 is a diagram showing a description example of the communication group formation information;

FIG. 39 is a diagram showing a description example of the communication group formation information;

FIG. 43 is a diagram showing a description example of the communication group formation information.

BEST MODES FOR CARRYING OUT THE INVENTION

Figure 1:
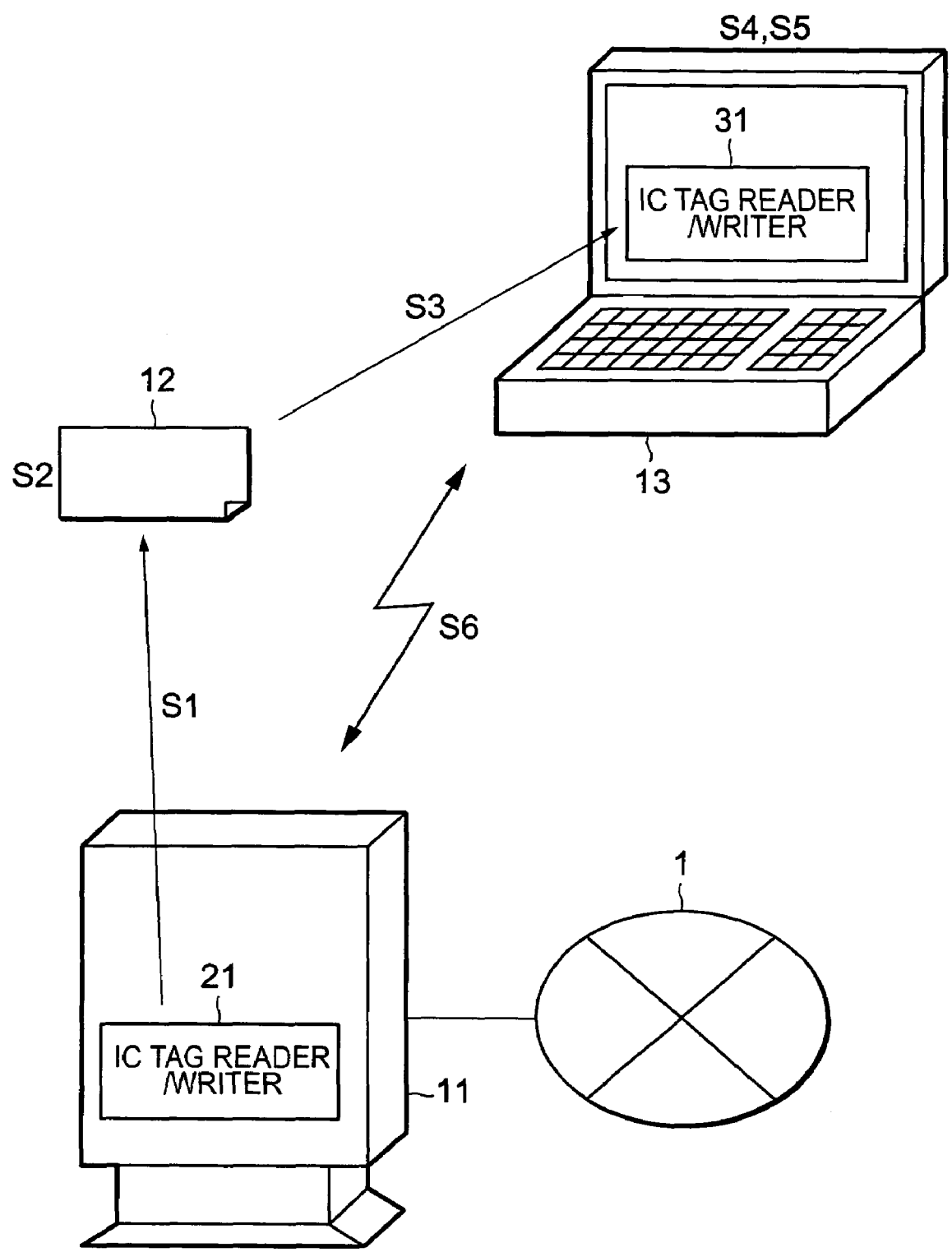
FIG. 1 is a diagram showing the configuration of a communication system in an embodiment to which the present invention is applied.

FIG. 1 illustrates a configuration example of a communication system to which the present invention is applied. FIG. 1 shows an example of the case of the Infrastructure mode. In the communication system, an access point 11 is connected by wire to the Internet 11.

The access point 11 contains an IC (Integrated Circuit) tag reader/writer 21 for transmitting information required for communication setting of wireless communication with the IEEE 802.11 standard (the information is hereinafter referred to as communication setting information) to a tag (IC card) 12. The communication is performed between the IC tag reader/writer 21 and the tag 12 at close range with no contact.

In addition, the access point 11 performs wireless communication of the IEEE 802.11 standard with a terminal apparatus 13 to relay communication between the terminal apparatus 13 and another terminal apparatus and connection to the Internet 1. In the wireless LAN of the IEEE 802.11 standard, the communication distance between the access point 11 and the terminal apparatus 13 or between terminal apparatuses is typically several tens of meters or less.

The tag 12 performs contactless communication with the access point 11 and the terminal apparatus 13 at close range. When the tag 12 receives the communication setting information from the IC tag reader/writer 21 of the access point 11, it stores the information. In addition, when an IC tag reader/writer 31 of the terminal apparatus 13 requests the communication setting information to the tag 12, the tag 12 transmits the stored communication setting information to the terminal apparatus 13.

The terminal apparatus 13 is formed, for example, of a general-purpose personal computer or the like, and contains a communication apparatus for performing wireless LAN communication of the IEEE 802.11 standard to perform wireless communication of the IEEE 802.11 standard with the access point 11 or another terminal apparatus. In addition, the terminal apparatus 13 contains the IC tag reader/writer 31 and performs contactless communication with the tag 12 at close range to acquire the communication setting information.

Next, the outlines of the communication system of the present invention are described with reference to FIGS. 1 to 3.

At step S1 in FIG. 1, a user puts the tag 12 very close to the IC tag reader/writer 21 of the access point 11. The IC tag reader/writer 21 performs contactless communication with the tag 12 at close range and transmits the communication setting information to the tag 12. The communication setting information includes communication group formation information shown in FIG. 2 and management conditions shown in FIG. 3. In the communication group formation information, information necessary for the terminal apparatus 13 to perform communication setting is described. In the management conditions, conditions of management of the communication group formation information are described.

In the communication group formation information shown in FIG. 2, a network name which is a title for identifying a wireless LAN communication network is shown in the first line from the top. In FIG. 2, "TEST AP" is shown as an example of the network name. An SSID (Service Set Identification) which is an ID for identifying a wireless LAN of the IEEE 802.11 standard is shown in the second line from the top. The SSID is set for both of the access point and the terminal apparatus 13, and communication is permitted only when the SSIDs of them match. In FIG. 2, "0x123456" is shown as an example.

A WEP (Wired Equivalent Privacy) key which is authentication information required for participation in a communication group is shown in the third line from the top in FIG. 2. When communication is performed between the access point 11 and the terminal apparatus 13 or between terminal apparatuses, data to be communicated is encrypted with a WEP key common to the access point 11 and the terminal apparatus 13 or the terminal apparatuses and communicated. Thus, even when an apparatus which does not have the common WEP key intercepts communication data, the communication data is not decrypted. In FIG. 2, "0x123456789" is shown as an example.

A communication group mode is shown in the fourth line from the top in FIG. 2. As the communication group mode, at least one of the Infrastructure mode and the Ad hoc mode is specified. In FIG. 2, "Infrastructure (Infrastructure mode)" is specified as an example.

Next, in the management conditions shown in FIG. 3, in the first low from the top, a URI (Uniform Resource Identifier) relating to the communication group formation information in FIG. 2 is shown. In the URI, a Web page of the manufacturer of the access point 11 or the like is described, for example.

In the second line from the top in FIG. 3, information "holding permission" is shown for specifying whether or not the terminal apparatus 13 can hold the communication setting information in FIG. 2 when it acquires the communication setting information. When the holding permission is "prohibited," a CPU 201 (see FIG. 6) of the terminal apparatus 13 performs its own communication setting based on the acquired communication setting information (the communication group formation information) and then discards the communication setting information. When the holding permission is "permitted," the CPU 201 of the terminal apparatus 13 performs its own communication setting based on the acquired communication setting information (the communication group formation information) and then holds the communication setting information without discarding it. In FIG. 3, "permitted" is shown as an example.

In the third line from the top in FIG. 3, information "supply permission" is shown for specifying whether or not the terminal apparatus 13 can supply the communication setting information acquired and held thereby to another apparatus. The terminal apparatus 13 can transmit and receive the communication setting information not only to and from the access point 11 but also to and from another apparatus. When the supply permission is "prohibited," the CPU 201 of the terminal apparatus 13 cannot transmit the communication setting information held thereby to the tag 12. When the supply permission is "permitted," the CPU 201 of the terminal apparatus 13 can transmit the communication setting information held thereby to the tag 12 through the IC tag reader/writer 31 for storage therein. When the communication setting information stored in the tag 12 is supplied to another terminal apparatus, the supplied terminal apparatus can perform communication setting of the wireless LAN based on the communication setting information.

Figure 4:
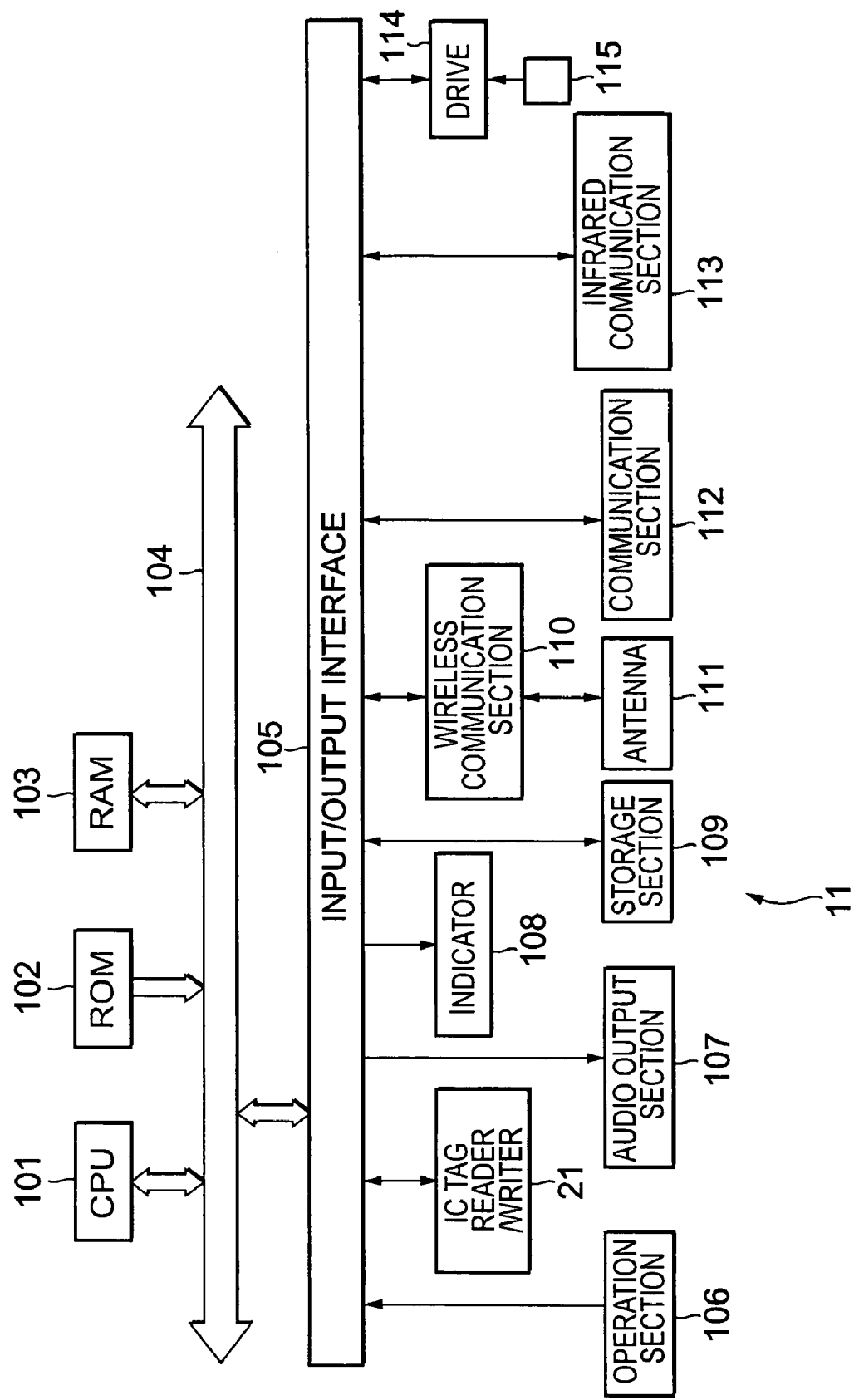
FIG. 4 is a block diagram showing a configuration example of an access point.

In the fourth line from the top in FIG. 4, a communication validity term in which the terminal apparatus 13 can perform communication through communication setting performed on the basis of the acquired communication group formation information is shown. In FIG. 3, "2002/05/06" is shown by way of example, meaning that communication is allowed until disconnection on May 6, 2002. The CPU 201 of the terminal apparatus 13 permits communication of the terminal apparatus 13 with another apparatus (the access point 11) until the communication validity term, but after the lapse of the communication validity term, prevents the terminal apparatus 13 from communicating with the other apparatus. As the communication validity term, a date may be specified as shown in FIG. 3, or the number of days may be specified after the terminal apparatus 13 acquires the communication setting information.

In the fifth line from the top in FIG. 3, an information validity term of the communication group formation information itself held by the terminal apparatus 13 is shown. Specifically, the time limit within which the terminal apparatus 13 can perform communication through the communication setting information is shown when the terminal apparatus 13 acquires and holds the communication setting information. After the lapse of the information validity term, the CPU 201 of the terminal apparatus 13 discards the communication setting information. In FIG. 3, "2002/04/05" is shown by way of example, meaning that the holding is allowed until discard on Apr. 5, 2002. As the information validity term, a date may be specified as shown in FIG. 3, or the number of days may be specified after the terminal apparatus 13 acquires the communication setting information.

In the sixth line from the top in FIG. 3, an information update condition is shown which, when the CPU 201 of the terminal apparatus 13 acquires communication group formation information similar to the communication group formation information held thereby, specifies conditions under which the already held communication group formation information is updated to the newly acquired communication group formation information. In FIG. 3, "same except WEP key" is shown by way of example, meaning, when the communication group formation information except the WEP key is the same, the CPU 201 of the terminal apparatus 13 updates the already held communication group formation information with the newly acquired communication group formation information. Besides this, as the information update condition, conditions may be set such that update is not performed unless the whole communication group formation information completely matches, or update is performed when any one element of the communication group formation information matches.

Returning to FIG. 1, at step S2, the tag 12 stores the communication setting information received from the IC tag reader/writer 21 at step S1.

At step S3, the user puts the tag 12 having the communication setting information stored therein very close to the IC tag reader/writer 31 of the terminal apparatus 13. The IC tag reader/writer 31 receives the communication setting information stored in the tag 12 from the tag 12.

At step S4, the terminal apparatus 13 stores the communication setting information received at step S3, and at step S5, performs communication setting for performing wireless communication of the IEEE 802.11 scheme with the access point 11 based on the communication group setting information included in the communication setting information.

At step S6, the terminal apparatus 13 performs wireless communication of the IEEE 802.11 scheme with the access point 11 based on the communication setting performed at step S5.

As described above, the user can easily and quickly perform communication setting without performing burdensome entry of the setting information by supplying the communication setting information from the access point 11 to the terminal apparatus 13 through the tag 12. In addition, the user follows the procedure of putting the tag 12 over the IC tag reader/writer 21 of the access point 11, and then putting the tag 12 over the IC tag reader/writer 31 of the terminal apparatus 13, so that the user can understand more intuitively the communication setting being performed between the access point 11 and the terminal apparatus 13. In addition, by doing this, communication setting can be performed between desired apparatuses (in FIG. 1, between the access point 11 and the terminal apparatus 13) without fail. Thus, the user can prevent erroneous connection of the terminal apparatus 13 to an apparatus other than a desired apparatus.

Next, FIG. 4 is a block diagram showing an example of the configuration within the access point 11. In FIG. 4, a CPU 101 performs various types of processing in accordance with a program stored in a ROM 102 and a program loaded into a RAM 103 from a storage section 109. The RAM 103 also has data stored therein necessary for the CPU 101 to perform various types of processing as appropriate.

The CPU 101, the ROM 102, and the RAM 103 are interconnected through a bus 104. An input/output interface 105 is also connected to the bus 104.

Connected to the input/output interface 105 are an operation section 106 formed of a plurality of buttons or the like for receiving entry of operations of various setting from a user, the IC tag reader/writer 21 (the detailed configuration thereof is later described with reference to FIG. 5) for performing communication with the tag 12, an audio output section 107 for outputting audio for notifying a user of an operational state of the access point 11 or the like, an indicator 108 formed of an LED (Light Emitting Diode) or the like for notifying a user of an operational state of the access point 11 or the like, the storage section 109 formed of a hard disk or the like for storing the communication setting information or the like as appropriate, a wireless communication section 110 for performing wireless communication of the IEEE 802.11 standard through an antenna 111, a communication section 112 for performing communication processing through a network including the Internet 1 and a wired LAN, and an infrared communication section 113 for performing transmission and reception of the communication setting information through infrared communication. The communication section 112 relays connection of the terminal apparatus 13 to the Internet 1, for example. The communication section 112 installs a computer program supplied through the Internet 1 on the storage section 109. In this manner, the program for controlling the access point 11 can be updated as appropriate.

A drive 114 is also connected to the input/output interface 105 as required, and a semiconductor memory 115 is mounted thereon as appropriate. A computer program read from the semiconductor memory 115 is installed on the storage section 109 as required. When the semiconductor memory 115 has the communication setting information stored therein, the communication setting information read from the semiconductor memory 115 is stored in the storage section 109 as required.

Figure 5:
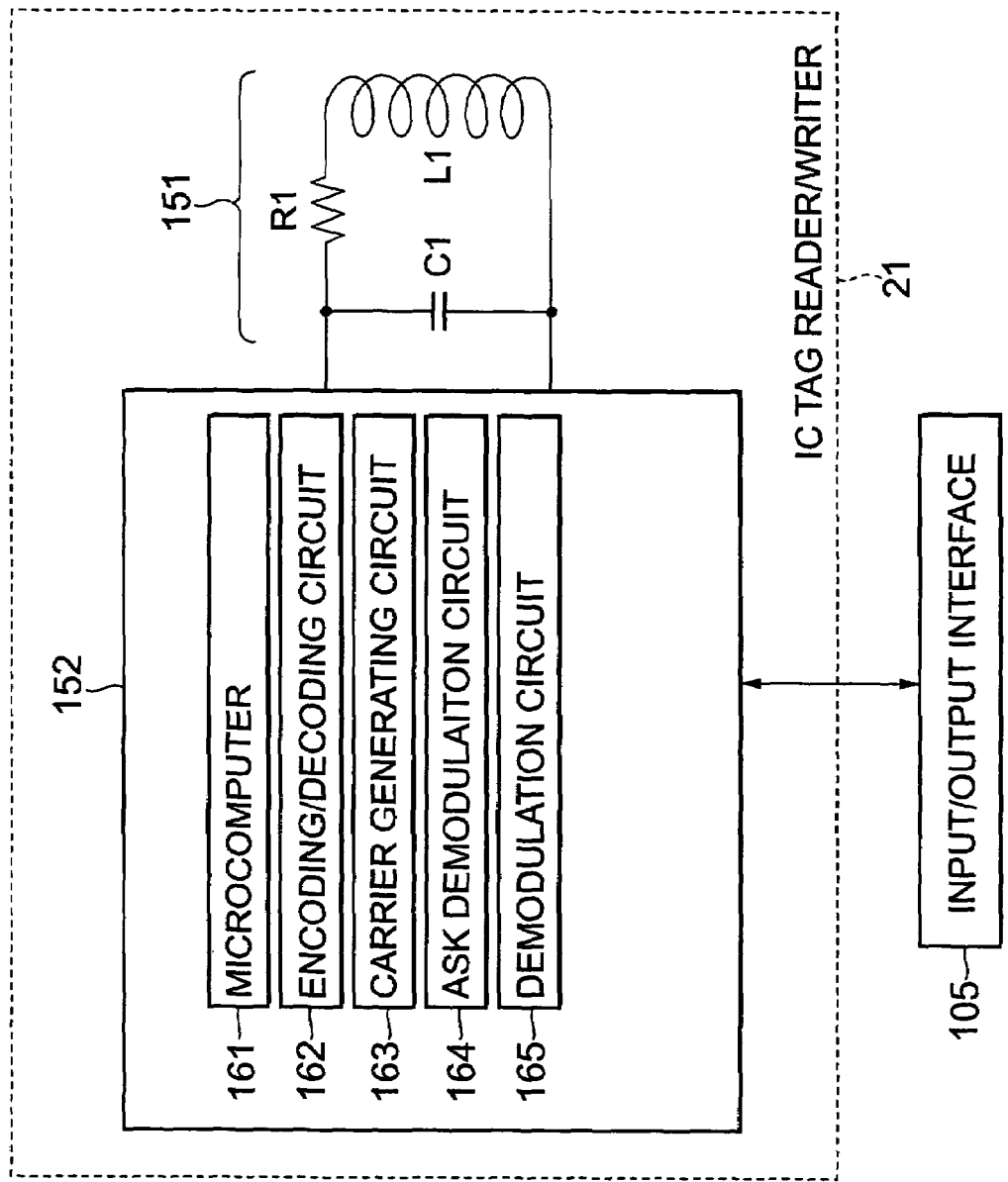
FIG. 5 is a block diagram showing a configuration example of an IC tag reader/writer.

Next, FIG. 5 shows an example of the configuration within the IC tag reader/writer 21 in FIG. 4. An antenna resonance circuit section 151 is formed of a resistance R1, a capacitor C1, and a coil L1, and transmits an information signal and power generated by a processing section 152 to an antenna resonance circuit section 261 (see FIG. 7) of the tag 12. In addition, the antenna resonance circuit section 151 receives an information signal from the antenna resonance circuit section 261 of the tag 12 and supplies it to the processing section 152. The natural resonance frequency of the antenna resonance circuit section 151 (hereinafter referred to as a natural resonance frequency) is previously set to a predetermined value with the capacitance of the capacitor C1 and the inductance of the coil L2.

The processing section 152 contains a microcomputer 161, an encoding/decoding circuit 162, a carrier generating circuit 163, an ASK (Amplitude Shift Keying) modulation circuit 164, and a demodulation circuit 165. The microcomputer 161 controls each section of the IC tag reader/writer 21 to perform processing for transmitting and receiving data. The encoding/decoding circuit 162 encodes data supplied through the input/output interface 105 to Manchester codes or the like and decodes an information signal received from the tag 12 and demodulated by the demodulation circuit 165 to supply the obtained data to each section of the access point 11 through the input/output interface 105. The carrier generating circuit 163 generates a carrier to be transmitted to the tag 12 and supplies it to the ASK modulation circuit 164. The ASK modulation circuit 164 amplitude-modulates the carrier supplied from the carrier generating circuit 163 based on the signal encoded by the encoding/decoding circuit 162 and supplies it to the antenna resonance circuit section 151.

The demodulation circuit 165 demodulates a signal received by the antenna resonance circuit section 151 and supplies it to the encoding/decoding circuit 162. It should be noted that the basic internal configuration of an IC tag reader/writer other than the IC tag reader/writer 21 in the following description is similar to the internal configuration of the above IC tag reader/writer 21.

Figure 6:
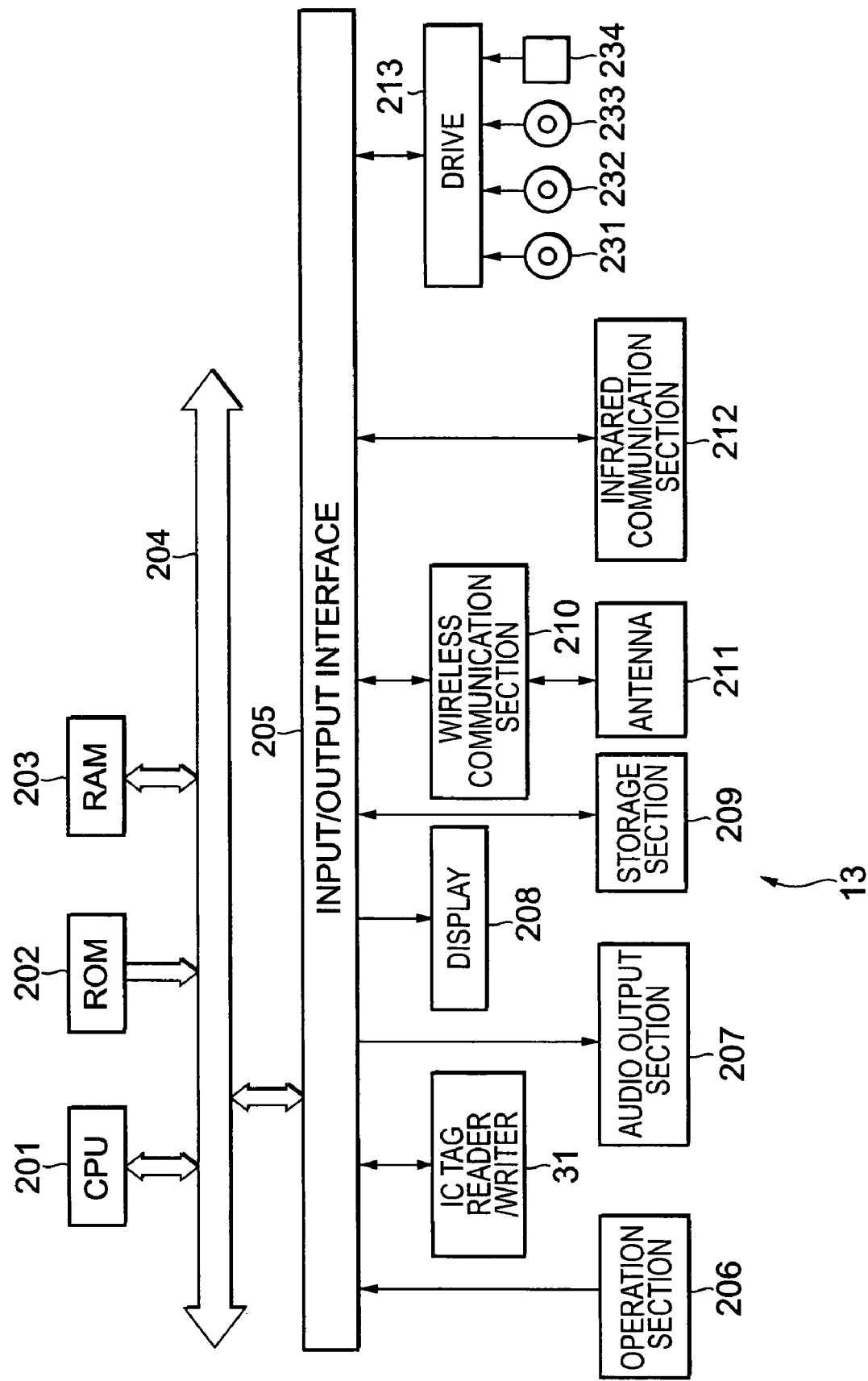
FIG. 6 is a block diagram showing a configuration example of a terminal apparatus.

Next, FIG. 6 is a block diagram showing an example of the configuration within the terminal apparatus 13. In FIG. 6, the CPU 201 performs various types of processing in accordance with a program stored in a ROM 202 and a program loaded into a RAM 203 from a storage section 209. The RAM 203 also has data or the like stored therein necessary for the CPU 201 to perform various types of processing as appropriate.

The CPU 201, the ROM 202, and the RAM 203 are interconnected through a bus 204. An input/output interface 205 is also connected to the bus 204.

Connected to the input/output interface 205 are an operation section 206 formed of a keyboard, a mouse and the like for receiving entry of operations from a user, the IC tag reader/writer 31 for performing communication with the tag 12, an audio output section 207 for outputting audio, a display 208 formed of a CRT (Cathode-Ray Tube), an LCD (Liquid Crystal Display) or the like, the storage section 209 formed of a hard disk or the like for storing the received communication setting information or the like as appropriate, a wireless communication section 210 for performing wireless communication of the IEEE 802.11 standard through an antenna 211, and an infrared communication section 212 for performing transmission and reception of the communication setting information through infrared communication. The wireless communication section 210 performs communication processing with the access point 11 or between terminal apparatuses.

A drive 213 is also connected to the input/output interface 205 as required, and a magnetic disk 231, an optical disk 232, a magneto-optical disk 233, or a semiconductor memory 234 is mounted thereon as appropriate. A computer program read from them is installed on the storage section 209 as required.

The basic internal configuration of the IC tag reader/writer 31 in the terminal apparatus 13 in FIG. 6 is similar to the internal configuration of the IC tag reader/writer 21 of the access point 11 shown in FIG. 5.

Figure 7:
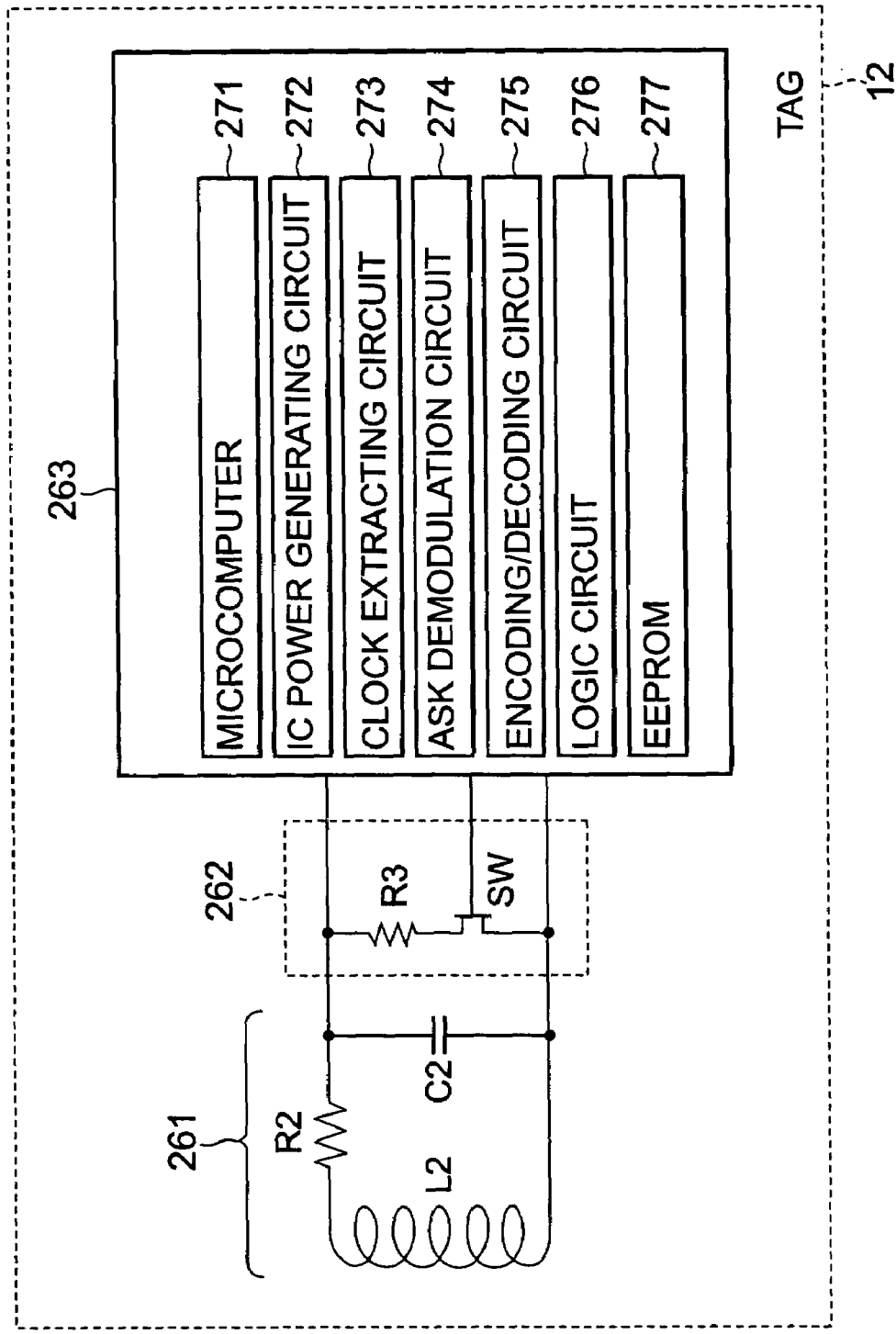
FIG. 7 is a block diagram showing a configuration example of a tag.

Next, FIG. 7 shows an example of the detailed configuration of the tag 12. For example, the antenna resonance circuit section 261 of the tag 12, for example electromagnetically coupled to the antenna resonance circuit section 151 of the IC tag reader/writer 21, consists of a resistance R2, a capacitor C2, and a coil L2, and transmits an information signal generated by a processing section 263 and modulated by an LS (Load Switching) modulation circuit 262 to the antenna resonance circuit section 151 of the IC tag reader/writer 21. In addition, the antenna resonance circuit section 261 receives an information signal from the antenna resonance circuit section 151 of the IC tag reader/writer 21 and supplies it to the processing section 263. The natural resonance frequency of the antenna resonance circuit section 261 is previously set to a predetermined value with the capacitance of the capacitor C2 and the inductance of the coil L2.

The LS modulation circuit section 262 consists of a resistance R3 and a MOS (Metal Oxide Semiconductor) switch SW, switches the MOS switch SW between on and off in accordance with data of 1 or 0 supplied from the processing section 263 to modulate data, and supplies it to the antenna resonance circuit section 261.

The processing section 263 contains a microcomputer 271, an IC power generating circuit 272, a clock extracting circuit 273, an ASK (Amplitude Shift Keying) demodulation circuit 274, an encoding/decoding circuit 275, a logic circuit 276, and an EEPROM (Electrically Erasable Programmable Read-only Memory) 277. The microcomputer 271 controls each section of the tag 12 to perform processing of data to be transmitted or received and processing of transmission and reception of data. The IC power generating circuit 272 generates power necessary for the tag 12 to perform various types of processing based on a signal received by the antenna resonance circuit section 261 and supplies it to each section. The clock extracting circuit 273 extracts a clock signal from a signal received by the antenna resonance circuit section 261 and supplies it to the microcomputer 271.

The signal received by the antenna resonance circuit section 261 is a signal modulated by the ASK modulation circuit of the IC tag reader/writer 21. The ASK demodulation circuit 274 demodulates the received signal and supplies it to the encoding/decoding circuit 275. The encoding/decoding circuit 275 decodes the signal supplied by the ASK demodulation circuit 274 and supplies it to the logic circuit 276. In addition, the encoding/decoding circuit 275 codes data supplied from the logic circuit 276 and supplies it to the LS modulation circuit section 262. The logic circuit 276 performs predetermined processing based on the data supplied from the encoding/decoding circuit 275, reads data contents stored in the EEPROM 277, and supplies it to the encoding/decoding circuit 275, writes new data to the EEPROM 277, or deletes it.

The EEPROM 277 stores predetermined data such as the communication setting information, reads and supplies it, or deletes it in accordance with a request from the logic circuit 276, for example.

It should be noted that, while the above description about the tag 12 has been made in the case where the IC tag reader/writer 21 of the access point 11 is a communication partner of the tag 12 as an example, communication with another IC tag reader/writer (including the IC tag reader/writer 31) is also performed with a method similar to the aforementioned one.

Here, description is made for the communication processing between the IC tag reader/writer and the tag 12 by using data communication processing between the IC tag reader/writer 21 and the tag 12 as an example.

First, the carrier generating circuit 163 present in the processing section 152 of the IC tag reader/writer 21 generates a carrier at a frequency of 13.5 MHz. Next, the processing section 152 acquires data through the input/output interface 105. The encoding/decoding circuit 162 encodes the acquired data to the Manchester codes and supplies it to the ASK modulation circuit 164.

Next, the ASK modulation circuit 164 ASK-modulates the carrier based on the encoded data input thereto by the encoding/decoding circuit 162. The ASK-modulated modulation signal is supplied to the antenna resonance circuit section 151. The antenna resonance circuit section 151 generates an electromagnetic field in accordance with the supplied modulation signal.

As a result of electromagnetic induction with the electromagnetic field generated by the antenna resonance circuit section 151, electromotive force is induced in the antenna resonance circuit section 261 of the tag 12. The IC power generating circuit 272 forms a power circuit based on the induced electromotive force and supplies necessary power to each section.

Next, the clock extracting circuit 273 extracts a clock component from the induced electromotive force and supplies it to the microcomputer 271. The ASK demodulation circuit 274 ASK-demodulates the ASK-modulated modulation signal based on the voltage amplitude change of the induced electromotive force and supplies it to the encoding/decoding circuit 275. Since the demodulated signal has been encoded to the Manchester codes, the encoding/decoding circuit 275 decodes the demodulated signal and supplies it to the logic circuit 276.

The logic circuit 276 stores the supplied data in the EEPROM 277, reads the data stored in the EEPROM 277, or deletes it in accordance with a previously set predetermined program. The logic circuit 276 also forms information to be transmitted to the IC tag reader/writer 21.

Then, the encoding/decoding circuit 275 encodes the information for transmission formed by the logic circuit 276 to the Manchester codes, and supplies it to the LS modulation circuit section 262. The LS modulation circuit section 262 changes the impedance of the antenna resonance circuit section 261 for LS modulation based on the signal supplied from the encoding/decoding circuit 275. The antenna resonance circuit section 261 transmits the modulated signal.

In the antenna resonance circuit section 151 of the IC tag reader/writer 21, a constant-current carrier with no modulation flows, and a voltage amplitude change is induced in the carrier in accordance with the impedance change of the antenna resonance circuit section 261 of the tag 12. The antenna resonance circuit section 151 detects this change to receive the signal from the tag 12.

The demodulation circuit 165 demodulates the signal based on the voltage amplitude change induced in accordance with the impedance change of the antenna resonance circuit section 261 and supplies it to the encoding/decoding circuit 162. The encoding/decoding circuit 162 decodes the signal supplied from the demodulation circuit 165, produces data, and supplies the data to a predetermined portion of the access point 11 through the input/output interface 105.

As described above, the information is transmitted and received between the IC tag reader/writer 21 and the tag 12.

While encoding is performed to the Manchester codes in the aforementioned description, the encoding is not limited to encoding to the Manchester codes. In addition, while the frequency of the carrier generated by the carrier generating circuit 163 is 13.5 MHz in the aforementioned example, the frequency of the carrier is not limited to 13.5 MHz.

For transmission and reception of data between the IC tag reader/writer 21 and the tag 12 in the following description, the data transmission and reception between the IC tag reader/writer 21 and the tag 12 is performed with the processing described above, although detailed description is omitted. In addition, data transmission and reception between an IC tag reader/writer other than the IC tag reader/writer 21 and the tag 12 is similarly performed.

Figure 8:
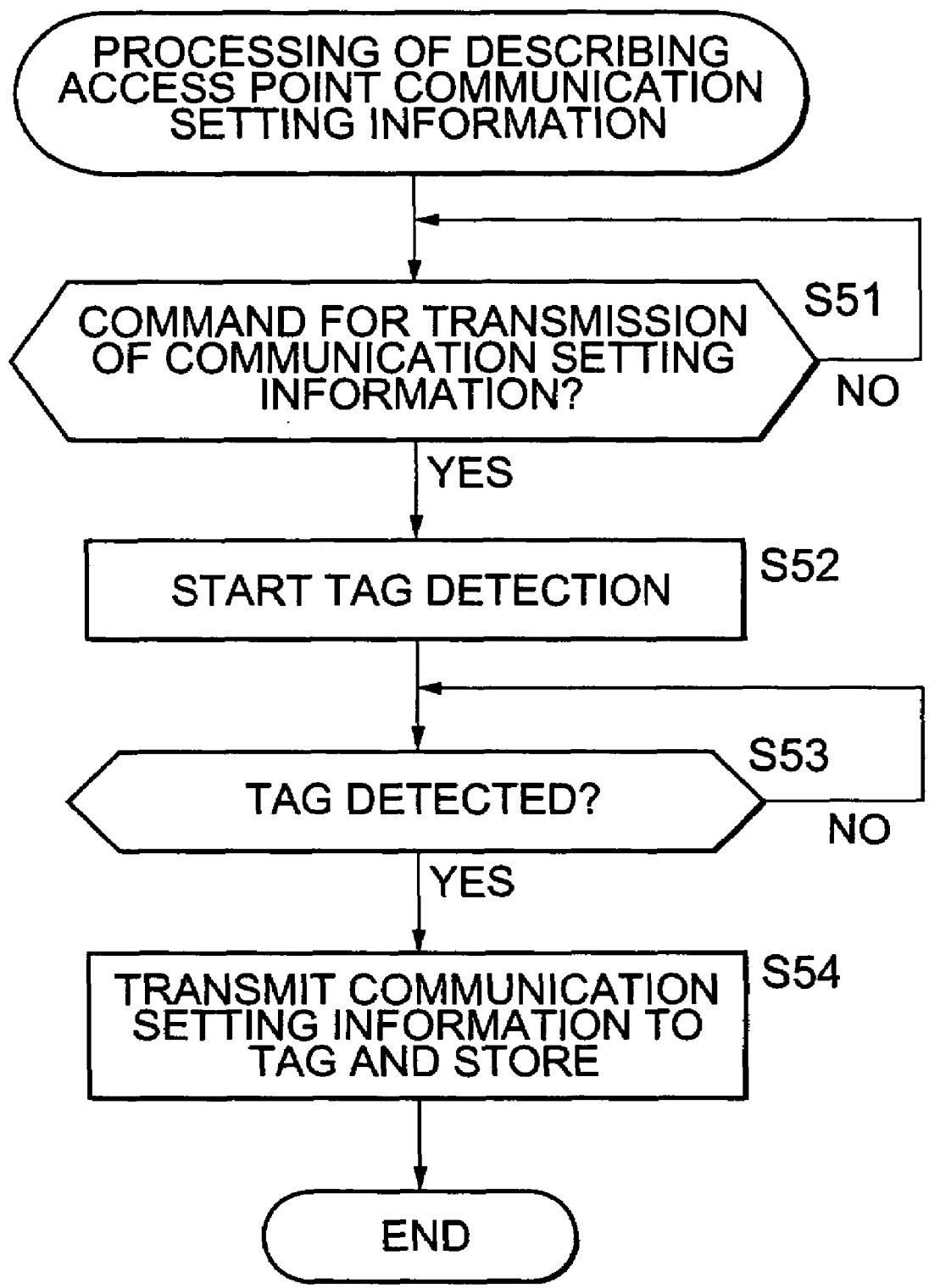
FIG. 8 is a flow chart for explaining communication setting information description processing of the access point.
Figure 9:
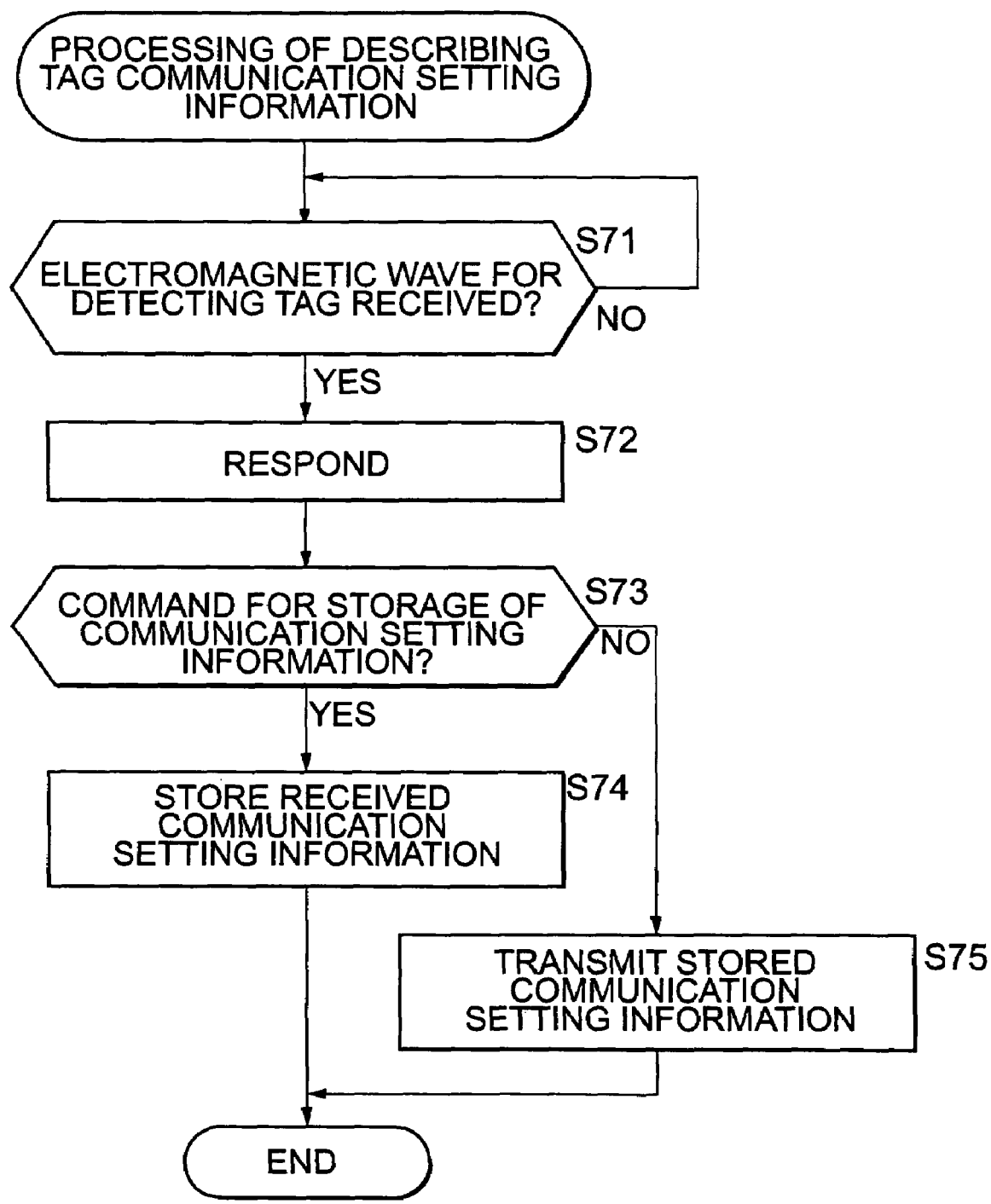
FIG. 9 is a flow chart for explaining communication setting information description processing of the tag.

Next, description is made for the processing at step S1 in FIG. 1, that is, the processing of information group formation information description of the access point 11 with reference to a flow chart in FIG. 8. Also, description is made for the processing of communication group formation information description of the tag 12 at this point with reference to a flow chart in FIG. 9.

For example, when a predetermined button of the operation section 106 is pressed to input a command for transmission of the communication group formation information, the access point 11 starts detection of the tag 12. Thus, at step S51 in FIG. 8, the CPU 101 of the access point 11 monitors the operation section 106 and determines whether or not the predetermined button of the operation section 106 is pressed to command transmission of the communication group formation information, and repeatedly performs the processing at step S51 and waits until the predetermined button of the operation section 106 is pressed to command transmission of the communication group formation information.

When a user presses the predetermined button of the operation section 106, the CPU 101 determines that the predetermined button of the operation section 106 is pressed to command transmission of the communication group formation information at step S51, and the processing proceeds to step S52.

At step S52, the CPU 101 instructs the IC tag reader/writer 21 to start detection of the tag 12. At step S53, the CPU 101 continues monitoring of the IC tag reader/writer 21 and waits until it receives a notification of detection of the tag 12 from the IC tag reader/writer 21.

The microcomputer 161 of the tag 12 held by the user at close range of the IC tag reader/writer 21 waits until it receives electromagnetic waves for detecting the tag 12 at step S71, and after reception of the electromagnetic waves for detecting the tag 12, the processing proceeds to step S72 where the microcomputer 161 transmits a response signal through the antenna resonance circuit section 151.

Upon reception of the response signal from the tag 12, the IC tag reader/writer 21 of the access point 11 makes a notification to the CPU 101. Then, at step S53, the CPU 101 of the access point 11 determines that it receives the notification of the detection of the tag 12 from the IC tag reader/writer 21, and the processing proceeds to step S54 where the CPU 101 reads the communication setting information stored in the storage section 109 and supplies it to the IC tag reader/writer 21. The IC tag reader/writer 21 transmits the supplied communication setting information to the tag 21.

FIG. 10 shows a description example of communication group formation information transmitted from the IC tag reader/writer 21 of the access point 11 at step S54. In addition, FIG. 11 shows a description example of management conditions transmitted from the IC tag reader/writer 21 of the access point 11 at step S54. The communication group formation information in FIG. 10 and the management conditions in FIG. 11 are described in the XML (extensible Markup Language) form.

In FIG. 10, the tags of <infra> in the first line from the top and </infra> in the seventh line from the top correspond to the communication network mode in FIG. 2 and indicate that the communication group mode is the Infrastructure mode. The character string "TEST AP" sandwiched between <TITLE> </TITLE> tags in the second line from the top in FIG. 10 corresponds to the network name in FIG. 2 and indicates that the network name is "TEST AP."

The tags of <IEEE802.11a> in the third line from the top and </IEEE802.11a> in the sixth line from the top in FIG. 10 indicate that the communication group formation information relates the IEEE 802.11a scheme communication. When the IEEE 802.11b scheme is specified, the tags of <IEEE802.11b> </IEEE802.11b> indicating the IEEE 802.11b scheme communication are used as these tags. In addition, when the Bluetooth® communication scheme is specified, the tags of <Bluetooth> </Bluetooth> indicating the Bluetooth communication scheme are used as these tags.

The character string "0x123456" sandwiched between the tags of <ssid> </ssid> in the fourth line from the top in FIG. 10 corresponds to SSID in FIG. 2. In addition, the character string "0x1234567890" sandwiched between the tags of <wepkey> </wepkey> in the fifth line from the top in FIG. 10 corresponds to the WEP key in FIG. 2.

In the description example of the management conditions shown in FIG. 11, the character string "TEST Management" sandwiched between the tags of <title> </title> in the first line from the top represents the title of the management conditions. The character string "http://www.wi-fi.org" sandwiched between the tags of <uri> </uri> in the second line from the top in FIG. 11 corresponds to the associated URI in FIG. 3. The character string "communication group formation information" sandwiched between the tags of <infra> </infra> in the third line from the top in FIG. 11 indicates that the management condition is associated with the communication group formation information in FIG. 10. In reality, the character string for identifying the communication group formation information in FIG. 10 is described between the tags of <infra> </infra>.

The tags of <holding permission> </holding permission> in the fourth line from the top in FIG. 11 correspond to the holding permission in FIG. 3, and the character string "OK" sandwiched between the tags of <holding permission> </holding permission> indicates that the communication setting information can be held. The tags of <supply permission> </supply permission> in the fifth line from the top in FIG. 11 correspond to the supply permission in FIG. 3, and the character string "OK" sandwiched between the tags of <supply permission> </supply permission> indicates that the communication setting information can be supplied to another apparatus.

The tags <communication validity term> </communication validity term> in the sixth line from the top in FIG. 11 correspond to the communication validity term in FIG. 3, and the character string "20020506" sandwiched between the tags of <communication validity term> </communication validity term> indicates that the communication validity term ends on May sixth, 2002. The tags of <information validity term> </information validity term> in the seventh line from the top in FIG. 11 correspond to the information validity term in FIG. 3, and the character string "20020405" sandwiched between the tags of <information validity term> </information validity term> indicates that the information validity term ends on April fifth, 2002. The tags of <information update condition> </information update condition> in the eighth line from the top in FIG. 11 correspond to the information update condition in FIG. 3, and the character string "same except WEP key" sandwiched between the tags of <information update condition> </information update condition> indicates that, when the information group formation information except the WEP key is the same, already held communication group formation information is updated with newly acquired communication group formation information.

Returning to FIG. 9, the microcomputer 161 of the tag 12 determines whether or not it receives the communication setting information and a command for storing the communication setting information from the access point 11 at step S73, and when it receives the communication setting information and the command for storing the communication setting information from the access point 11, the processing proceeds to step S74 where the microcomputer 161 stores the received communication setting information in the EEPROM 277.

As described above, the communication setting information is transmitted from the access point 11 to the tag 12.

In the aforementioned description, when the access point 11 starts the detection processing of the tag 12 when the predetermined operation is input from the operation section 106. However, the access point 11 does not necessarily start the detection processing of the tag 12 when the predetermined operation is input. That is, the access point 11 may always detect the tag 12. The access point 11 always performing the detection of the tag 12 is effective, for example when the access point 11 is connected to a power source for home use.

In addition, while the CPU 101 continues to wait until the tag reader/writer 21 detects the tag 12 at step S53 in the aforementioned description, it is possible that a limitation is imposed on the time period for which the CPU 101 wait, and when the tag 12 is not detected within the time limit, the IC tag reader/writer 21 ends detection processing of the tag 12, for example.

Figure 12:
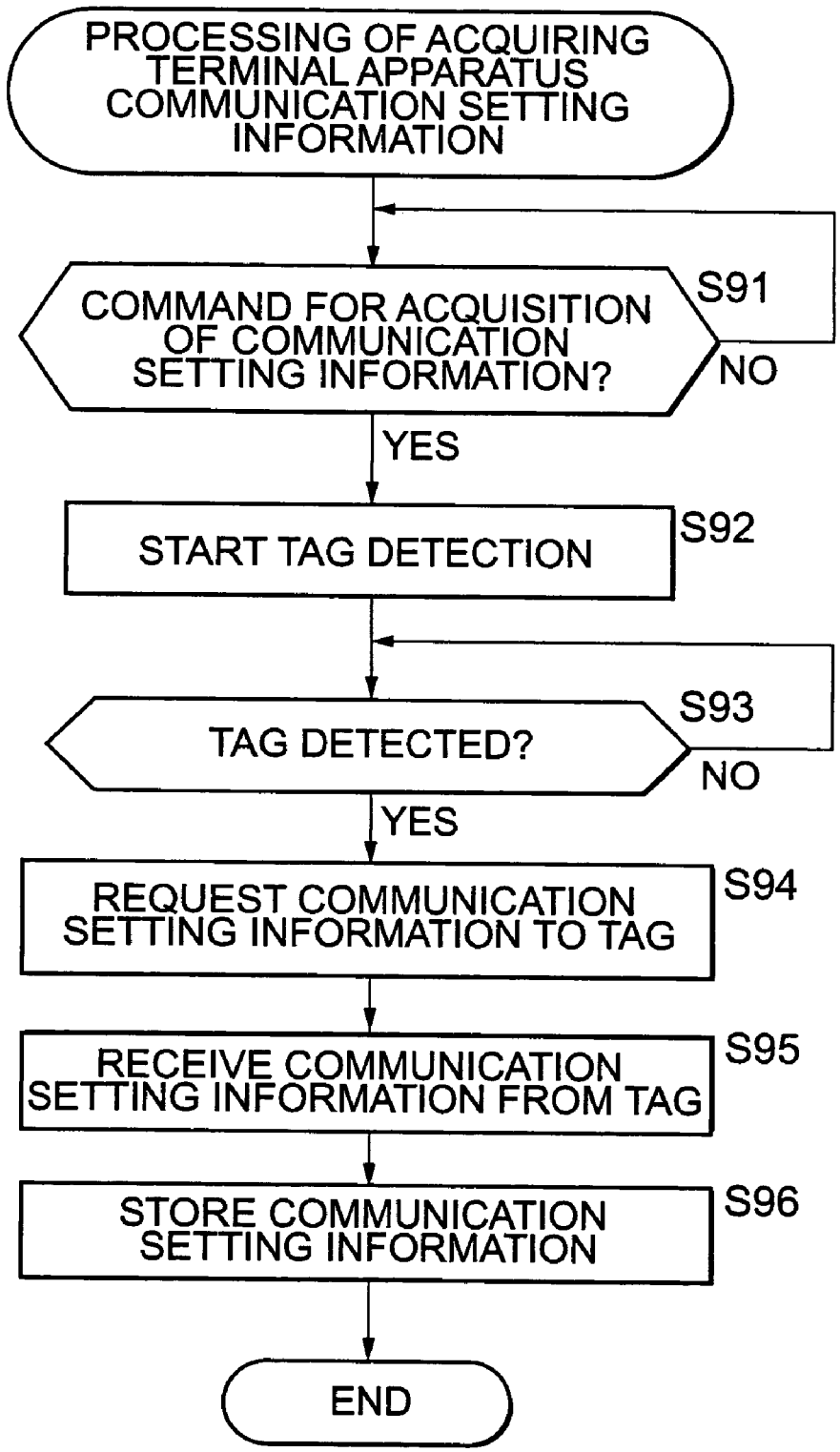
FIG. 12 is a flow chart for explaining communication setting information acquiring processing of the terminal apparatus.

Next, description is made for the processing at step S3 and step S4 in FIG. 1, that is, the processing of acquiring the communication setting information of the terminal apparatus 13 with reference to a flow chat in FIG. 12. In addition, the processing of the tag 12 in this event is described with reference to a flow chart in FIG. 11.

The terminal apparatus 13 starts detection of the tag 12, for example when a predetermined key of the keyboard forming the operation section 206 is pressed to input a command for acquiring the communication group formation information. Then, at step S91 in FIG. 12, the CPU 201 of the terminal apparatus 13 monitors the operation section 206 and determines whether or not the predetermined button of the operation section 206 is pressed to command acquisition of the communication group formation information. The CPU 201 repeatedly performs the processing at step S91 to wait until the predetermined button of the operation section 206 is pressed to command transmission of the communication group formation information.

When a user presses the predetermined button of the operation section 206, the CPU 201 determines that the predetermined button of the operation section 206 is pressed to command acquisition of the communication group formation information at step S91, and the processing proceeds to step S92.

At step S92, the CPU 201 instructs the IC tag reader/writer 31 to start detection of the tag 12. At step S93, the CPU 201 continues monitoring the IC tag reader/writer 31 to wait until it receives a notification of detection of the tag 12 from the IC tag reader/writer 31.

In this event, the microcomputer 161 of the tag 12 held by the user at close range of the IC tag reader/writer 31 waits until it receives electromagnetic waves for detecting the tag 12 at step S71. After it receives the electromagnetic waves for detecting the tag 12, the processing proceeds to step S72 where it transmits a response signal through the antenna resonance circuit section 151.

Upon reception of the response signal from the tag 12, the IC tag reader/writer 31 of the terminal apparatus 13 makes a notification to the CPU 201. Then, at step S93, the CPU 201 of the terminal apparatus 13 determines that it receives the notification of the detection of the tag 12 from the IC tag reader/writer 31. The processing proceeds to step S84 where the CPU 201 requests the communication setting information to the tag 12 through the IC tag reader/writer 31.

In this event, the microcomputer 161 of the tag 12 determines that the received command is not a command for storing the communication setting information, that is, that the received command is a command for transmitting the communication setting information at step S73, and the processing proceeds to step S75. At step S75, the microcomputer 161 of the tag 12 reads the communication setting information stored in the EEPROM 277 at step S74 in FIG. 9 and transmits it to the IC tag reader/writer 31 through the antenna resonance circuit section 261.

The IC tag reader/writer 31 of the terminal apparatus 13 receives the communication setting information from the tag 12 at step S95 in FIG. 12. Then, at step S96, the CPU 201 of the terminal apparatus 13 stores the communication setting information received at step S95 in the storage section 209.

As described above, the communication setting information is supplied from the tag 12 to the terminal apparatus 13.

In the aforementioned description, when the predetermined operation is input from the operation section 206, the terminal apparatus 13 starts the detection processing of the tag 12. However, it does not necessarily start the detection processing of the tag 12 when the predetermined operation is input. That is, the terminal apparatus 13 may always detect the tag 12. The terminal apparatus 13 always performing the detection of the tag 12 is effective, for example when the terminal apparatus 13 is connected to a power source for home use.

Figure 13:
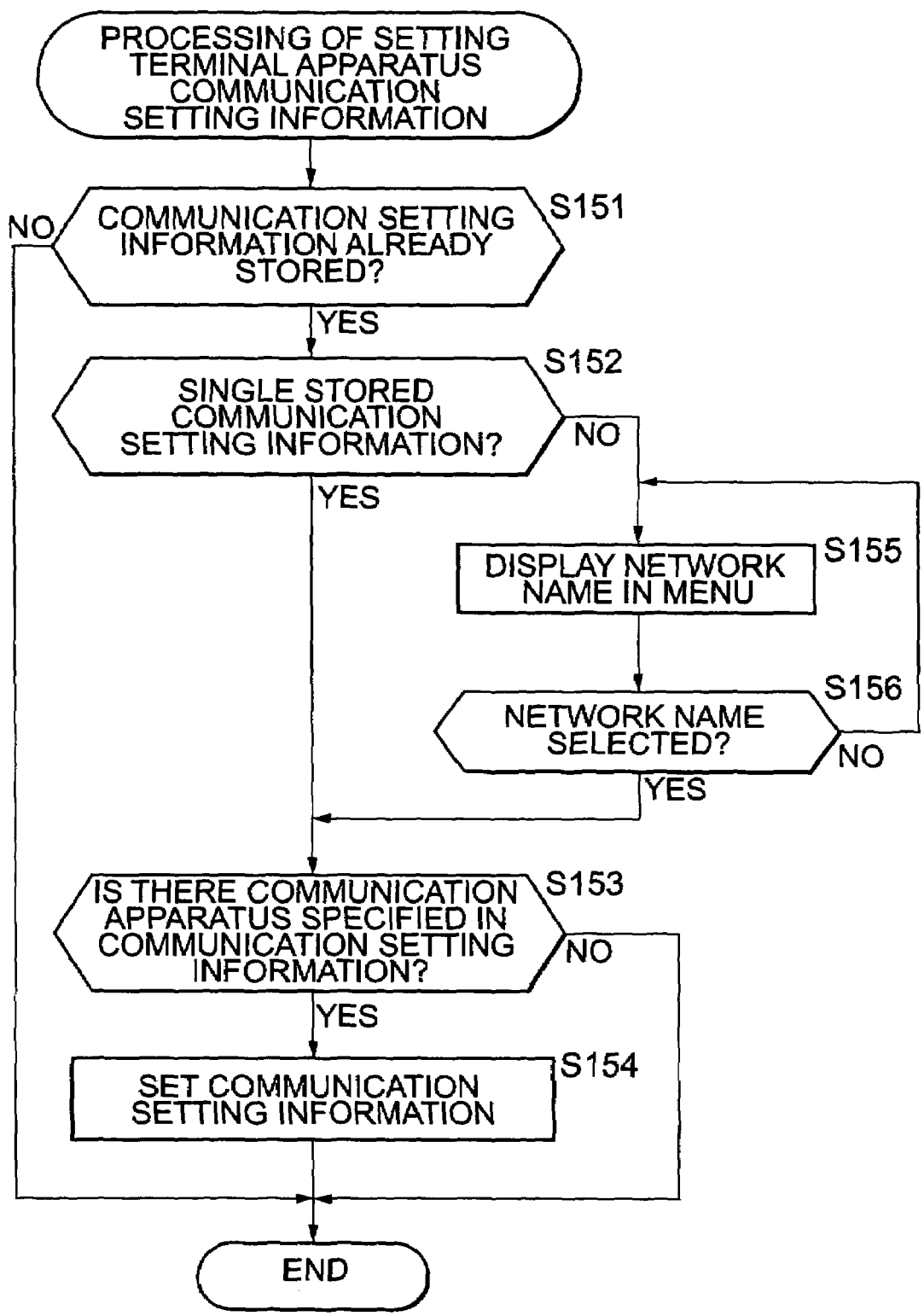
FIG. 13 is a flow chart for explaining communication setting information setting processing of the terminal apparatus.

Next, description is made for the processing at step S5 in FIG. 1, that is, the processing of setting the communication setting information of the terminal apparatus 13 with reference to a flow chart in FIG. 13. The processing of the flow chart in FIG. 13 is performed, for example when a user inputs a command for setting wireless LAN communication through the operation section 206, or when application software requiring wireless LAN communication is initialized, or the like.

At step S151, the CPU 201 of the terminal apparatus 13 accesses the storage section 209 to determine whether or not the communication setting information is stored in the storage section 209, and ends the processing when the communication setting information is not stored in the storage section 209. In this event, an error display of the absence of the communication setting information may be made on the display 208.

At step S151, when the CPU 201 determines that the communication setting information is stored in the storage section 209, the processing proceeds to step S152. At step S152, the CPU 201 determines whether or not one or more pieces of the communication setting information is stored in the storage section 209. When one piece of the communication setting information is stored in the storage section 209, the processing proceeds to step S153.

At step S153, the CPU 201 determines whether or not the terminal apparatus 13 has a communication apparatus specified in the communication setting information. Specifically, for example as shown in the tag of <IEEE802.11a> in the third line from the top and the tag of </IEEE802.11a> in the sixth line from the top in the communication group formation information shown in FIG. 10, the type of the wireless communication is defined in the communication setting information. Then, the CPU 201 determines whether or not the wireless communication section 210 can perform wireless communication of the type defined in the communication group formation information. As a result, when the CPU 201 determines that a communication apparatus specified in the communication setting information is possessed, the processing proceeds to step S154 where the CPU 201 performs communication setting of the wireless LAN based on the communication group formation information. Thereafter, the terminal apparatus 13 can perform communication with the access point 11 through the wireless LAN with the setting performed here.

At step S153, when the CPU 201 determines that a communication apparatus specified in the communication setting information is not possessed, step S154 is skipped to end the processing. At this point, an error display indicating that the terminal apparatus 13 does not a communication apparatus specified in the communication group setting information may be made on the display 208.

At step S152, when the CPU 201 determines that the communication setting information stored in the storage section 209 is not a single piece, that is, a plurality of pieces of the communication setting information are stored in the storage section 209, the processing proceeds to step S155.

At step S155, the CPU 201 reads the network name from the plurality pieces of the communication setting information stored in the storage section 209, causes the display 208 to display the list of the network names, and receives a selection of the network name from the user. At step S156, the CPU 201 waits until one network name is selected from the list of the network names. When the user selects the network name through the operation section 206, the processing proceeds to step S153, and the processing at step S153 and afterward is repeated for the communication setting information corresponding to the network name selected at step S156.

As described above, the terminal apparatus 13 performs the wireless communication setting based on the acquired communication setting information.

Figure 14:
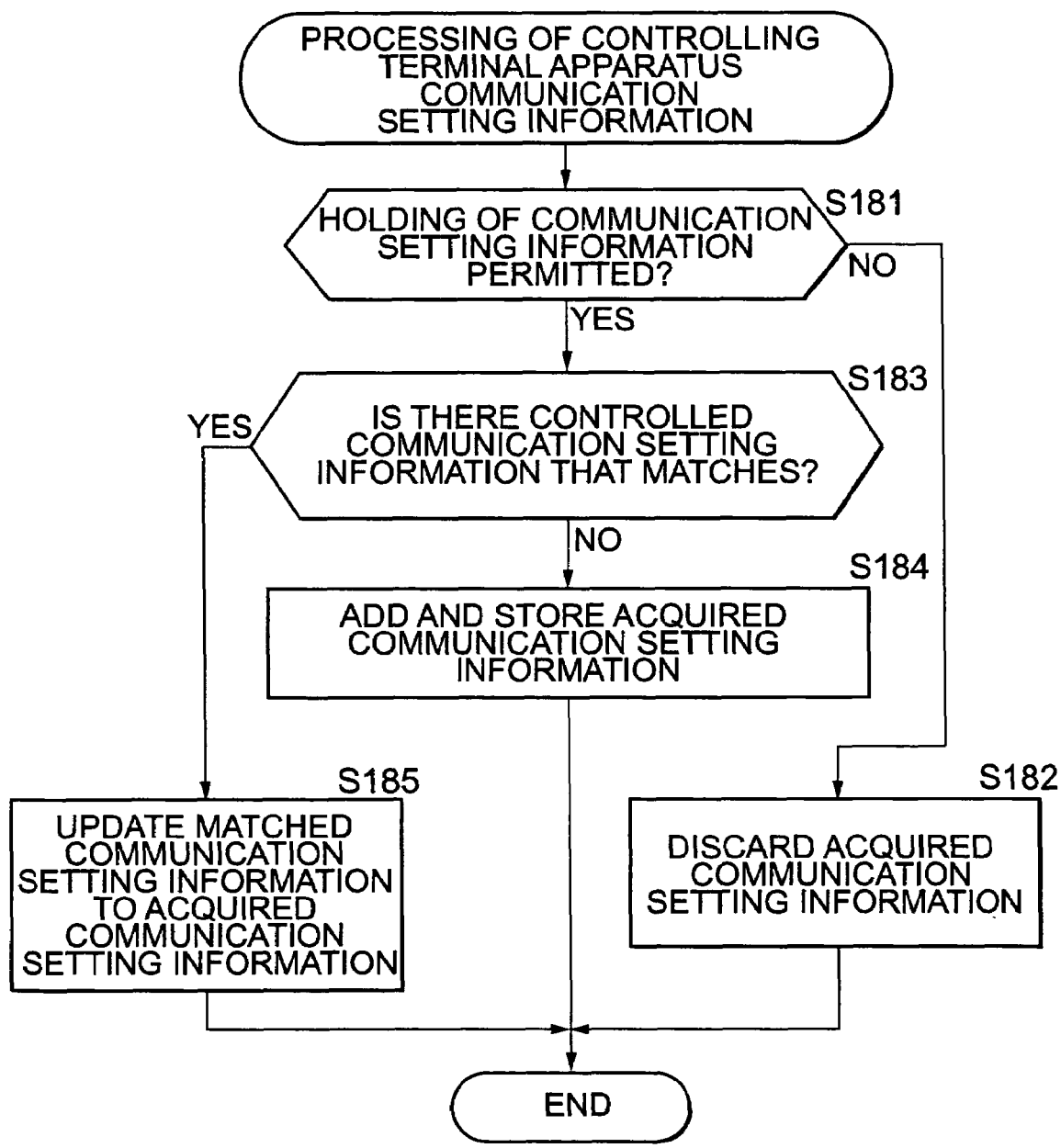
FIG. 14 is a flow chart of communication setting information managing processing of the terminal apparatus.

Next, description is made for the processing of managing the acquired communication setting information with reference to a flow chart in FIG. 14.

At step S181, the CPU 201 of the terminal apparatus 13 reads the management conditions included in the communication setting information and determines whether or not the holding permission is OK to determine whether or not the holding of the communication setting information is permitted. When the holding of the communication setting information is not permitted, the processing proceeds to step S182 where the communication setting information is deleted from the storage section 209 to end the processing.

At step S181, when the CPU 201 determines that the holding of the communication setting information is permitted, the processing proceeds to step S183 where the CPU 201 reads the management conditions included in the communication setting information and determines whether or not communication group formation information matching the communication group formation information included in the acquired communication setting information is present in the communication group formation information stored in the storage section 209 based on the information update condition. As a result, when the CPU 201 determines that communication group formation information matching the communication group formation information included in the acquired communication setting information is not present in the communication group formation information stored in the storage section 209, the processing proceeds to step S184 where the CPU 201 stores the acquired communication setting information in the storage section 209 and the processing is ended.

At step S183, when the CPU 201 determines that communication group formation information matching the communication group formation information included in the acquired communication setting information is present in the communication group formation information stored in the storage section 209, the processing proceeds to step S185. The CPU 201 deletes the communication group formation information determined to match the acquired communication setting information and the communication setting information including the communication group formation information from the storage section 209, stores newly acquired communication setting information in the storage section 209, and ends the processing.

The description of the processing of managing the communication setting information of the terminal apparatus 13 is completed.

While the aforementioned description is made for the case where the IC tag reader/writer 21 is contained in the access point 11 as an example, it is possible that they are not formed integrally in this manner, and the IC tag reader/writer 21 is formed as a separate body from the access point 11 and externally connected to the access point 11. Similarly, while the aforementioned description is made for the case where the IC tag reader/writer 31 is contained in the terminal apparatus 13 as an example, it is possible that they are not formed integrally in this manner, and the IC tag reader/writer 31 is formed as a separate body from the terminal apparatus 13 and externally connected to the access point 11.

In addition, while the aforementioned description is made for the example when the communication setting information is supplied from the access point 11 to the terminal apparatus 13 through the contactless communication using the tag 12, this does not mean that the present invention is limited to use of the tag 12 as a medium for supplying the communication setting information. As the medium for supplying the communication setting information, a semiconductor memory such as a memory card can be used, for example, other than the tag 12.

Specifically, a memory card drive is installed in each of the access point 11 and the terminal apparatus 13, and first, a user inserts a memory card into the memory card drive of the access point 11. The access point 11 causes the communication setting information held thereby to be stored in the memory card. Next, the user takes the memory card out of the memory card drive of the access point 11 and inserts it into the memory card drive of the terminal apparatus 13. The terminal apparatus 13 reads the communication setting information stored in the memory card and performs setting of wireless communication of the IEEE 802.11 scheme based on the communication setting information.

The above setting may be possible. It goes without saying that the communication setting information can be set from the access point 11 to the setting terminal 13 in a method similar to the aforementioned one with an arbitrary storage medium other than the memory card (for example, a magnetic disk, an optical disk, a magneto-optical disk).

The use of an arbitrary storage medium instead of the tag 12 in this manner is possible in all the examples of the communication system shown in FIGS. 15, 21, 23, 27, 29, and 33.

Figure 15:
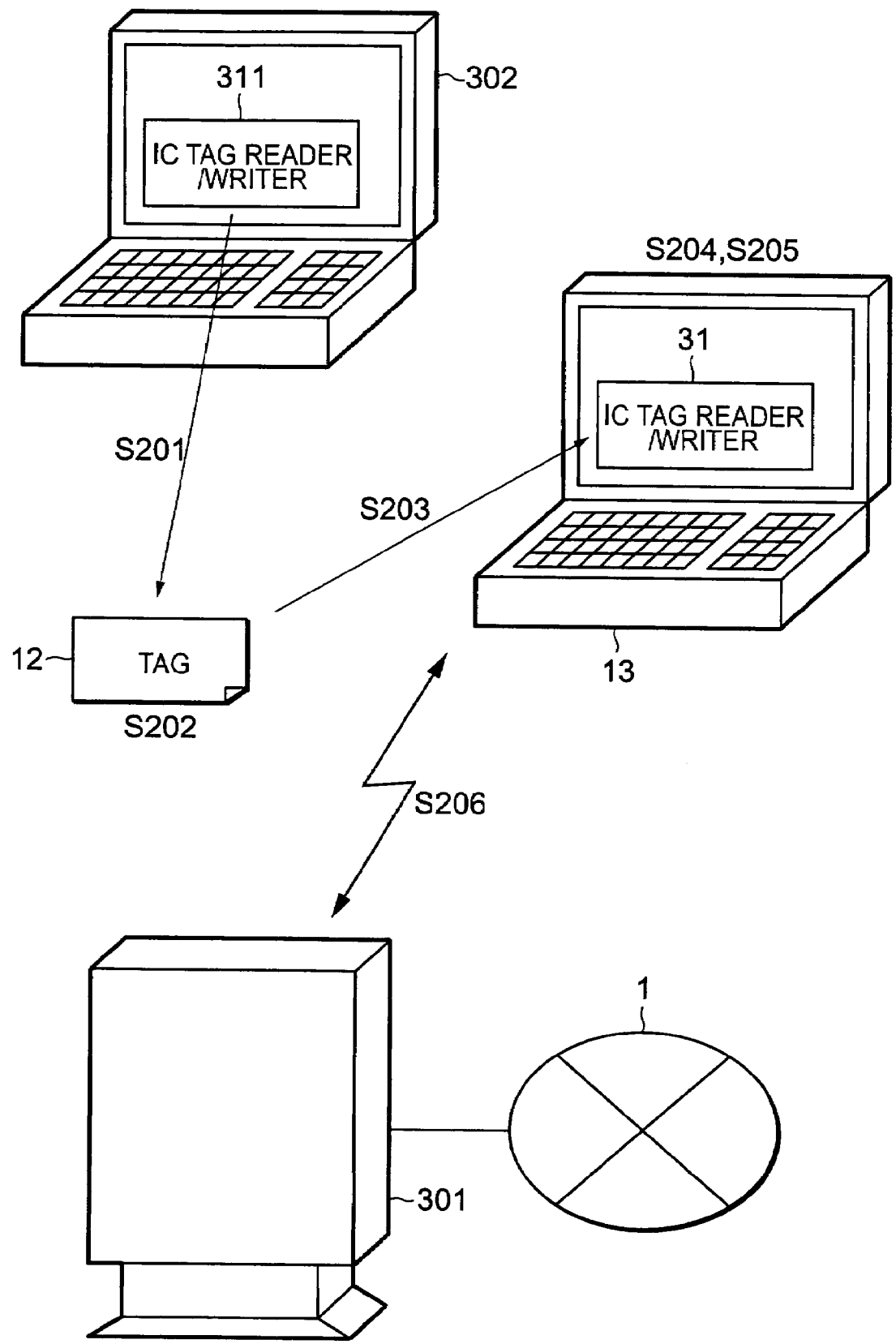
FIG. 15 is another diagram showing the configuration of a communication system in an embodiment to which the present invention is applied.

Next, FIG. 15 shows a variation of the communication system shown in FIG. 1. In FIG. 15, supply of the communication setting information to the tag 12 is performed by another setting terminal apparatus 302, not by an access point 301. Specifically, in FIG. 15, the access point 301 has no IC tag reader/writer. In addition, the setting terminal apparatus 302 is held by a manager who manages the communication system, for example. The manager previously causes an IC tag reader/writer 311 installed in the setting terminal apparatus 302 to storage communication setting information in the tag 12. A user utilizes the tag 12 having the communication setting information previously stored therein to cause the terminal apparatus 13 to acquire the communication setting information and perform setting of communication.

In the following, the outlines of the communication system shown in FIG. 15 are described. At step S201 in FIG. 15, the manager of the communication system puts the tag 12 closer to the IC tag reader/writer 311 of the setting terminal apparatus 302. The setting terminal apparatus 302 transmits the communication setting information to the tag 12 through the IC tag reader/writer 311. At step S202, the tag 12 stores the communication setting information received at step S201.

As step S203, the user puts the tag 12 having the communication setting information stored therein very close to the IC tag reader/writer 31 of the terminal apparatus 13. The IC tag reader/writer 31 receives the communication setting information stored in the tag 12 from the tag 12.

At step S204, the terminal apparatus 13 stores the communication setting information received at step S203, and step S205, performs communication setting for performing wireless communication of the IEEE 802.11 standard with the access point 301 based on communication group formation information included in the communication setting information.

At step S206, the terminal apparatus 13 performs wireless communication of the IEEE 802.11 standard with the access point 301 based on the communication setting performed at step S205.

The above setting may be possible.

Figure 16:
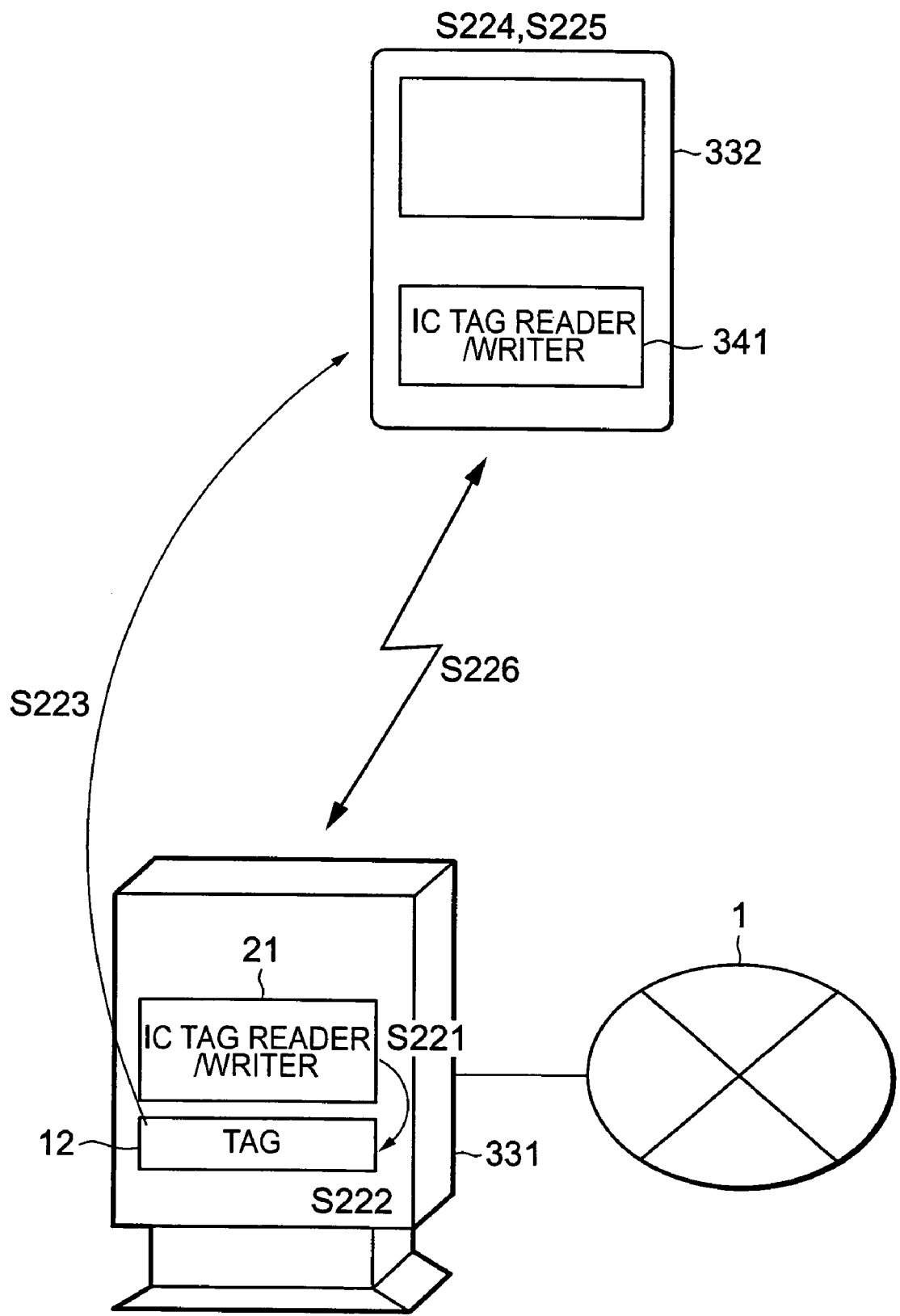
FIG. 16 is still another diagram showing the configuration of a communication system in an embodiment to which the present invention is applied.

In addition, FIG. 16 shows an example of a communication system different from those in FIGS. 1 and 15. In FIG. 16, the tag 12 is contained in an access point 331. Also, a user performs communication through the wireless LAN with the access point 331 by a portable terminal apparatus 332 which is lighter than the terminal apparatus 13 instead of the terminal apparatus 13. The basic internal configuration of the portable terminal apparatus 332 is similar to the terminal apparatus 13.

In the following, the outlines of the communication system in FIG. 16 are described. At step S221, the access point 331 transmits communication setting information to the tag 12 through the IC tag reader/writer 21. At step S222, the tag 12 stores the communication setting information received at step S221.

At step S223, the user puts the portable terminal apparatus 332 very close to the tag 12 of the access point 331. An IC tag reader/writer 341 of the portable terminal apparatus 332 acquires the communication setting information stored in the tag 12 from the tag 12.

At step S224, the portable terminal apparatus 332 stores the communication setting information received at step S223, and at step S225, performs communication setting for performing wireless communication of the IEEE 802.11 standard with the access point 331 based on communication group formation information included in the communication setting information.

At step S226, the portable terminal apparatus 332 performs wireless communication of the IEEE 802.11 standard with the access point 331 based on the communication setting performed at step S225.

The above setting may be possible.

Figure 17:
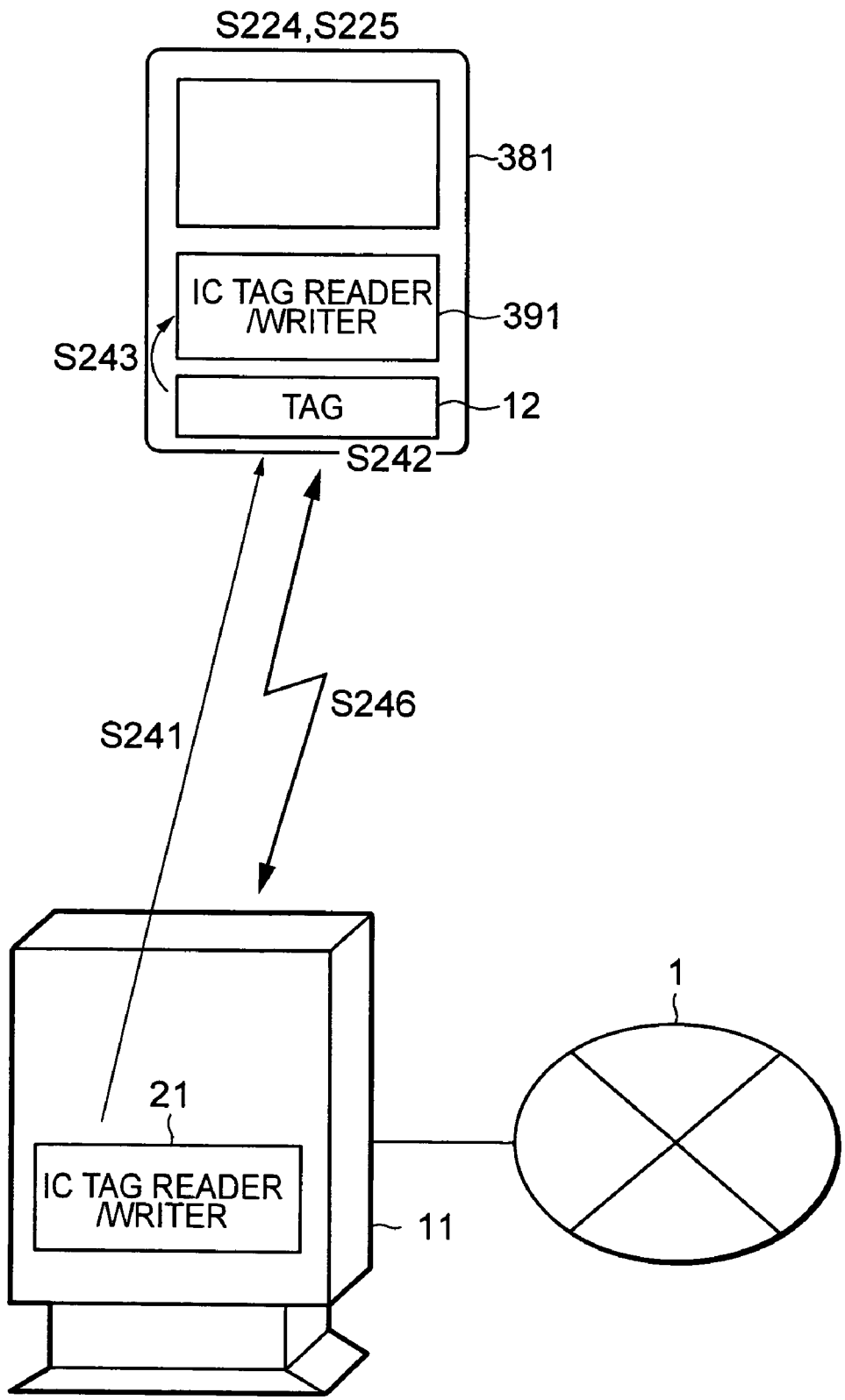
FIG. 17 is a further diagram showing the configuration of a communication system in an embodiment to which the present invention is applied.

In addition, FIG. 17 shows an example of a communication system different from those in FIGS. 1, 15, and 16. In FIG. 17, the tag 12 is contained in a portable terminal apparatus 381. The basic internal configuration of the portable terminal apparatus 381 is similar to that of the terminal apparatus 13 except that it contains the tag 12.

In the following, the outlines of the communication system in FIG. 17 are described. At step S241, a user puts the portable terminal apparatus 381 very close to the IC tag reader/writer 21 of the access point 11. The access point 11 transmits communication setting information to the tag 12 contained in the portable terminal apparatus 381 through the IC tag reader/writer 21. At step S241, the tag 12 stores the communication setting information received at step S241.

At step S243, an IC tag reader/writer 391 of the portable terminal apparatus 381 acquires the communication setting information stored in the tag 12 from the tag 12.

At step S244, the portable terminal apparatus 381 stores the communication setting information received at step S243, and at step S245, performs communication setting for performing wireless communication of the IEEE 802.11 standard with the access point 11 based on communication group formation information included in the communication setting information.

At step S246, the portable terminal apparatus 381 performs wireless communication of the IEEE 802.11 standard with the access point 11 based on the communication setting performed at step S245.

The above setting may be possible.

Figure 18:
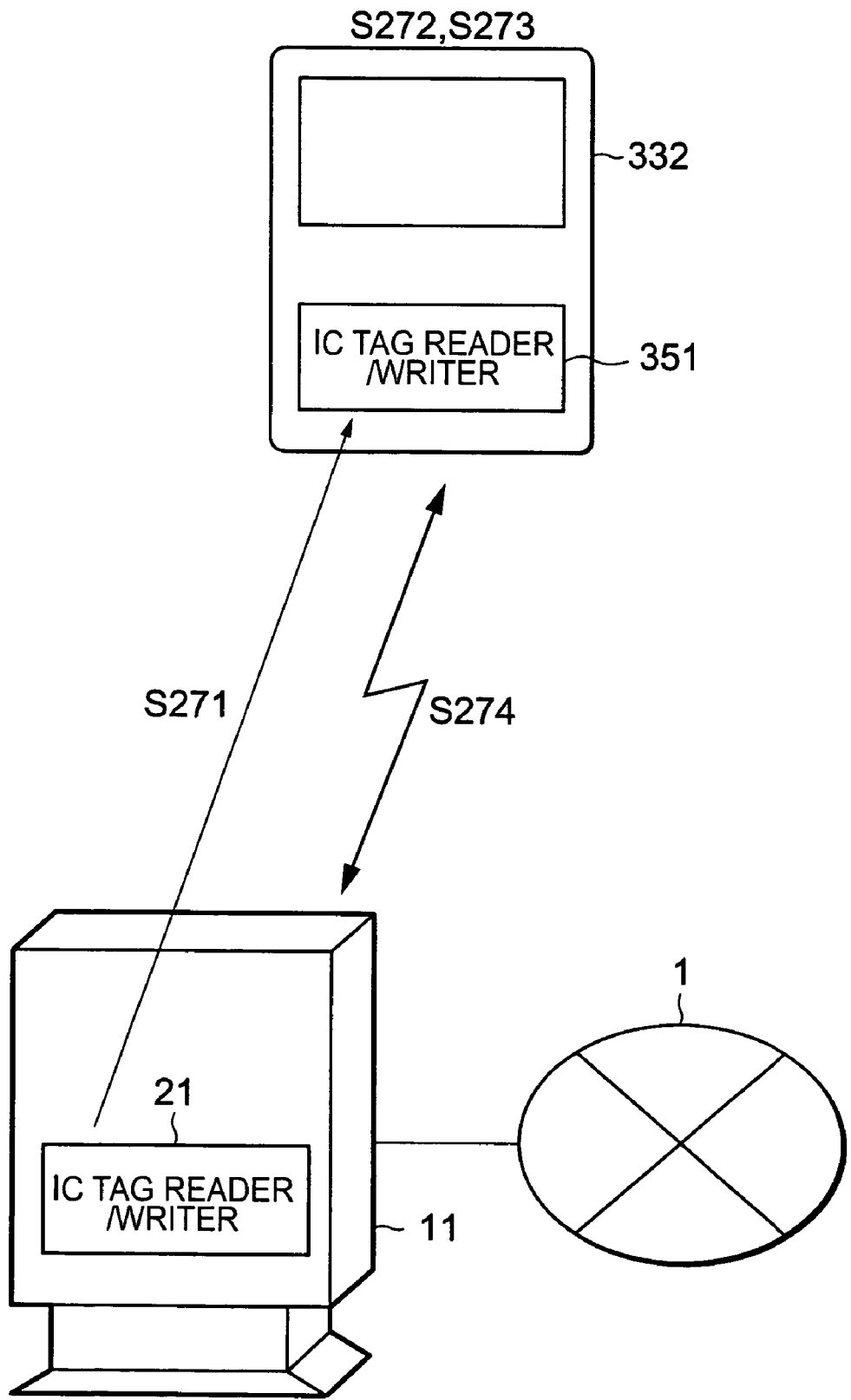
FIG. 18 is a still further diagram showing the configuration of a communication system in an embodiment to which the present invention is applied.

In addition, FIG. 18 shows an example of a communication system different from those in FIGS. 1 and 15 to 17. In FIG. 18, the tag 12 is not used, and a portable terminal apparatus 332 directly acquires communication setting information from the access point 11. The IC tag reader/writer 21 and an IC tag reader/writer 351 can directly perform communication and transmit/receive data.

In the following, the outlines of the communication system in FIG. 18 are described. At step S271, a user puts the portable terminal apparatus 332 very close to the IC tag reader/writer 21 of the access point 11. The access point 11 transmits communication setting information to the IC tag reader/writer 351 contained in the portable terminal apparatus 332 through the IC tag reader/writer 21. At step S272, the portable terminal apparatus 332 stores the communication setting information received through the IC tag reader/writer 351 at step S271.

At step S273, the portable terminal apparatus 332 performs communication setting for performing wireless communication of the IEEE 802.11 standard with the access point 11 based on communication group formation information included in the communication setting information.

At step S274, the portable terminal apparatus 332 performs wireless communication of the IEEE 802.11 standard with the access point 11 based on the communication setting performed at step S273.

Figure 19:
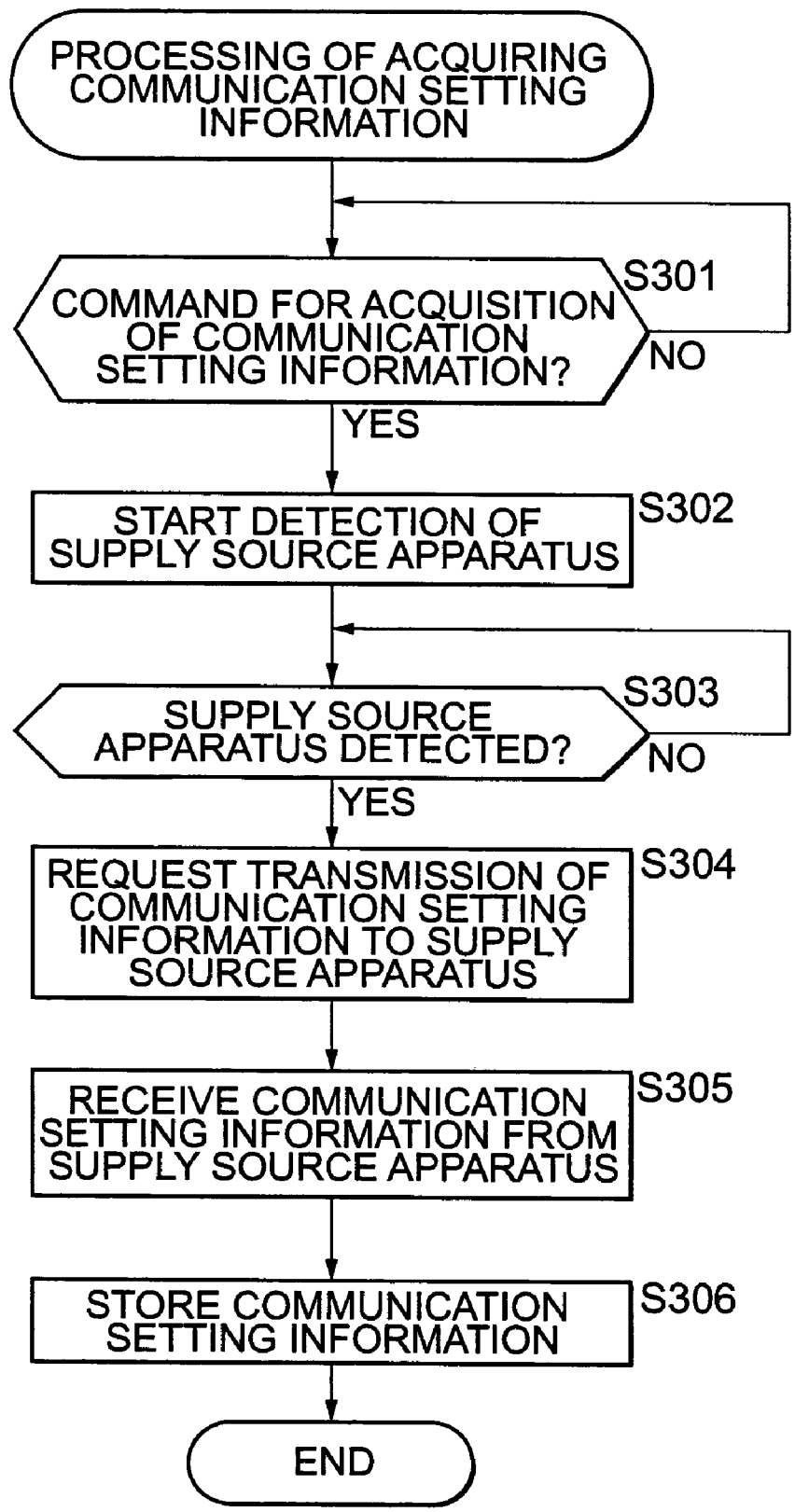
FIG. 19 is a flow chart for explaining communication setting information acquiring processing.

Next, description is made for the processing of acquiring the communication setting information of the portable terminal apparatus 332 in the communication system shown in FIG. 18 with reference to a flow chart in FIG. 19. In addition, description is also made for the processing of supplying the communication setting information of the access point 11 in the communication system shown in FIG. 18 with reference to a flow chart in FIG. 20.

For example, when a predetermined button forming an operation section is pressed to input a command for acquiring the communication group formation information, the portable terminal apparatus 332 starts detection of the supply source of the communication group formation information. Thus, at step S301 in FIG. 19, the potable terminal apparatus 332 determines whether or not the predetermined button of the operation section is pressed to command acquisition of the communication group formation information, and repeatedly performs the processing at step S301 and waits until the predetermined button of the operation section is pressed to command transmission of the communication group formation information.

When a user presses the predetermined button of the operation section, the portable terminal apparatus 332 determines that the predetermined button of the operation section is pressed to command acquisition of the communication group formation information at step S301, and the processing proceeds to step S302.

At step S302, the portable terminal apparatus 332 instructs the IC tag reader/writer 351 to start detection of the supply source of the communication group formation information. At step S303, the portable terminal apparatus 332 continues monitoring of the IC tag reader/writer 351 and waits until it receives a notification of detection of the supply source of the communication group formation information from the IC tag reader/writer 351.

Figure 20:
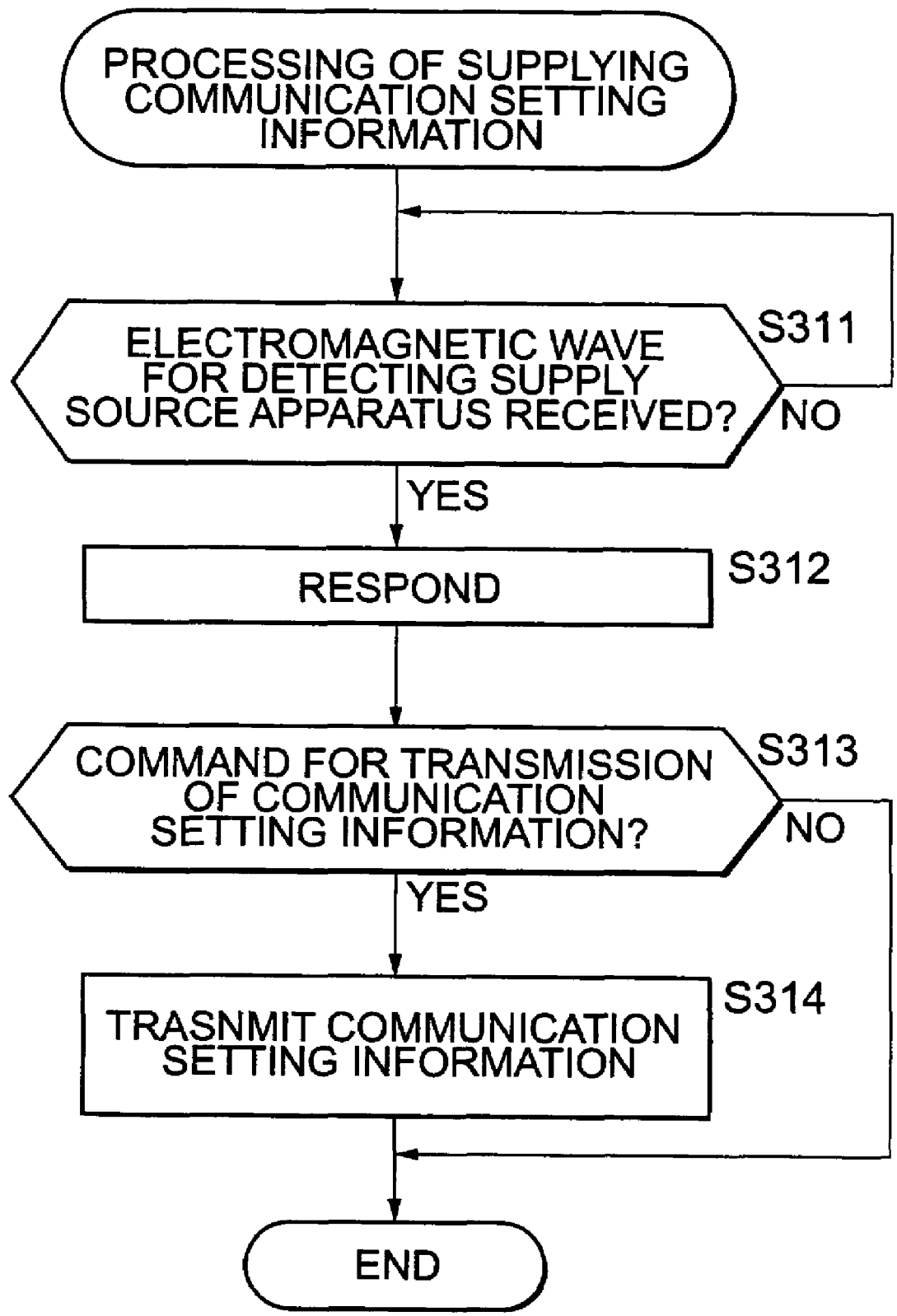
FIG. 20 is a flow chart for explaining communication setting information supply processing.

At this point, the CPU 101 of the access point 11 waits until it receives electromagnetic waves for detecting the supply source of the communication group formation information at step S311 in FIG. 20, and after reception of the electromagnetic wave for detecting the supply source of the communication group formation information, the processing proceeds to step S312 where it transmits a response signal through the IC tag reader/writer 21.

Upon reception of the response signal from the access point 11, the IC tag reader/writer 351 of the portable terminal apparatus 332 makes a notification to the CPU of the portable terminal apparatus 332. Then, at step S303, the portable terminal apparatus 332 determines that it receives the notification of the detection of the supply source of the communication group formation information from the IC tag reader/writer 351, and the processing proceeds to step S304 where the portable terminal apparatus 332 requests the communication setting information to the access point 11 through the IC tag reader/writer 351.

In this event, the CPU 101 of the access point 11 receives the request from the portable terminal apparatus 332, and at step S313, determines that a command for transmitting the communication setting information is received, and the processing proceeds to step S314. At step S314, the CPU 101 of the access point 11 reads the communication setting information from the storage section 109 and transmits it to the IC tag reader/writer 351 of the portable terminal apparatus 332 through the IC tag reader/writer 21.

The IC tag reader/writer 351 of the portable terminal apparatus 332 receives the communication setting information from the IC tag reader/writer 21 of the access point 11 at step S305 in FIG. 19. Then, at step S306, the portable terminal apparatus 332 stores the communication setting information received at step S305 in the storage section.

When the CPU 101 of the access point 11 determines that a command for transmitting the communication setting information is not received at step S313, the CPU 101 ends the processing.

As described above, the communication setting information is directly supplied from the access point 11 to the portable terminal apparatus 332.

In the aforementioned description, when the predetermined operation is input by the operation section, the portable terminal apparatus 332 starts the detection processing of the tag 12. However, it does not necessarily start the detection processing of the tag 12 when the predetermined operation is input. That is, the portable terminal apparatus 332 may always detect the tag 12. The portable terminal apparatus 332 always performing the detection of the tag 12 is effective, for example when the portable terminal apparatus 332 is connected to a power source for home use.

As shown in FIGS. 18 to 20, when the apparatus held by the user is a small and light-weight apparatus such as the portable terminal apparatus 332, the communication setting information can be transmitted directly from the access point 11 to the portable terminal apparatus 332 without purposely using the tag 12. The method shown in FIGS. 18 to 20 is also possible between the terminal apparatus 13 and the access point 11 if the terminal apparatus 13 can be put very close to the access point 11.

Figure 21:
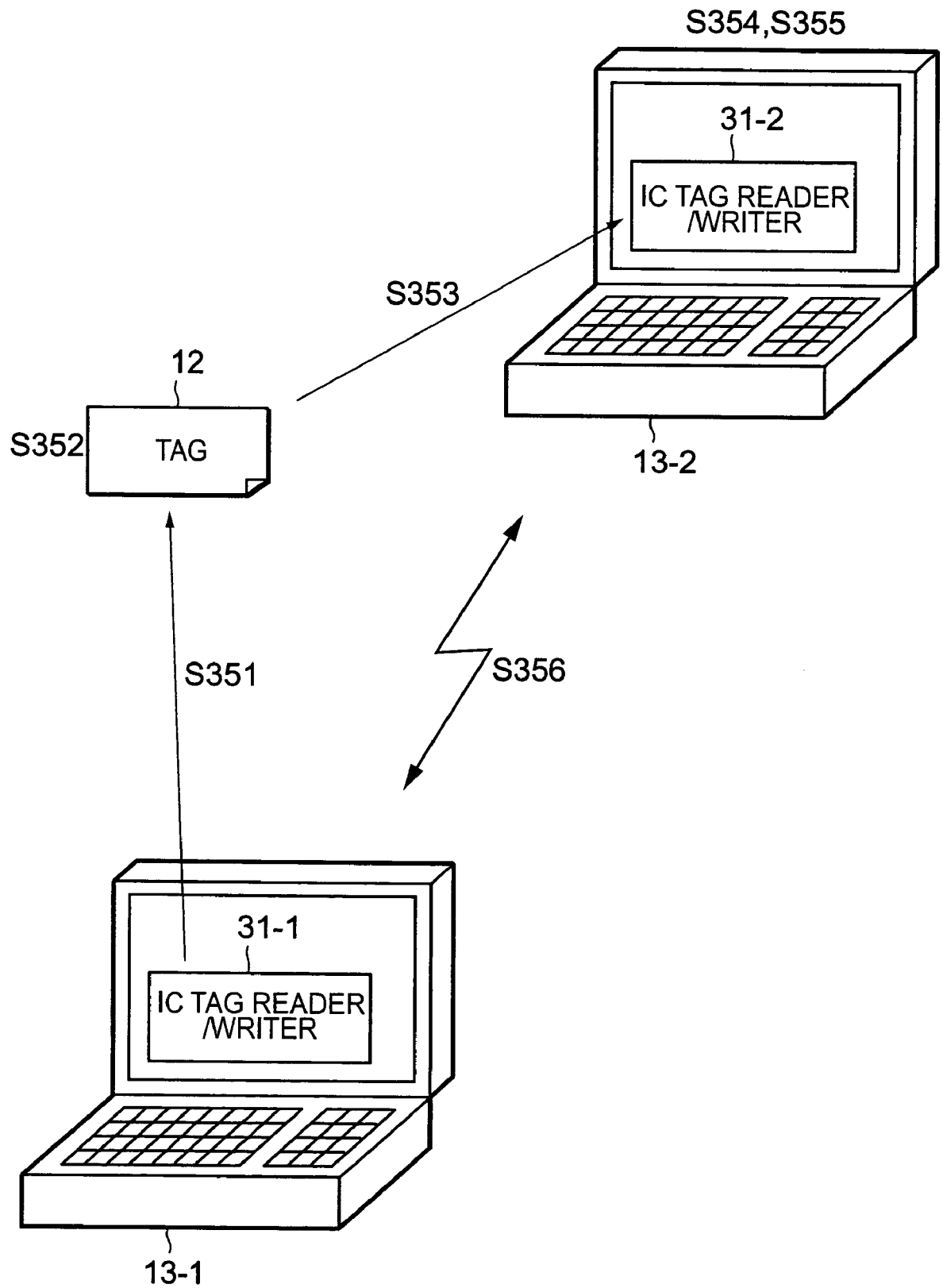
FIG. 21 is a diagram showing the configuration of a communication system in an embodiment to which the present invention is applied.

The communication systems shown in FIGS. 1, and 15 to 18 described above are described for the case where the present invention is applied to wireless communication in the Infrastructure mode. Thus, next, description is made for the case where the present invention is applied to wireless communication in the Ad hoc mode. FIG. 21 shows outlines of communication setting when wireless communication in the Ad hoc mode is performed between a terminal apparatus 13-1 and a terminal apparatus 13-2.

In the following, description is made for the outlines of communication setting when wireless communication in the Ad hoc mode is performed between the terminal apparatus 13-1 and the terminal apparatus 13-2 with reference to FIG. 21. The internal configurations of the terminal apparatus 13-1 and the terminal apparatus 13-2 are similar to that of the terminal apparatus 13. In addition, FIG. 21 shows an example when the terminal apparatus 13-1 previously holds communication setting information.

At step S351 in FIG. 21, a user puts the tag 12 very close to an IC tag reader/writer 31-1 of the terminal apparatus 13-1. The IC tag reader/writer 31-1 performs contactless communication with the tag 12 at close range and transmits the communication setting information to the tag 12. The communication setting information includes the communication group formation information shown in FIG. 2 and the management conditions shown in FIG. 3.

At step S352, the tag 12 stores the communication setting information received from the IC tag reader/writer 31-1 at step S351.

At step S353, the user puts the tag 12 having the communication setting information stored therein very close to an IC tag reader/writer 31-2 of the terminal apparatus 13-2. The IC tag reader/writer 31-2 receives the communication setting information stored in the tag 12 from the tag 12.

At step S354, the terminal apparatus 13-2 stores the communication setting information received at step S353, and performs communication setting for performing wireless communication of the IEEE 802.11 standard with the terminal apparatus 13-1 based on the communication group formation information included in the communication setting information at step S355.

At step S356, the terminal apparatus 13-2 performs wireless communication of the IEEE 802.11 standard with the terminal apparatus 13-1 based on the communication setting performed at step S355.

As described above, the communication setting information is supplied from the terminal apparatus 13-1 to the terminal apparatus 13-2 through the tag 12, thereby allowing the user to perform the communication setting easily and quickly without burdensome entry of the setting information. In addition, the user follows the procedure of putting the tag 12 over the IC tag reader/writer 31-1 of the terminal apparatus 13-1, and then putting the tag 12 over the IC tag reader/writer 31-2 of the terminal apparatus 13-2, so that the user can understand more intuitively the communication setting being performed between the terminal apparatus 13-1 and the terminal apparatus 13-2. In addition, by doing this, communication setting can be performed between desired apparatuses (in FIG. 21, between the terminal apparatus 13-1 and the terminal apparatus 13-2) without fail. Thus, the user can prevent erroneous connection of the terminal apparatus 13-2 to an apparatus other than the terminal apparatus 13-1.

Figure 22:
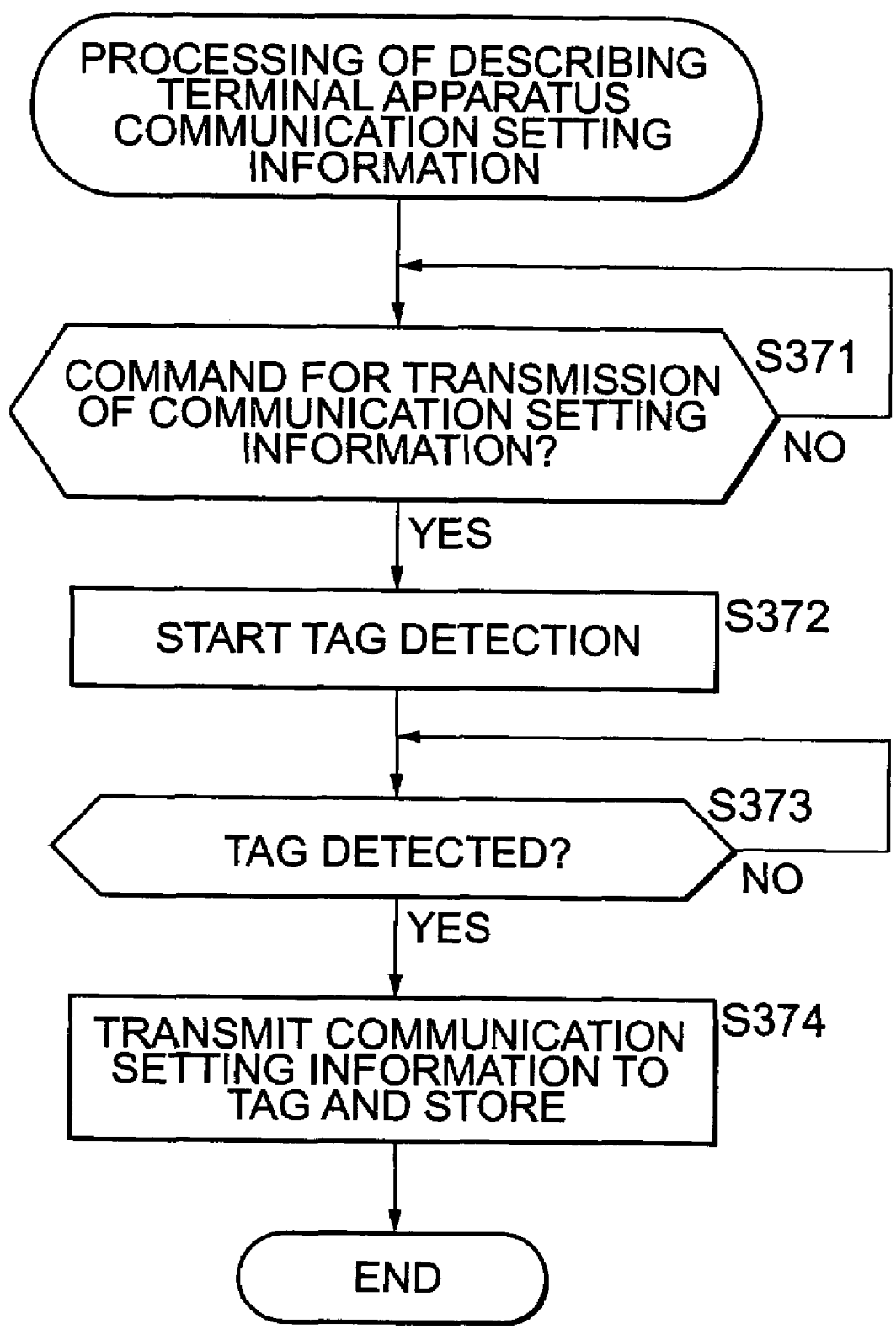
FIG. 22 is a flow chart for explaining communication setting information description processing of the terminal apparatus.

Next, description is made for the processing at step S351 in FIG. 21, that is, the processing of the communication setting information description of the terminal apparatus 13-1 with reference to a flow chart in FIG. 22. The processing of the communication setting information description of the tag 12 at this point is the same as that described with reference to FIG. 9.

The terminal apparatus 13-1 starts detection of the tag 12, for example when a predetermined key of the keyboard forming the operation section 206 is pressed to input a command for transmitting the communication group formation information. Then, at step S371 in FIG. 22, a CPU 201 of the terminal apparatus 13-1 monitors the operation section 206 to determine whether or not the predetermined key of the operation section 206 is pressed to command transmission of the communication group formation information. The processing at step S371 is repeatedly performed to wait until the predetermined key of the operation section 206 is pressed to command transmission of the communication group formation information.

When a user presses the predetermined key of the operation section 206, the CPU 201 determines that the predetermined key of the operation section 206 is pressed to command transmission of the communication group formation information at step S371, and the processing proceeds to step S372.

At step S372, the CPU 201 instructs the IC tag reader/writer 31-1 to start detection of the tag 12. At step S373, the CPU 201 continues monitoring the IC tag reader/writer 31-1 to wait until it receives a notification of detection of the tag 12 from the IC tag reader/writer 31-1.

In this event, the microcomputer 161 of the tag 12 held by the user very close to the IC tag reader/writer 31-1 waits until it receives electromagnetic waves for detecting the tag 12 at step S71. After it receives the electromagnetic waves for detecting the tag 12, the processing proceeds to step S72 where it transmits a response signal through the antenna resonance circuit section 151.

Upon reception of the response signal from the tag 12, the IC tag reader/writer 31-1 of the terminal apparatus 13-1 makes a notification to the CPU 201. Then, at step S373, the CPU 201 of the terminal apparatus 13-1 determines that the notification of the detection of the tag 12 is received from the IC tag reader/writer 31-1. The processing proceeds to step S374 where the CPU 201 reads the communication setting information stored in the storage section 209 and supplies it to the IC tag reader/writer 31-1. The IC tag reader/writer 31-1 transmits the supplied communication setting information to the tag 12.

The microcomputer 161 of the tag 12 determines whether or not the communication setting information and a command for storing the communication setting information are received from the terminal 13-1 at step S73, and when the communication setting information and the command for storing the communication setting information are received from the terminal apparatus 13-1, the processing proceeds to step S74 where it stores the received communication setting information in the EEPROM 277.

As described above, the communication setting information is transmitted from the terminal apparatus 13-1 to the tag 12.

In the aforementioned description, when the terminal apparatus 13-1 starts the detection processing of the tag 12 when the predetermined operation is input from the operation section. However, the terminal apparatus 13-1 does not necessarily start the detection processing of the tag 12 when the predetermined operation is input. That is, the terminal apparatus 13-1 may always detect the tag 12. The terminal apparatus 13-1 always performing the detection of the tag 12 is effective, for example when it is connected to a power source for home use.

Figure 23:
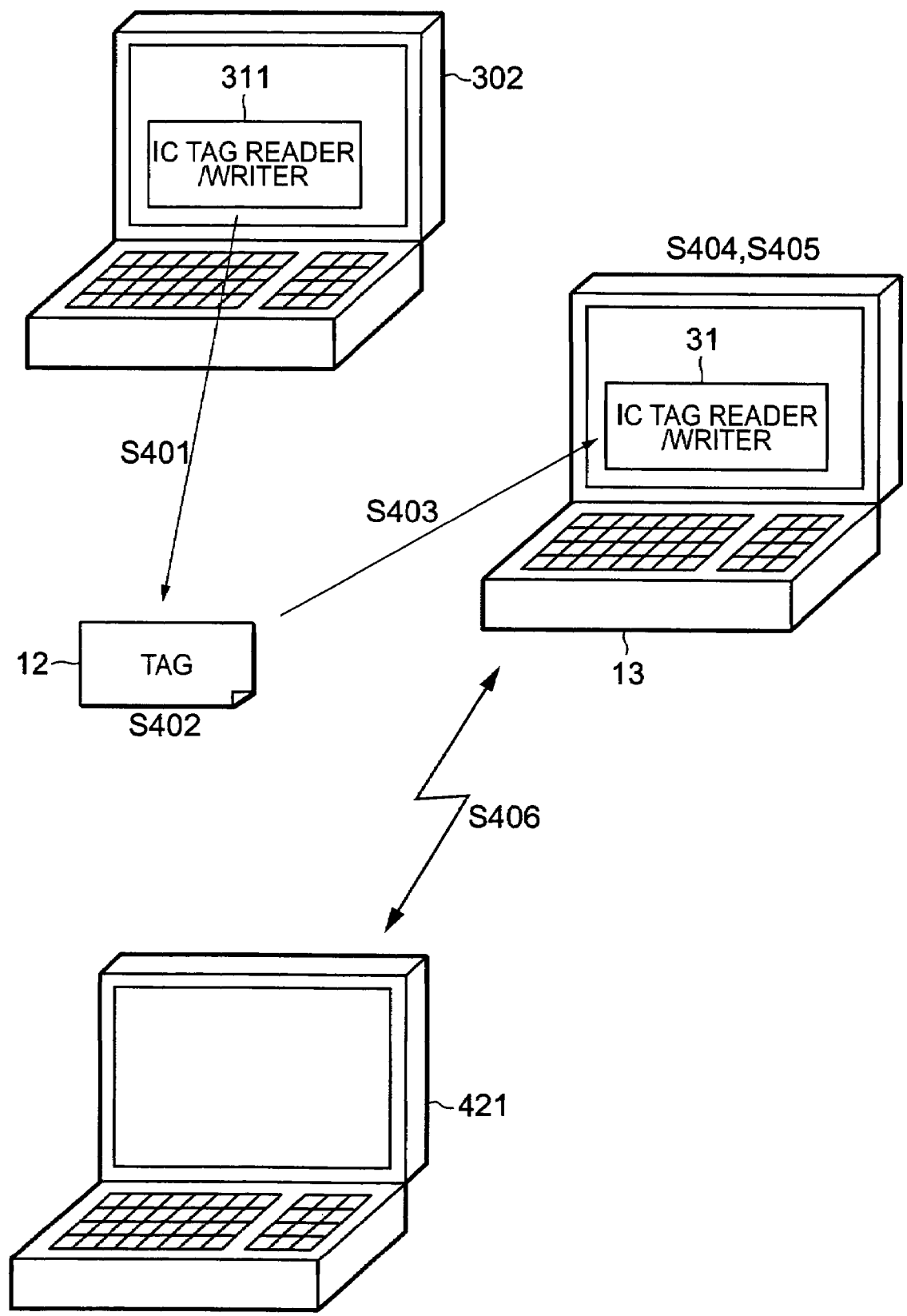
FIG. 23 is a diagram showing the configuration of a communication system in an embodiment to which the present invention is applied.

Next, FIG. 23 shows a variation of the communication system shown in FIG. 21. In FIG. 23, supply of the communication setting information to the tag 12 is performed by another setting terminal apparatus 302, not by the terminal apparatus 13-1. Specifically, in FIG. 23, a terminal apparatus 421 has no IC tag reader/writer. In addition, the setting terminal apparatus 302 is held by a manager who manages the communication system, for example. The manager causes the IC tag reader/writer 311 previously installed in the setting terminal apparatus 302 to storage the communication setting information in the tag 12. A user utilizes the tag 12 having the communication setting information previously stored therein to cause the terminal apparatus 13 to acquire the communication setting information and to perform setting of communication. The internal configuration of the terminal apparatus 421 is similar to that of the terminal apparatus 13 except that no IC tag reader/writer is installed.

In the following, the outlines of the communication system shown in FIG. 23 are described. At step S401 in FIG. 23, the manager of the communication system puts the tag 12 closer to the IC tag reader/writer 311 of the setting terminal apparatus 302. The setting terminal apparatus 302 transmits the communication setting information to the tag 12 through the IC tag reader/writer 311. At step S402, the tag 12 stores the communication setting information received at step S401.

As step S403, the user puts the tag 12 having the communication setting information stored therein very close to the IC tag reader/writer 31 of the terminal apparatus 13-1. The IC tag reader/writer 31 receives the communication setting information stored in the tag 12 from the tag 12.

At step S404, the terminal apparatus 13 stores the communication setting information received at step S403, and step S405, performs communication setting for performing wireless communication of the IEEE 802.11 standard with the terminal apparatus 421 based on communication group formation information included in the communication setting information.

At step S406, the terminal apparatus 13 performs wireless communication of the IEEE 802.11 standard with the terminal apparatus 421 based on the communication setting performed at step S205.

The above setting may be possible.

Figure 24:
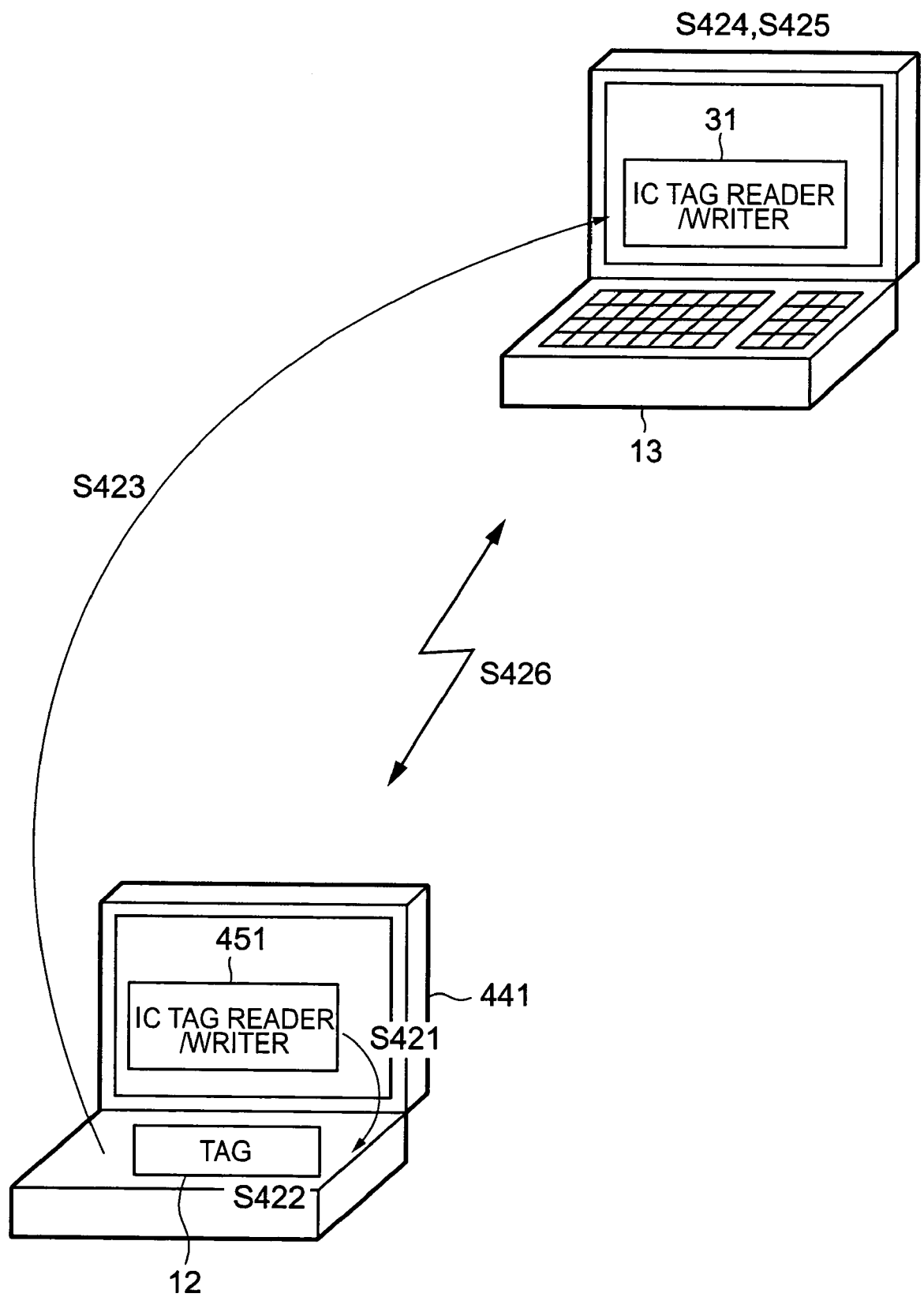
FIG. 24 is another diagram showing the configuration of a communication system in an embodiment to which the present invention is applied.

In addition, FIG. 24 shows an example of a communication system different from those in FIGS. 21 and 23. In FIG. 24, the tag 12 is contained in a terminal apparatus 441.

In the following, the outlines of the communication system in FIG. 24 are described. At step S421, the terminal apparatus 441 transmits communication setting information to the tag 12 through an IC tag reader/writer 451. At step S422, the tag 12 stores the communication setting information received at step S421.

At step S423, a user puts the terminal apparatus 13 very close to the tag 12 contained in the terminal apparatus 441. The IC tag reader/writer 31 of the terminal apparatus 13 acquires the communication setting information stored in the tag 12 from the tag 12.

At step S424, the terminal apparatus 13 stores the communication setting information received at step S423, and at step S425, performs communication setting for performing wireless communication of the IEEE 802.11 standard with the terminal apparatus 441 based on communication group formation information included in the communication setting information.

At step S426, the terminal apparatus 13 performs wireless communication of the IEEE 802.11 standard with the terminal apparatus 441 based on the communication setting performed at step S425.

The above setting may be possible.

Figure 25:
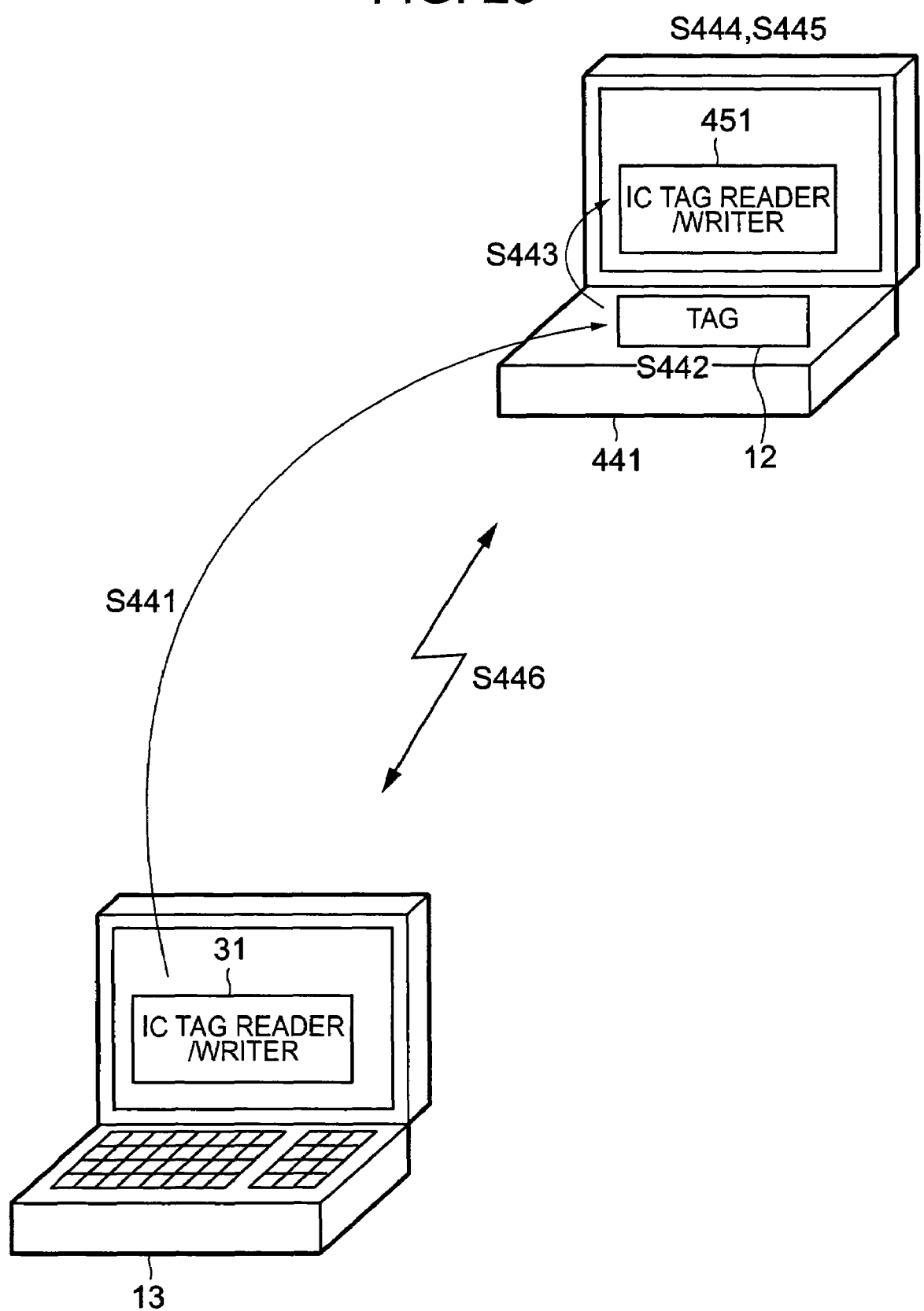
FIG. 25 is still another diagram showing the configuration of a communication system in an embodiment to which the present invention is applied.

In addition, FIG. 25 shows an example of a communication system different from those in FIGS. 21, 23, and 24. In FIG. 25, the terminal apparatus 13 shown in FIG. 24 previously holds communication setting information, and the communication setting information is supplied from the terminal apparatus 13 to the terminal apparatus 441 through the tag 12.

In the following, the outlines of the communication system in FIG. 25 are described. At step S441, a user puts the terminal apparatus 441 very close to the IC tag reader/writer 31 of the terminal apparatus 13. The terminal apparatus 13 transmits communication setting information to the tag 12 contained in the terminal apparatus 441 through the IC tag reader/writer 31. At step S442, the tag 12 stores the communication setting information received at step S441.

At step S443, the IC tag reader/writer 391 of the terminal apparatus 441 acquires the communication setting information stored in the tag 12 from the tag 12.

At step S444, the terminal apparatus 441 stores the communication setting information received at step S443, and at step S445, performs communication setting for performing wireless communication of the IEEE 802.11 standard with the terminal apparatus 13 based on communication group formation information included in the communication setting information.

At step S446, the terminal apparatus 441 performs wireless communication of the IEEE 802.11 standard with the terminal apparatus 13 based on the communication setting performed at step S445.

The above setting may be possible.

Figure 26:
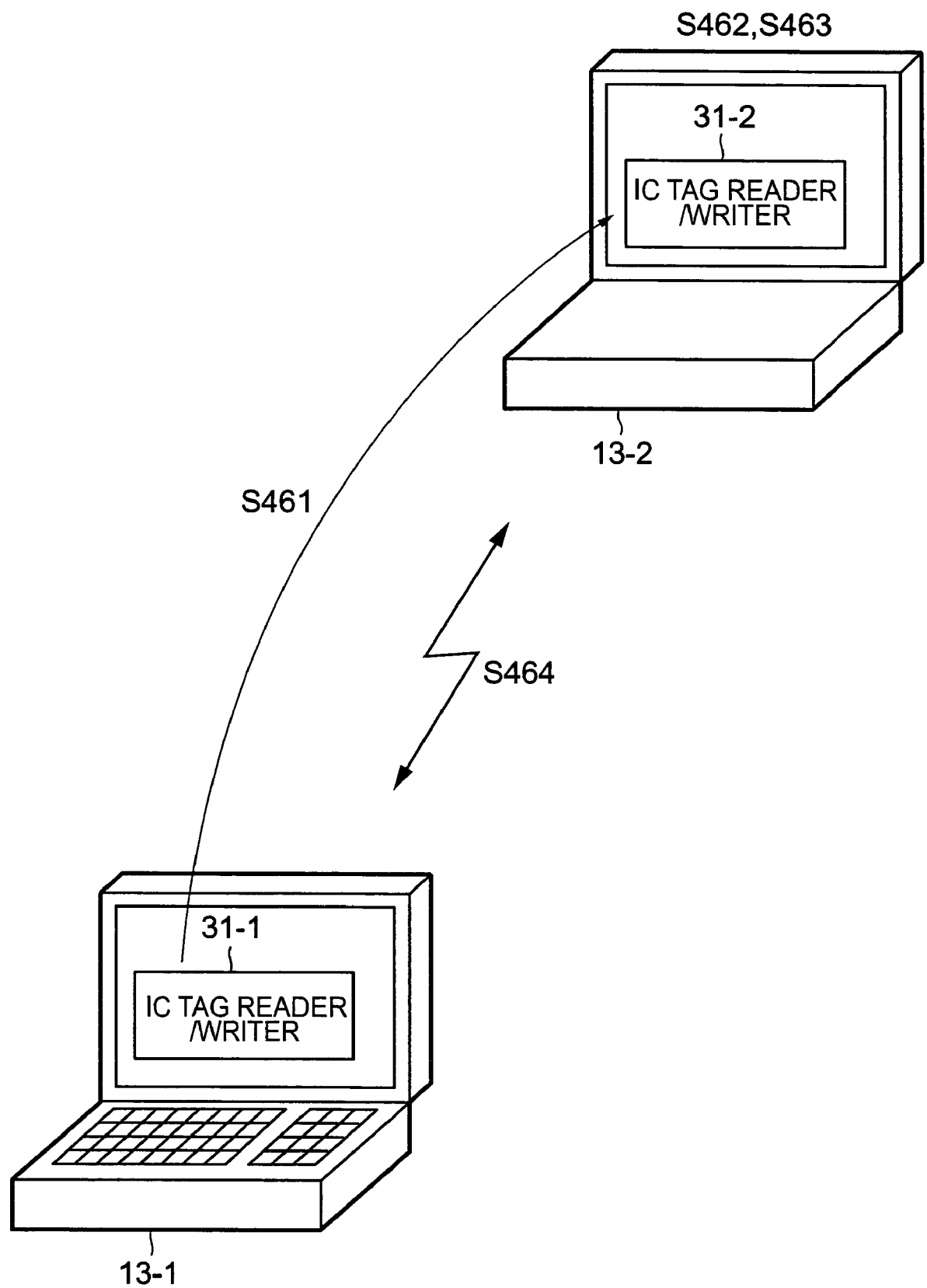
FIG. 26 is a diagram showing the configuration of a communication system in an embodiment to which the present invention is applied.

In addition, FIG. 26 shows an example of a communication system different from those in FIGS. 21, and 23 to 25. In FIG. 26, the tag 12 is not used, and the terminal apparatus 13-2 directly acquires communication setting information from the terminal apparatus 13-1. The IC tag reader/writer 31-1 and the IC tag reader/writer 31-2 can directly perform communication and transmit/receive data.

In the following, the outlines of the communication system in FIG. 26 are described. At step S461, a user puts the terminal apparatus 13-2 very close to the IC tag reader/writer 31-1 of the terminal apparatus 13-1. The terminal apparatus 13-1 transmits communication setting information to the IC tag reader/writer 31-2 contained in the terminal apparatus 13-2 through the IC tag reader/writer 31-1. At step S462, the terminal apparatus 13-2 stores the communication setting information received through the IC tag reader/writer 31-2 at step S461.

At step S463, the terminal apparatus 13-2 performs communication setting for performing wireless communication of the IEEE 802.11 standard with the terminal apparatus 13-1 based on communication group formation information included in the communication setting information.

At step S464, the terminal apparatus 13-2 performs wireless communication of the IEEE 802.11 standard with the terminal apparatus 13-1 based on the communication setting performed at step S463.

The above setting may be possible.

Figure 27:
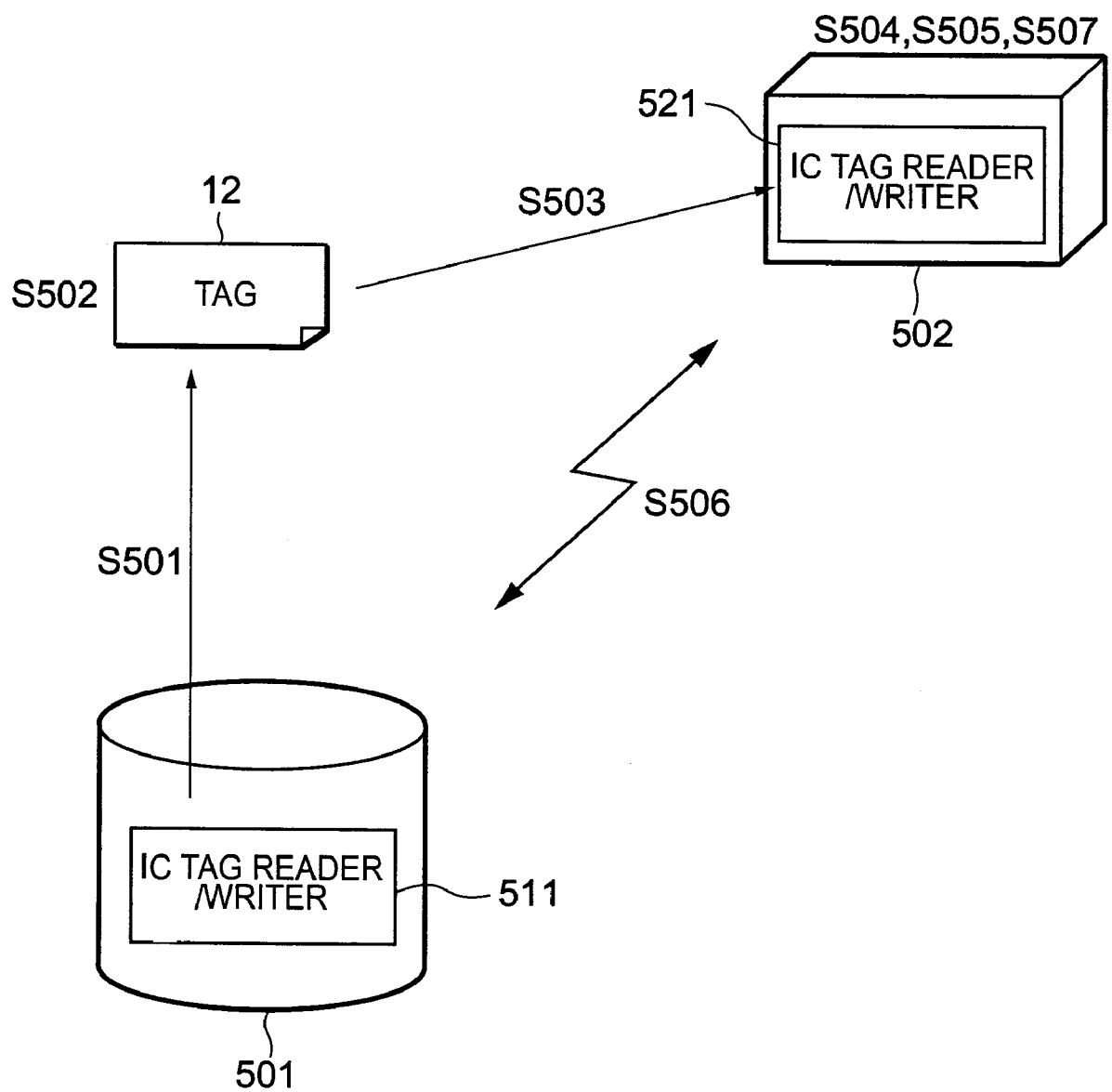
FIG. 27 is another diagram showing the configuration of a communication system in an embodiment to which the present invention is applied.

Next, FIG. 27 shows an application of the communication system in the Ad hoc mode. In FIG. 27, a playback data server 501 holds contents, for example movies and music, and supplies the contents to a data playback terminal apparatus 502 through wireless communication of the IEEE 802.11 standard. In addition, the playback data server 501 contains an IC tag reader/writer 511 to perform communication with the tag 12 at close range.

The data playback terminal apparatus 502 receives the contents from the playback data server 501 through the wireless communication of the IEEE 802.11 standard and plays them back. A user can view and listen to the contents.

Next, the outlines of the communication system shown in FIG. 27 are described.

At step S501 in FIG. 27, a user puts the tag 12 very close to an IC tag reader/writer 551 of the playback data server 501. The IC tag reader/writer 511 performs contactless communication with the tag 12 at close range and transmits communication setting information to the tag 12. The communication setting information includes communication group formation information and management conditions shown in FIG. 28.

The management conditions in FIG. 28 are described in the XML form. In a description example of the management conditions shown in FIG. 28, the tags of <holding permission> </holding permission> in the first line from the top correspond to the holding permission in FIG. 3. The character string "NG" sandwiched between the tags of <holding permission> </holding permission> indicates that the holding of the communication setting information is not possible. The tags of <supply permission> </supply permission> in the second line from the top in FIG. 28 correspond to the supply permission in FIG. 3. The character "NG" sandwiched between the tags of <supply permission> </supply permission> indicates that the supply of the communication setting information to another apparatus is not possible.

The tags of <communication validity term> </communication validity term> in the third line from the top in FIG. 28 correspond to the communication validity term in FIG. 3, and the character string "Unlimited" sandwiched between the tags of <communication validity term> </communication validity term> indicates that the communication validity term is not limited. The tags of <information validity term> </information validity term> in the fourth line from the top in FIG. 28 correspond to the information validity term in FIG. 3, and the character string "INVALID" sandwiched between the tags of <information validity term> </information validity term> indicates that the communication group formation information is once set to the data playback terminal apparatus 502 and then become invalid. The tags of <information update condition> </information update condition> in the fifth line from the top in FIG. 28 correspond to the information update condition in FIG. 3, and the character string "INVALID" sandwiched between the tags of <information update condition> </information update condition> indicates that the communication group formation information is not updated.

Returning to FIG. 27, at step S502, the tag 12 stores the communication setting information received from the IC tag reader/writer 511 at step S501.

At step S503, the user puts the tag 12 having the communication setting information stored therein very close to an IC tag reader/writer 521 of the data playback terminal apparatus 502. The IC tag reader/writer 521 receives the communication setting information stored in the tag 12 from the tag 12.

At step S504, the data playback terminal apparatus 502 stores the communication setting information received at step S503, and at step S505, performs communication setting for performing wireless communication in the IEEE 802.11 standard with the playback data server 501 based on the communication group setting information included in the communication setting information.

At step S506, the data playback terminal apparatus 502 performs wireless communication in the IEEE 802.11 standard with the playback data server 501 based on the communication setting performed at step S505 to acquire the contents data from the playback data server 501.

At step S507, the data playback terminal apparatus 502 plays back the contents acquired from the playback data server 501 for allowing the user to view and listen to them.

As described above, the communication system of the present invention can be applied.

Figure 29:
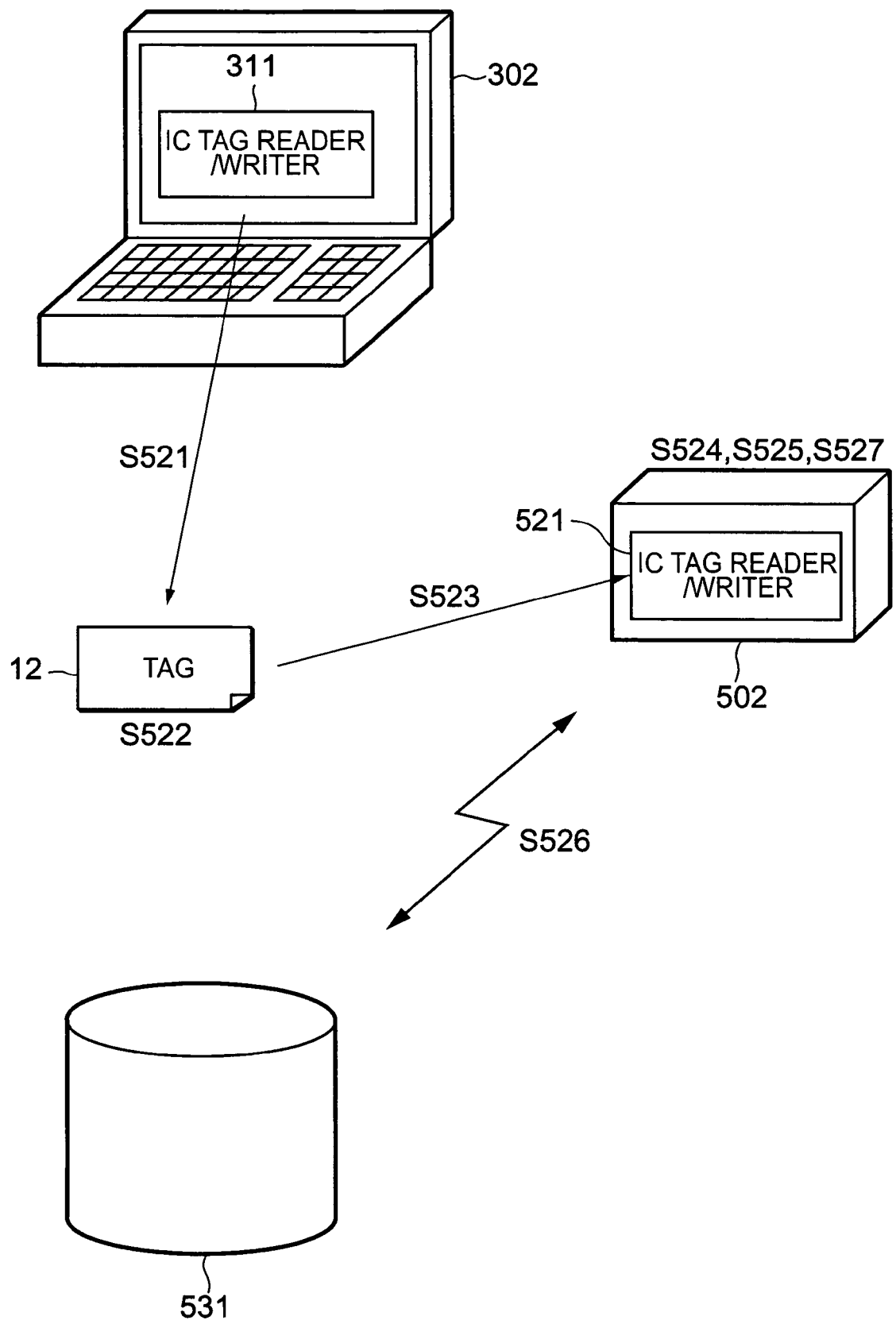
FIG. 29 is a diagram showing the configuration of a communication system in an embodiment to which the present invention is applied.

Next, FIG. 29 shows a variation of the communication system shown in FIG. 27. In FIG. 29, supply of the communication setting information to the tag 12 is performed by another setting terminal apparatus 302, not by the playback data server 501. Specifically, in FIG. 29, a playback data server 531 has no IC tag reader/writer. In addition, the setting terminal apparatus 302 is held by a manager who manages the communication system, for example. The manager causes the IC tag reader/writer 311 previously installed in the setting terminal apparatus 302 to storage the communication setting information in the tag 12. A user utilizes the tag 12 having the communication setting information previously stored therein to cause the data playback terminal apparatus 502 to acquire communication setting information and to perform setting of communication.

In the following, the outlines of the communication system shown in FIG. 29 are described. At step S521 in FIG. 29, the manager of the communication system puts the tag 12 closer to the IC tag reader/writer 311 of the setting terminal apparatus 302. The setting terminal apparatus 302 transmits the communication setting information to the tag 12 through the IC tag reader/writer 311. At step S522, the tag 12 stores the communication setting information received at step S521.

As step S523, the user puts the tag 12 having the communication setting information stored therein very close to the IC tag reader/writer 521 of the data playback terminal apparatus 502. The IC tag reader/writer 521 receives the communication setting information stored in the tag 12 from the tag 12.

At step S524, the data playback terminal apparatus 502 stores the communication setting information received at step S523, and step S525, performs communication setting for performing wireless communication of the IEEE 802.11 standard with the playback data server 531 based on communication group formation information included in the communication setting information.

At step S526, the data playback terminal apparatus 502 performs wireless communication of the IEEE 802.11 standard with the playback data server 531 based on the communication setting performed at step S205 to acquire contents data from the playback data server 531.

At step S527, the data playback terminal apparatus 502 plays back the contents acquired from the playback data server 531 for allowing the user to view and listen to them.

The above setting may be possible.

Figure 30:
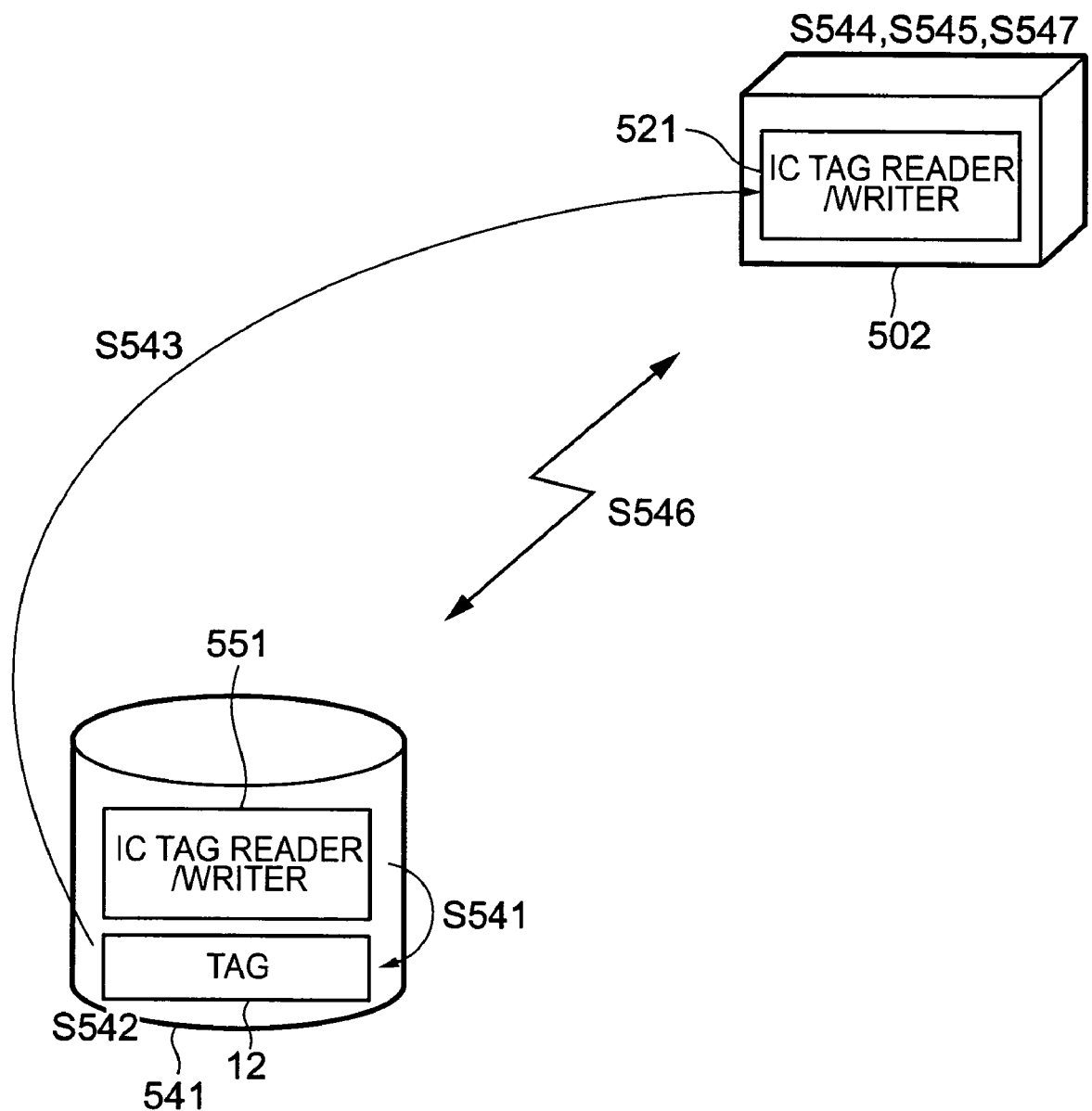
FIG. 30 is a diagram showing the configuration of a communication system in an embodiment to which the present invention is applied.

In addition, FIG. 30 shows an example of a communication system different from those in FIGS. 27 and 29. In FIG. 30, the tag 12 is contained in a playback data server 541.

In the following, the outlines of the communication system in FIG. 30 are described. At step S541, the playback data server 541 transmits communication setting information to the tag 12 through the IC tag reader/writer 551. At step S542, the tag 12 stores the communication setting information received at step S541.

At step S543, a user puts the data playback terminal apparatus 502 very close to the tag 12 contained in the playback data server 541. The IC tag reader/writer 521 of the data playback terminal apparatus 502 acquires the communication setting information stored in the tag 12 from the tag 12.

At step S544, the data playback terminal apparatus 502 stores the communication setting information received at step S543, and at step S545, performs communication setting for performing wireless communication of the IEEE 802.11 standard with the playback data server 541 based on communication group formation information included in the communication setting information.

At step S546, the data playback terminal apparatus 502 performs wireless communication of the IEEE 802.11 standard with the playback data server 541 based on the communication setting performed at step S545 to acquire the contents data from the playback data server 531.

At step S547, the data playback terminal apparatus 502 reproduces the contents acquired from the playback data server 531 for allowing the user to view and listen to them.

The above setting may be possible.

Figure 31:
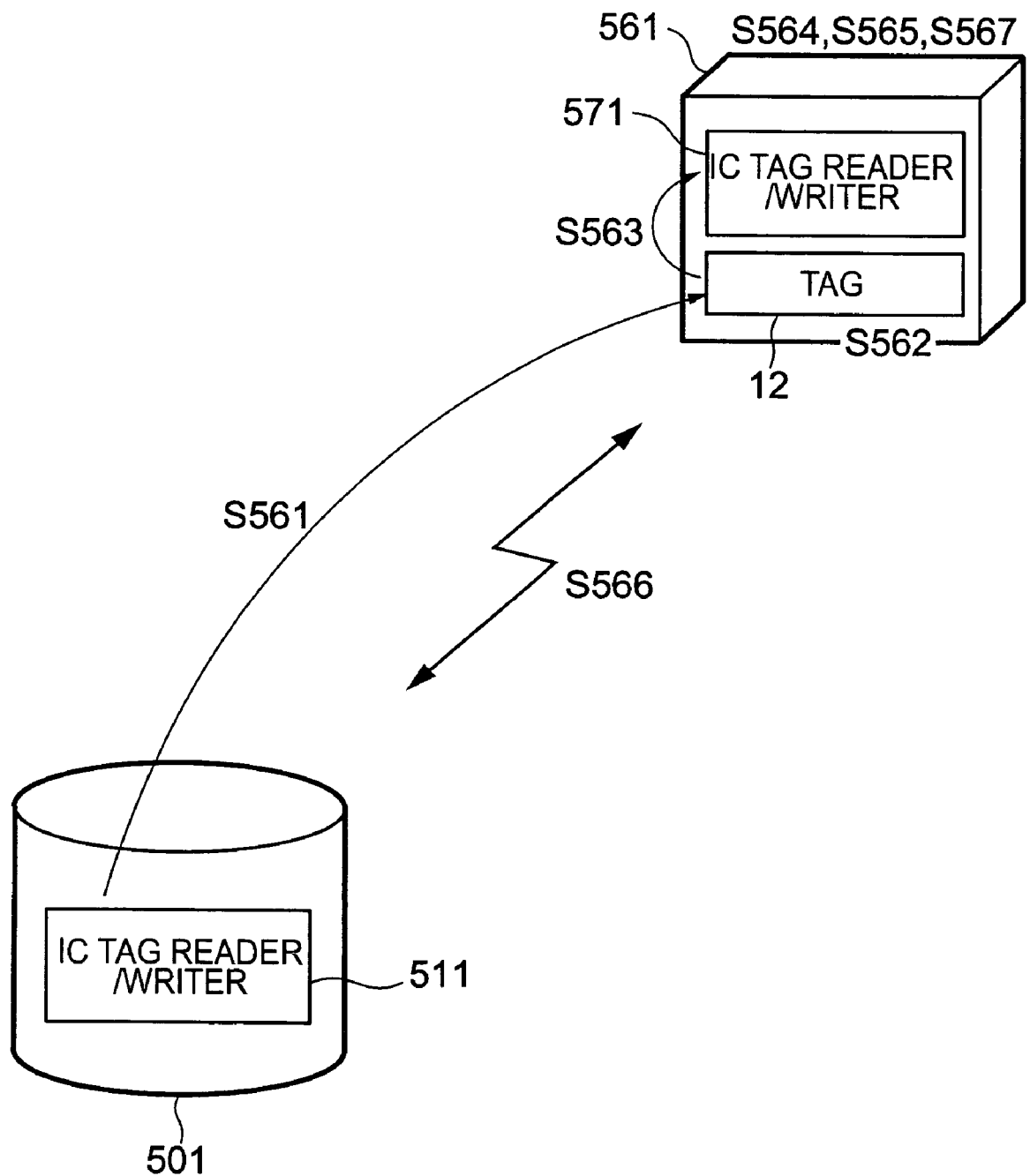
FIG. 31 is another diagram showing the configuration of a communication system in an embodiment to which the present invention is applied.

In addition, FIG. 31 shows an example of a communication system different from those in FIGS. 27, 29, and 30. At step S561 in FIG. 31, a user puts a data reproduction terminal apparatus 562 very close to the IC tag reader/writer 511 of the playback data server 501. The playback data server 501 transmits communication setting information to the tag 12 contained in the data playback terminal apparatus 561 through the IC tag reader/writer 511. At step S562, the tag 12 stores the communication setting information received at step S561.

At step S563, an IC tag reader/writer 571 of the data playback terminal apparatus 561 acquires the communication setting information stored in the tag 12 from the tag 12.

At step S564, the data playback terminal apparatus 561 stores the communication setting information received at step S563, and at step S565, performs communication setting for performing wireless communication of the IEEE 802.11 standard with the playback data server 501 based on communication group formation information included in the communication setting information.

At step S566, the data playback terminal apparatus 561 performs wireless communication of the IEEE 802.11 standard with the playback data server 501 based on the communication setting performed at step S565 to acquire the contents data from the playback data server 531.

At step S567, the data playback terminal apparatus 561 reproduces the contents acquired from the playback data server 501 for allowing the user to view and listen to them.

The above setting may be possible.

Figure 32:
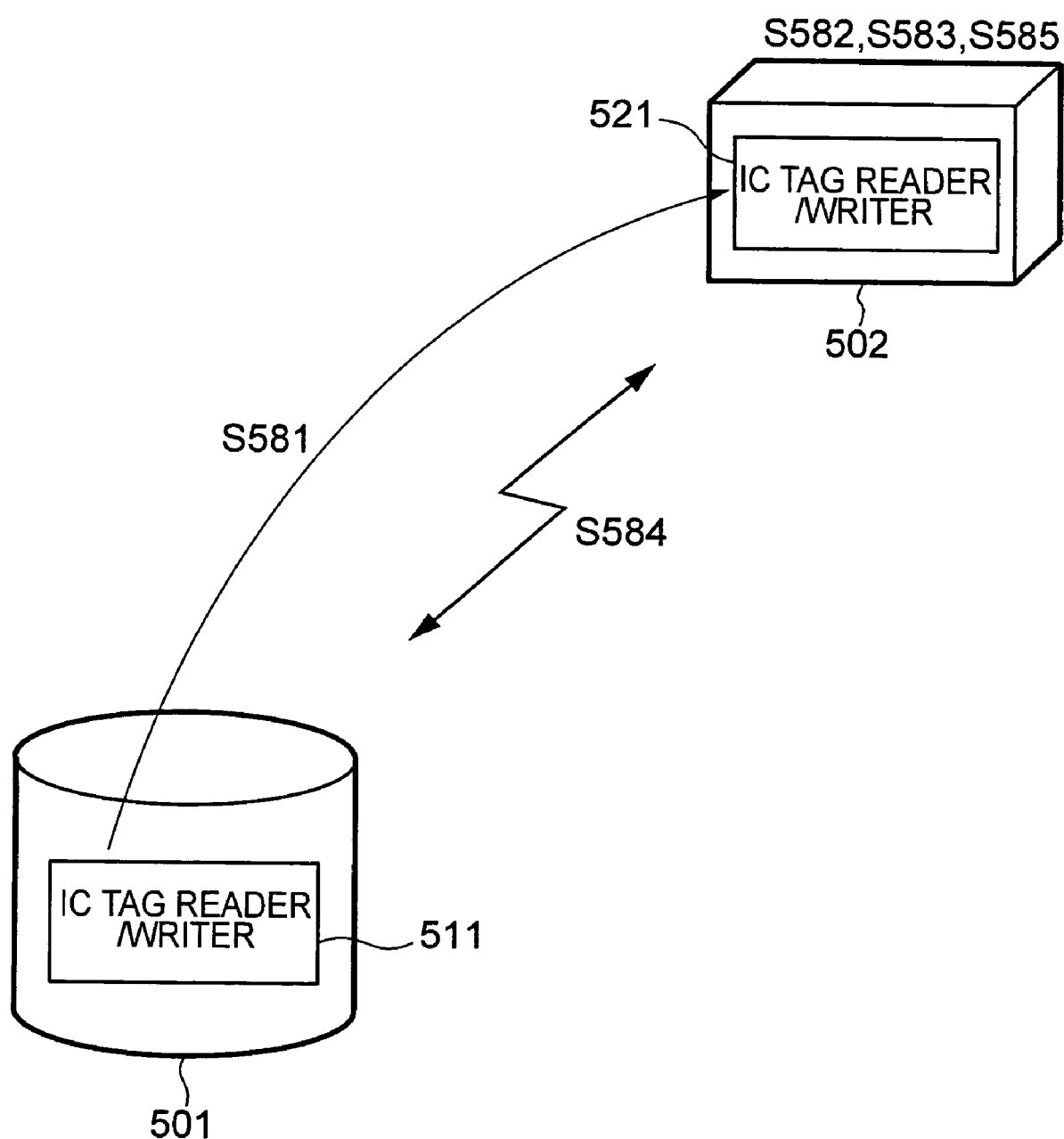
FIG. 32 is still another diagram showing the configuration of a communication system in an embodiment to which the present invention is applied.

In addition, FIG. 32 shows an example of a communication system different from those in FIGS. 27, and 29 to 31. In FIG. 32, the tag 12 is not used, and the data playback terminal apparatus 502 directly acquires communication setting information from the playback data server 501. The IC tag reader/writer 511 and the IC tag reader/writer 521 can directly perform communication and transmit/receive data.

In the following, the outlines of the communication system in FIG. 32 are described. At step S581, a user puts the data playback terminal apparatus 502 very close to the IC tag reader/writer 511 of the playback data server 501. The playback data server 501 transmits communication setting information to the IC tag reader/writer 521 contained in the data playback terminal apparatus 502 through the IC tag reader/writer 511. At step S582, the data playback terminal apparatus 502 stores the communication setting information received through the IC tag reader/writer 521 at step S581.

At step S583, the data playback terminal apparatus 502 performs communication setting for performing wireless communication of the IEEE 802.11 standard with the playback data server 501 based on communication group formation information included in the communication setting information.

At step S584, the data playback terminal apparatus 502 performs wireless communication of the IEEE 802.11 standard with the playback data server 501 based on the communication setting performed at step S583 to acquire the contents data from the playback data server 501.

At step S585, the data playback terminal apparatus 502 reproduces the contents acquired from the playback data server 501 for allowing the user to view and listen to them.

The above setting may be possible.

For example, when a terminal apparatus A is already performing communication with the access point 11 and another terminal apparatus B is going to perform communication with the terminal apparatus A, it is desirable in some cases to connect the terminal apparatus B to the access point 11 to perform communication between the terminal apparatus A and the terminal apparatus B via the access point 11 rather than to newly establish communication between the terminal apparatus A and the terminal apparatus B. Then, next, outlines of processing in such a case are described with reference to FIG. 33.

Figure 33:
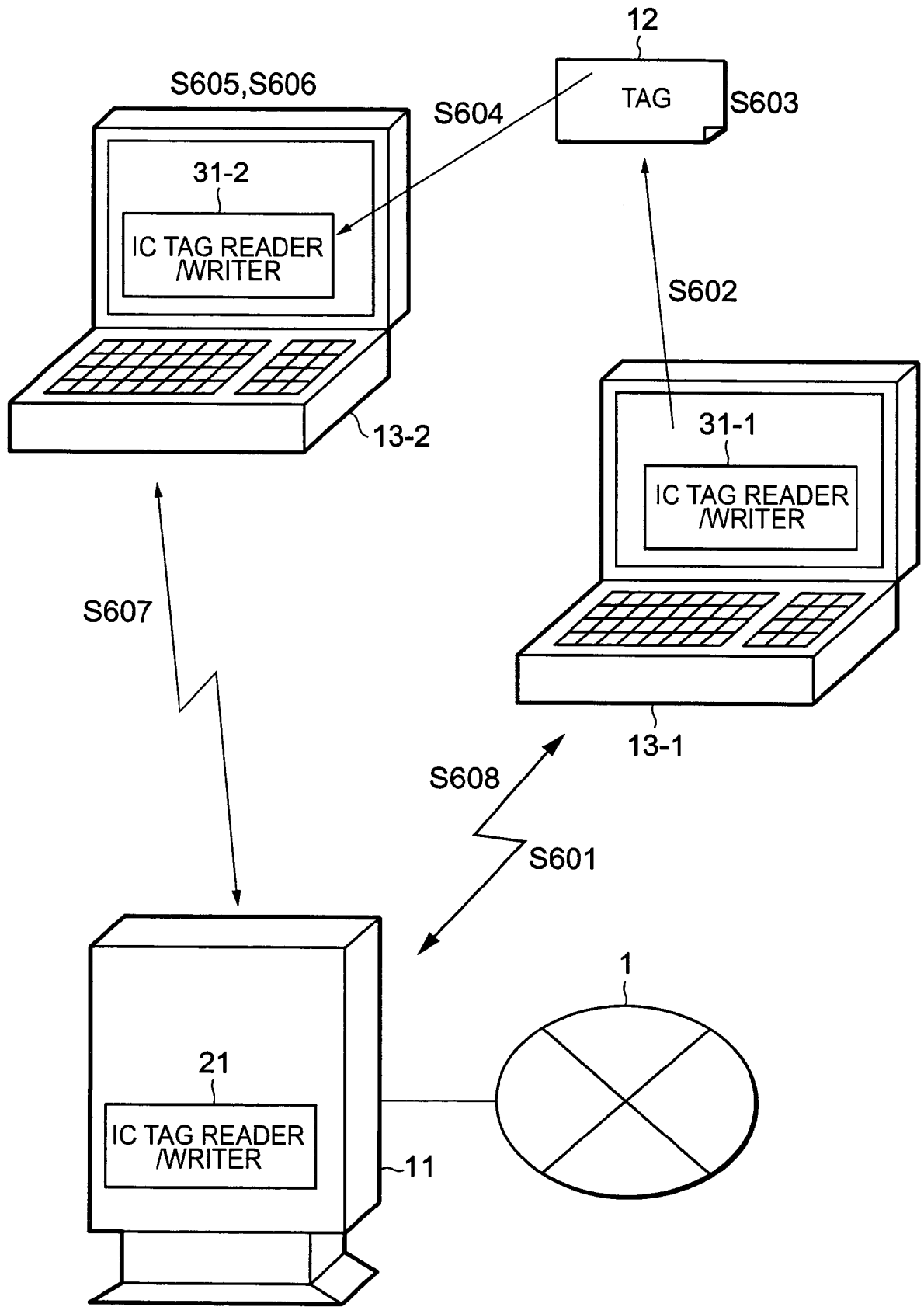
FIG. 33 is a diagram showing the configuration of a communication system in an embodiment to which the present invention is applied.

In FIG. 33, the terminal apparatus 13-1 is assumed to be an apparatus which has already established communication with the access point 11. In addition, the terminal apparatus 13-2 is an apparatus which is going to perform communication with the terminal apparatus 13-1 via the access point 11.

At step S601 in FIG. 33, the terminal apparatus 13-1 has established communication with the access point 11, and for example, is connected to the Internet 1 via the access point 11.

At step S602, a user puts the tag 12 close to the IC tag reader/writer 31-1 of the terminal apparatus 13-1. The tag reader/writer 31-1 of the terminal apparatus 13-1 performs contactless communication with the tag 12 at close range to transmit communication setting information to the tag 12. FIG. 34 shows an example of communication group formation information included in the communication setting information transmitted from the IC tag reader/writer 31-1 to the tag 12 at step S602.

Information shown in the first to fourth lines from the top in the communication group formation information in FIG. 34 are the same as the information shown in the first to fourth lines from the top in the communication group formation information in FIG. 2. The group formation information shown in FIG. 34 also includes a holding apparatus IP address as shown in the fifth line from the top. In the holding apparatus IP address, for example, an IP address of the terminal apparatus 13-1 required when the terminal apparatus 13-2 in FIG. 33 accesses the terminal apparatus 13-1 via the access point 11 is described. In FIG. 34, "12.34.56.78" is described as an example. At step S602 in FIG. 33, management conditions included in the communication setting information transmitted from the IC tag reader/writer 31-1 to the tag 12 are the same as the management conditions shown in FIG. 3.

Next, FIG. 35 shows a description example of the communication group formation information in the XML form included in the communication setting information transmitted from the IC tag reader/writer 31-1 to the tag 12 in step S602 in FIG. 33.

Descriptions shown in the first to sixth lines from the top of the description example shown in FIG. 35 are the same as the description examples in the first to sixth lines from the top of the communication group formation information in FIG. 10. In the description example shown in FIG. 35, <Ipaddress> 12.34.56.78. </Ipaddress> is newly inserted between the fifth and sixth lines from the top in the description example shown in FIG. 10. This <IPaddress> 12.34.56.78</IPaddress> corresponds to the holding apparatus IP address in FIG. 34.

Returning to FIG. 33, at step S603, the tag 12 stores the communication setting information received at step S602. At step S604, the user puts the tag 12 close to the IC tag reader/writer 31-2 of the terminal apparatus 13-2. The IC tag reader/writer 31-2 receives the communication setting information from the tag 12. At step S605, the terminal apparatus 13-2 stores the communication setting information received at step S604.

At step S606, the terminal apparatus 13-2 performs communication setting for connecting the terminal apparatus 13-2 to the terminal apparatus 13-1 via the access point 11 based on the communication setting information stored at step S605.

At step S607, the terminal apparatus 13-2 performs communication with the access point 11 through wireless communication. In this event, the terminal apparatus 13-2 requests the access point 11 to transmit the IP address of the terminal apparatus 13-1 and to relay communication between the terminal apparatus 13-1 and the terminal apparatus 13-2.

The access point 11 establishes communication between the terminal apparatus 13-2 and the terminal apparatus 13-1 based on the IP address in accordance with the request from the terminal apparatus 13-2.

As described above, the terminal apparatus 13-2 is allowed to perform communication with the terminal apparatus 13-1 which has already established the communication with the access point 11.

Figure 36:
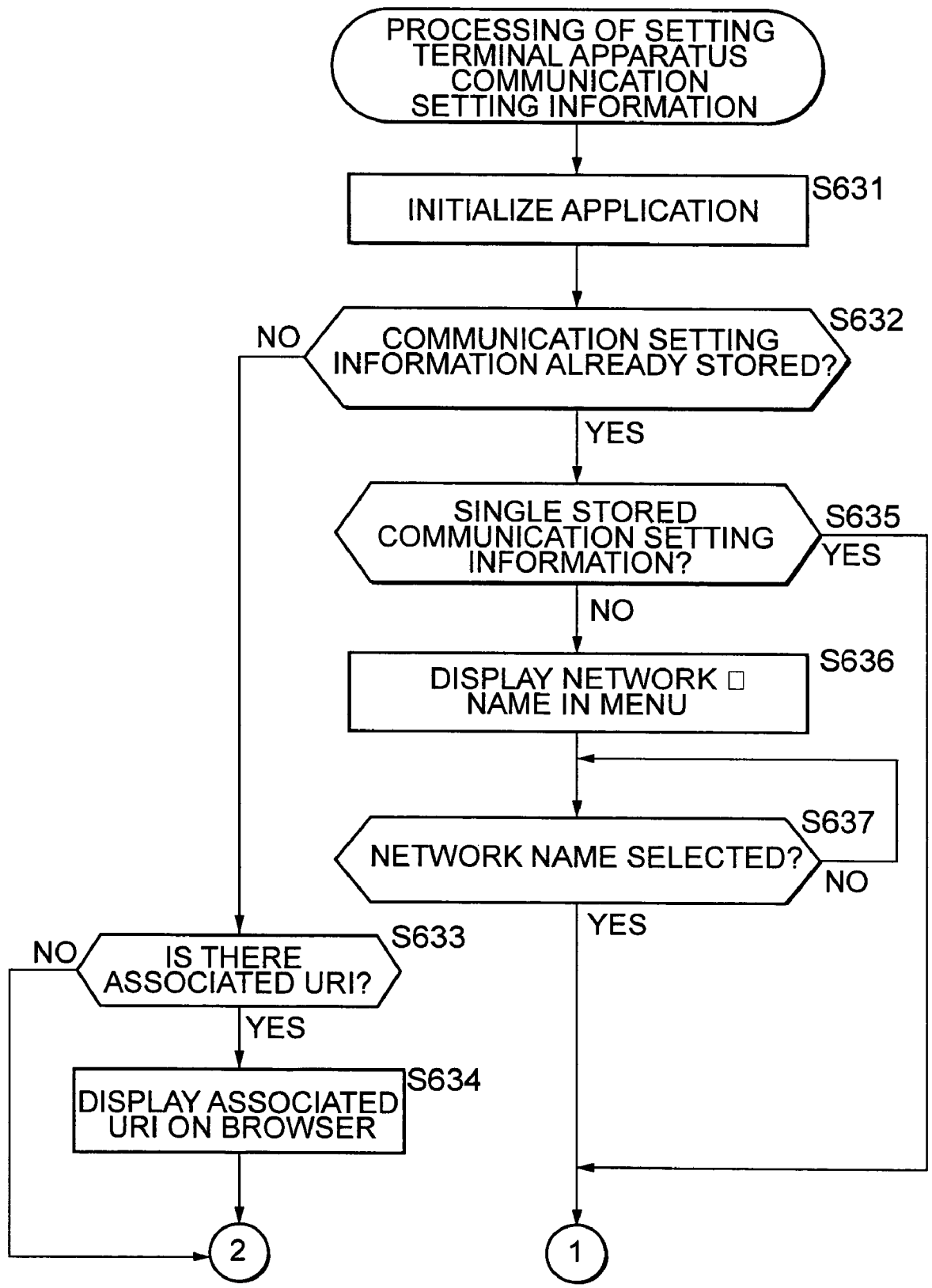
FIG. 36 is another flow chart for explaining communication setting information setting processing of the terminal apparatus.
Figure 37:
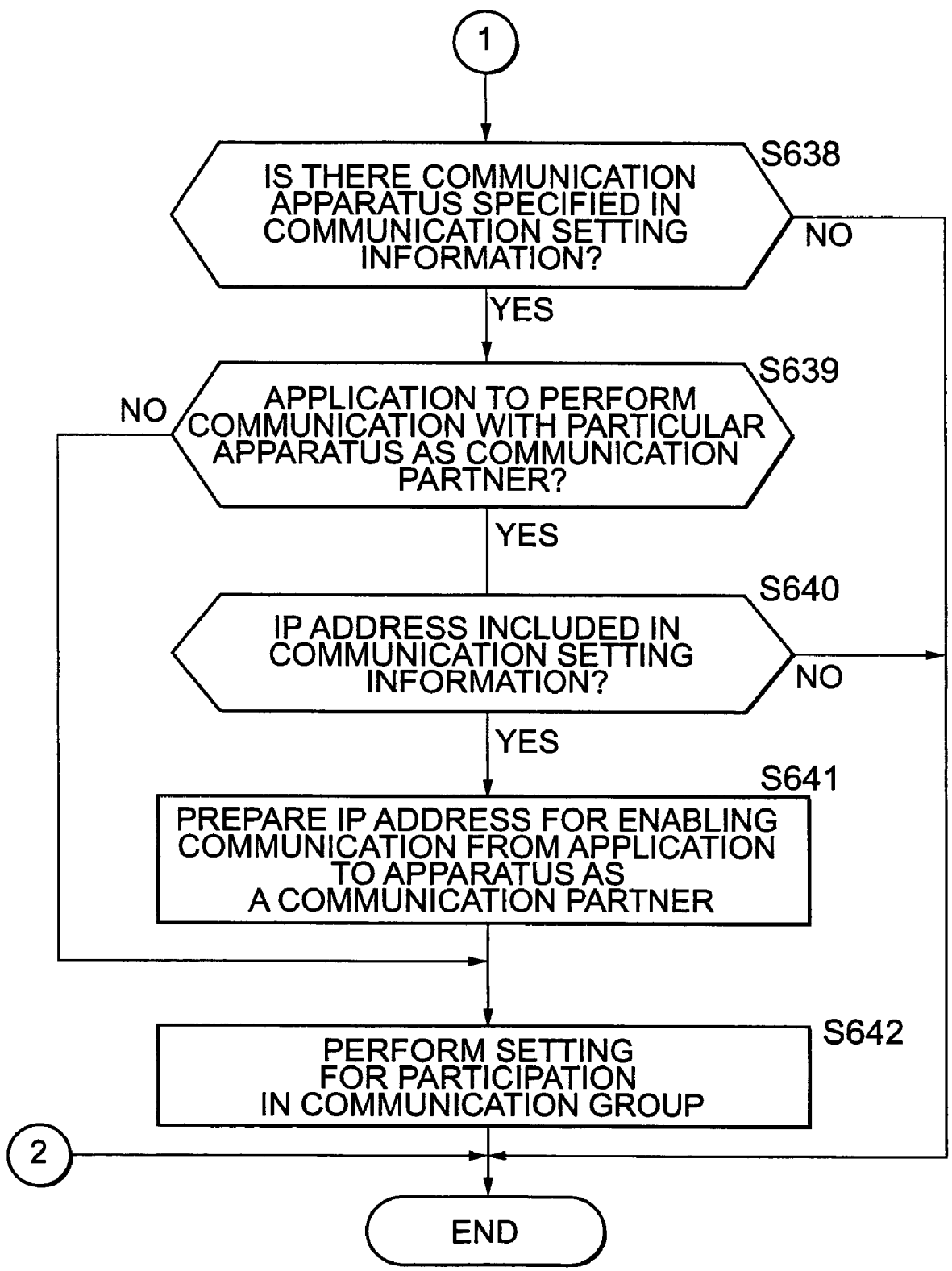
FIG. 37 is a flow chart for explaining the communication setting information setting processing of the terminal apparatus following FIG. 36.

Next, description is made for the processing at step S606 in FIG. 33, that is, the processing of setting the communication setting information of the terminal apparatus 13-2 with reference to flow charts in FIGS. 36 and 37.

At step S631, the CPU 201 of the terminal apparatus 13-2 receives a command for initializing application software, for example through the operation section 206, and initializes the specified application software.

At step S632, the CPU 201 of the terminal apparatus 13-2 accesses the storage section 209 to determine whether or not the communication setting information is stored in the storage section 209. When the communication setting information is not stored in the storage section 209, the processing proceeds to step S633. At step S633, the CPU 201 of the terminal apparatus 13-2 determines whether or not an associated URI is stored in the storage section 209. When the associated URI is stored, the processing proceeds to step S634 where the CPU 201 initializes a browser and displays the URI stored in the storage section 209 on the display 208.

Specifically, the communication setting information may not be supplied normally to the terminal apparatus 13-2 from the tag 12 depending on the distance between the tag 12 and the IC tag reader/writer 31 and how the tag 12 is put over the IC tag reader/writer 31. In such a case, the associated URI of the communication setting information may be supplied to the terminal apparatus 13-2 from the tag 12. In this case, the CPU 201 initializes the browser and displays the associated URI on the display 208.

Here, the associated URI is set to a customer service site which receives questions or complaints from users to automatically display the customer service site when the user cannot perform setting as he wishes in performing setting of wireless communication of the terminal apparatus 13-2 due to an inadequacy of the communication setting information. Thus, the user can ask questions about the setting of communication and the like in the customer service site displayed on the display 208.

The processing at step S633 and step S634 is processing when the terminal apparatus 13-2 can be previously connected to the Internet 1 via the access point 11. When the terminal apparatus 13-2 cannot be connected to the Internet 1 via the access point 11, the CPU 201 ends the processing without performing the processing at step S633 and step S634.

At step S632, when the CPU 201 determines that the communication setting information is stored in the storage section 209, the processing proceeds to step S635. At step S635, the CPU 201 determines whether or not one or more pieces of the communication setting information are stored in the storage section 209. When the communication setting information stored in the storage section 209 is not one piece, that is, when a plurality of pieces of the communication setting information are stored in the storage section 209, the processing proceeds to step S636.

At step S636, the CPU 201 reads a network name from the plurality of pieces of the communication setting information stored in the storage section 209, displays the list of network names on the display 208, and receives a selection of the network name from the user. At step S637, the CPU 201 waits until one network name is selected from the list of the network names. When the user selects the network name through the operation section 206, the processing proceeds to step S638 in FIG. 37.

At step S635, when the CPU 201 determines that the communication setting information stored in the storage section 209 is one piece, the processing at step S636 and step S637 is skipped and the processing proceeds to step S638.

At step S638, the CPU 201 determines whether or not the terminal apparatus 13 has a communication apparatus specified in the communication setting information. Specifically, for example as shown in the tags of <IEEE802.11a> in the third line from the top and </IEEE802.11a> in the sixth line from the top in the communication group formation information shown in FIG. 35, the communication setting information defines the type of wireless communication. Then, the CPU 201 determines whether or not the wireless communication section 210 can perform wireless communication of the type defined in the communication group formation information.

As a result, when the CPU 201 determines that a communication apparatus specified in the communication setting information is not possessed, the CPU 201 ends the series of processing shown in FIGS. 36 and 37. At step S638, when the CPU 201 determines that a communication apparatus specified in the communication setting information is possessed, the processing proceeds to step S639 where the CPU 201 determines whether or not the application initialized at step S631 performs communication with a particular apparatus as a communication partner, and when the CPU 201 determines that the application performs communication with a particular apparatus as a communication partner, the processing proceeds to step S640.

At step S640, the CPU 201 reads the communication group formation information included in the communication setting information and determines whether or not the IP address of a communication partner (the terminal apparatus 13-1) is included in the communication group formation information. When the IP address of the communication partner is included in the communication group formation information, the processing proceeds to step S641. At step S640, the CPU 201 determines that the IP address of the communication partner is not included in the communication group formation information, the CPU 201 ends the series of the processing shown in FIGS. 36 and 37.

At step S641, the CPU 201 reads the IP address of the communication partner from the communication group formation information, and sets the IP address such that communication can be performed with the communication partner (the terminal apparatus 13-1) by the application software initialized at step S631.

At step S642, the CPU 201 performs setting such that communication can be performed with the communication partner (the terminal apparatus 13-1) based on the communication group formation information. Thereafter, the terminal apparatus 13-2 is allowed to perform communication with the communication partner (the terminal apparatus 13-1) with the setting performed here.

As described above, the terminal apparatus 13 performs setting of wireless communication based on the acquired communication setting information.

In the above description, the communication setting information is supplied from the apparatus on the supply side of the communication setting information to the apparatus on the receiving side through the tag 12 or the direct communication between the IC tag reader/writers. However, it goes without saying that the communication setting information can be transmitted and received through infrared communication in the present invention. In the following, description is made for an example where the communication setting information is transmitted and received when the infrared communication is used.

Figure 38:
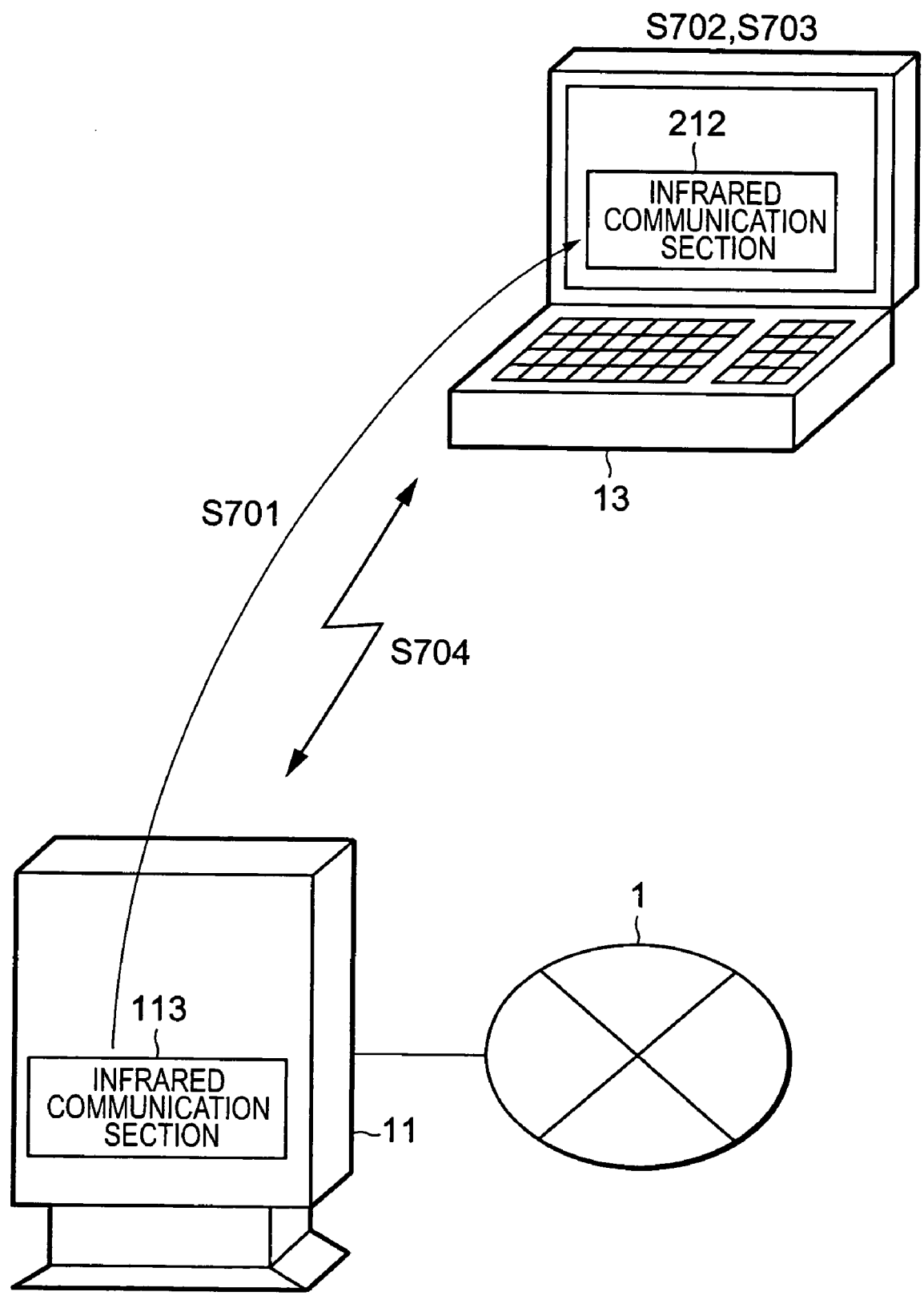
FIG. 38 is a diagram showing the configuration of a communication system in an embodiment to which the present invention is applied.

FIG. 38 shows an example where the communication setting information is transmitted from the access point 11 to the setting terminal 13 through infrared communication. At step S701 in FIG. 38, the access point 11 transmits the communication setting information from an infrared communication section 113 to an infrared communication section 212 of the terminal apparatus 13. FIG. 39 shows a description example of communication group formation information included in the communication setting information transmitted from the infrared communication section 113 of the access point 11 to the infrared communication section 212 of the terminal apparatus 13.

In FIG. 39, the tag of <accessPoint> in the first line from the top and the tag of </accessPoint> in the seventh line from the top indicate the connection with the access point (the Infrastructure mode). In FIG. 39, a network name is described between the tags of <title> and </title> in the second line from the top. In FIG. 39, "local-net" is described as the network name. In FIG. 39, the tag of <802.11b> in the third line from the top and the tag of </802.11b> in the sixth line from the top show that the communication group formation information relates to the IEEE 802.11b scheme communication. In FIG. 39, an SSID is described between the tags of <essid> and </essid> in the fourth line from the top. In FIG. 39, "0000" is described as the SSID. In FIG. 39, a WEP key is described between the tags of <wepkey> and </wepkey> in the fifth line from the top. In FIG. 39, "sample" is described as the WEP key.

Returning to FIG. 38, when the terminal apparatus 13 receives the communication setting information from the access point 11, it stores the received communication setting information at step S702, and at step S703, performs communication setting for performing wireless communication of the IEEE 802.11 scheme with the access point 11 based on the communication group formation information included in the communication setting information.

At step S704, the terminal apparatus 13 performs wireless communication of the IEEE 802.11 scheme with the access point 11 based on the communication setting performed at step S703.

Figure 40:
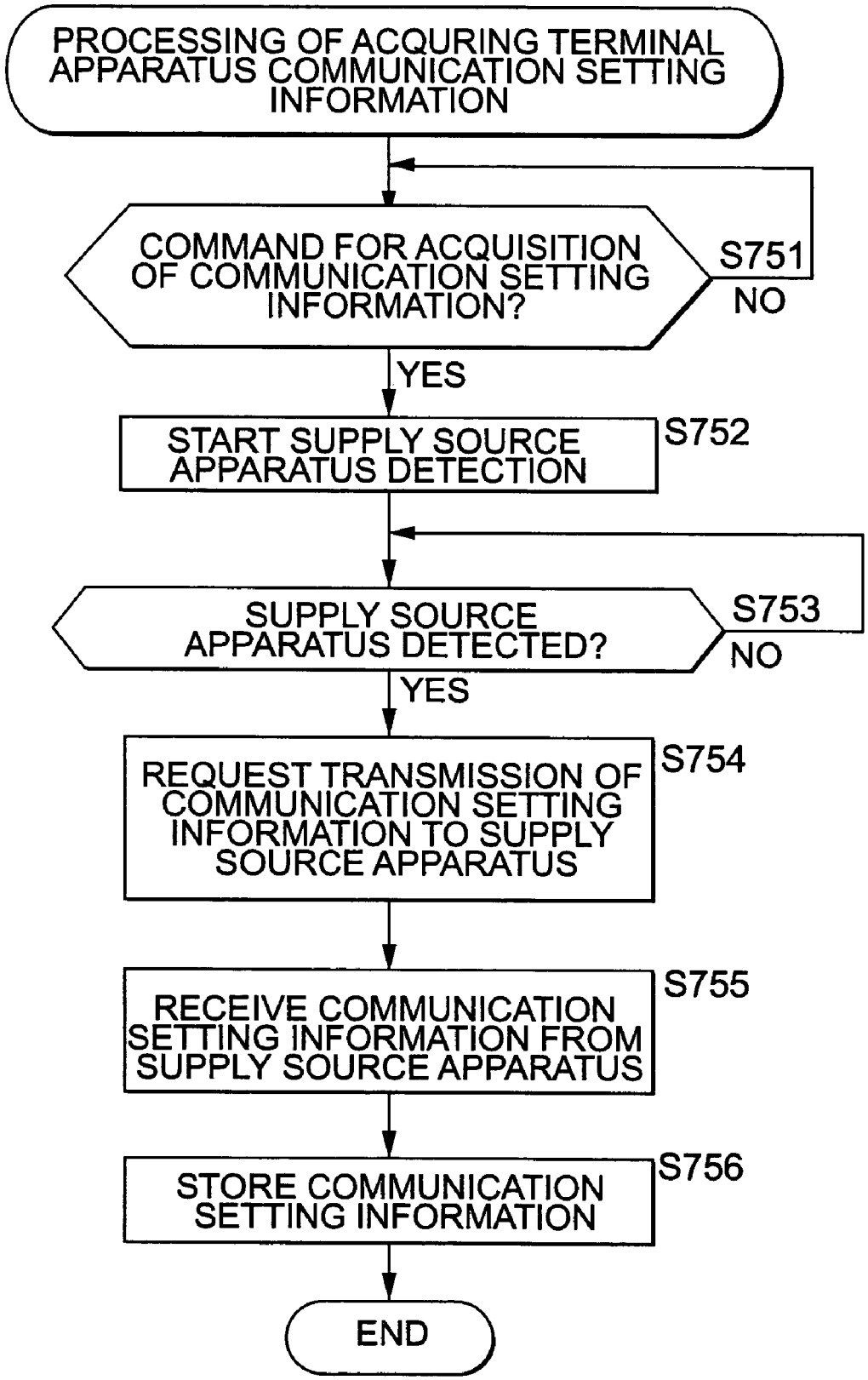
FIG. 40 is a flow chart for explaining communication setting information acquiring processing of the terminal apparatus.
Figure 41:
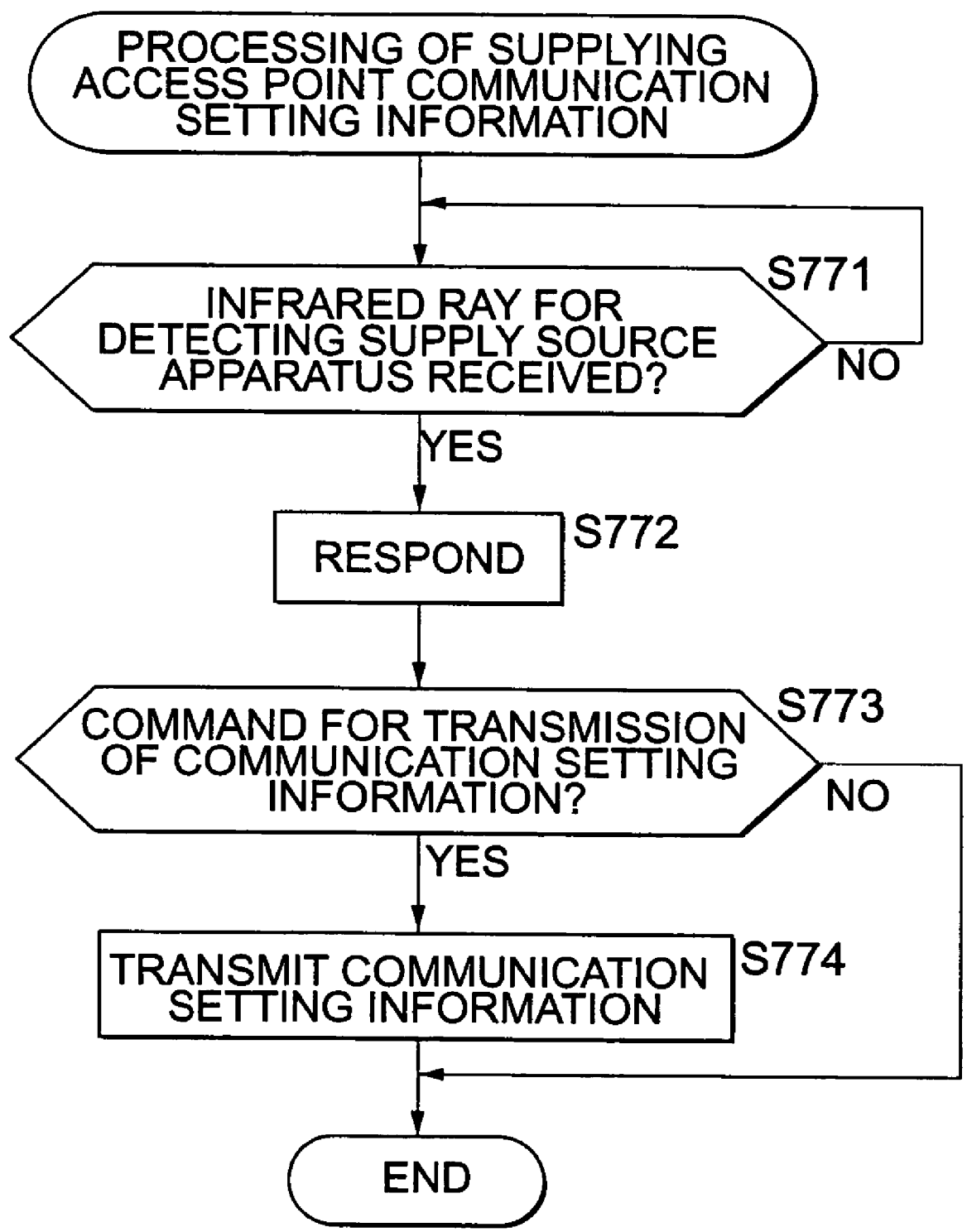
FIG. 41 is a flow chart for explaining communication setting information supply processing of the access point.

As described above, the communication setting information may be supplied from the access point 11 to the terminal apparatus 13 through the infrared communication. Next, description is made for the processing at step S701 in FIG. 38, that is, the processing of transmitting the communication setting information from the access point 11 to the terminal apparatus 13 with reference to flow charts in FIGS. 40 and 41. FIG. 40 shows the processing of acquiring the communication setting information of the terminal apparatus 13 from the access point 11, and FIG. 41 shows the processing of supplying the communication setting information of the access point 11 to the terminal apparatus 13.

The terminal apparatus 13-1 starts detection of the supply source of the communication group formation information, for example when a predetermined button forming the operation section 206 is pressed to input a command for acquiring the communication group formation information. Then, at step S751 in FIG. 40, the CPU 201 of the terminal apparatus 13 determines whether or not the predetermined button of the operation section 206 is pressed to command acquisition of the communication group formation information. The processing at step S751 is repeatedly performed to wait until the predetermined button of the operation section 206 is pressed to command transmission of the communication group formation information.

When a user presses the predetermined button of the operation section 206, the CPU 201 of the terminal apparatus 13 determines that the predetermined button of the operation section 206 is pressed to command acquisition of the communication group formation information at step S751, and the processing proceeds to step S752.

At step S752, the CPU 201 of the terminal apparatus 13 instructs the infrared communication section 212 to start detection of the supply source of the communication group formation information. At step S753, the CPU 201 of the terminal apparatus 13 continues monitoring of the infrared communication section 212 and waits until it receives a notification of detection of the supply source of the communication group formation information from the infrared communication section 212.

At this point, the CPU 101 of the access point 11 waits until it receives the infrared rays for detecting the supply source of the communication group formation information at step S771 in FIG. 41, and after reception of the infrared rays for detecting the supply source of the communication group formation information, the processing proceeds to step S772 where it transmits a response signal through the infrared communication section 113.

Upon reception of the response signal from the access point 11 through the infrared communication section 212, the CPU 201 of the terminal apparatus 13 determines that the notification of detection of the supply source of the communication group formation information is received at step S753, and the processing proceeds to step S754. At step S754, the CPU 201 of the terminal apparatus 13 transmits a signal for requesting the communication setting information to the access point 11 from the infrared communication section 212.

In this event, the CPU 101 of the access point 11 receives the request from the terminal apparatus 13, and at step S773, determines that a command for transmitting the communication setting information is received, and the processing proceeds to step S774. At step S774, the CPU 101 of the access point 11 reads the communication setting information from the storage section 109 and transmits it to the infrared communication section 212 of the terminal apparatus 13 through the infrared communication section 113.

At step S755, the CPU 201 of the terminal apparatus 13 receives the communication setting information transmitted at step S774 by the access point 11 through the infrared communication section 212, and at step S756, stores the communication setting information received at step S755 in the storage section 209.

When the CPU 101 of the access point 11 determines at step S773 that a command for transmitting the communication setting information is not received, the CPU 101 ends the series of processing.

As described above, the communication setting information is supplied from the access point 11 to the terminal apparatus 13 through the infrared communication.

Figure 42:
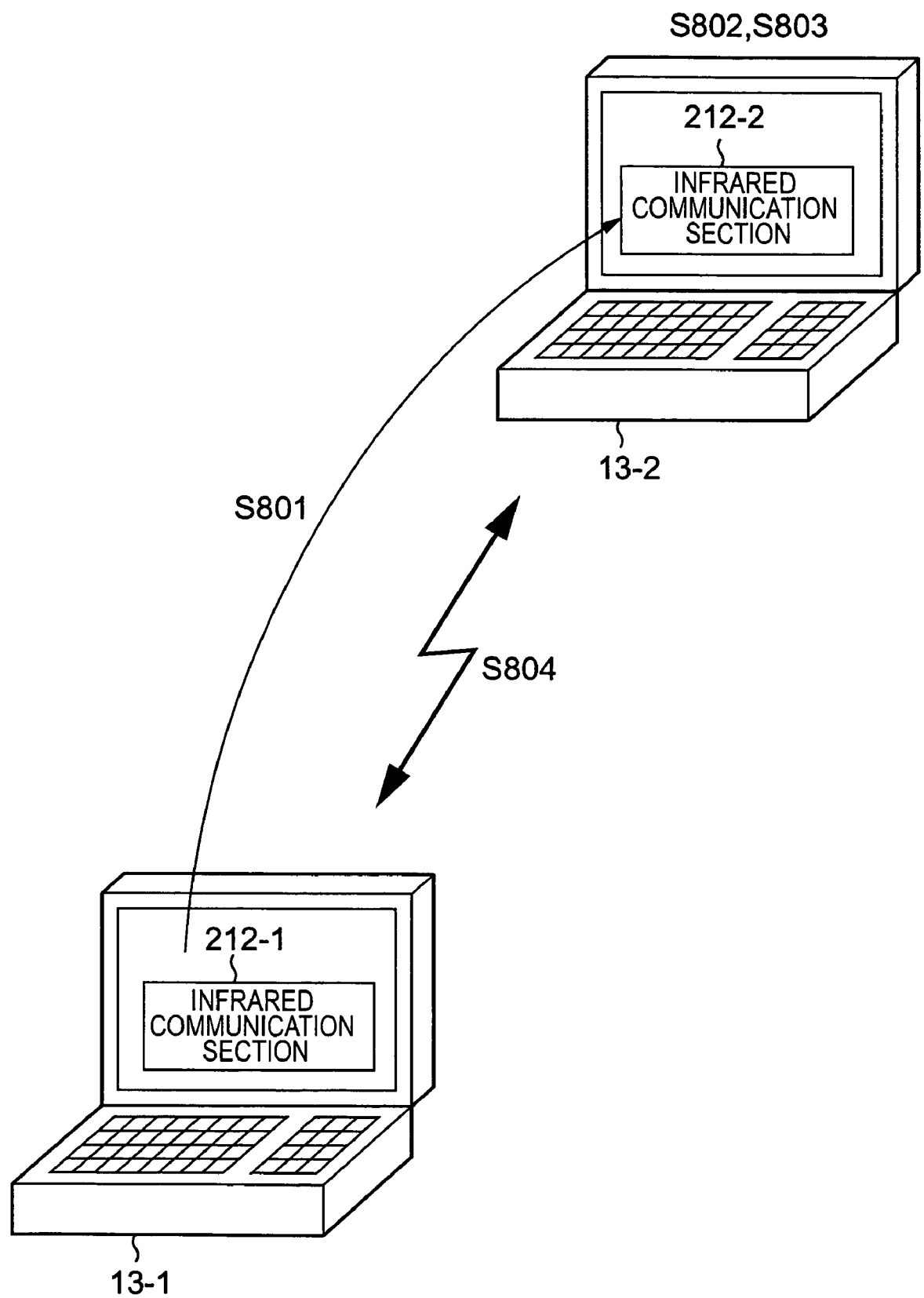
FIG. 42 is a diagram showing the configuration of a communication system in an embodiment to which the present invention is applied.

In the aforementioned description, the example of transmission and reception of the communication setting information through the infrared communication has been described in the Infrastructure mode. However, the transmission and reception of the communication setting information through the infrared communication can be applied to the Ad hoc mode. FIG. 42 shows an example of transmission and reception of communication setting information through infrared communication in the Ad hoc mode. In the following description, description is made for a terminal apparatus 13-1 and a terminal apparatus 13-2 to separately identify two terminal apparatuses. In addition, components within the terminal apparatus 13-1 are designated with "-1" as "an infrared communication section 212-1," for example, and components within the terminal apparatus 13-2 are designated with "-2" as "an infrared communication section 212-2," for example, to distinguish between them.

At step S801 in FIG. 42, a CPU 201-1 of the terminal apparatus 13-1 transmits communication setting information to an infrared communication section 212-2 contained in the terminal apparatus 13-2 through an infrared communication section 212-1. FIG. 43 shows a description example of communication group formation information included in the communication setting information transmitted from the infrared communication section 212-1 of the setting terminal apparatus 13-1.

In FIG. 43, the tag of <localNetwork> in the first line from the top and the tag of </localNetwork> in the seventh line from the top indicate the Ad hoc mode. In FIG. 43, a network name is described between the tags of <title> and </title> in the second line from the top. In FIG. 43, "local-net" is described as the network name. In FIG. 43, the tag of <802.11b> in the third line from the top and the tag of </802.11b> in the sixth line from the top show that the communication group formation information relates to the IEEE 802.11b scheme communication. In FIG. 43, an SSID is described between the tags of <essid> and </essid> in the fourth line from the top. In FIG. 43, "0000" is described as the SSID. In FIG. 43, a WEP key is described between the tags of <wepkey> and </wepkey> in the fifth line from the top. In FIG. 43, "sample" is described as the WEP key.

At step S802, the CPU 201-2 of the terminal apparatus 13-2 stores the communication setting information received through the infrared communication section 212-2 at step S801 in a storage section 209-2.

At step S803, the CPU 201-2 of the terminal apparatus 13-2 reads the communication setting information stored in the storage section 209-2 at step S802 and performs communication setting for performing wireless communication of the IEEE 802.11 standard with the terminal apparatus 13-1 based on communication group formation information included in the communication setting information.

At step S804, the CPU 201-2 of the terminal apparatus 13-2 performs wireless communication of the IEEE 802.11 standard with the terminal apparatus 13-1 based on the communication setting performed at step S803.

The outlines of the processing when the terminal apparatus 13-1 is already performing communication with the access point 11 and the other terminal apparatus 13-2 is going to perform communication with the terminal apparatus 13-1 via the access point 11 has already been described with reference to FIG. 33. In this case, similarly, the communication setting information can be transmitted from the terminal apparatus 13-1 to the terminal apparatus 13-2 without using the tag 12. Next, an example in such a case is described with reference to FIG. 44.

Figure 44:
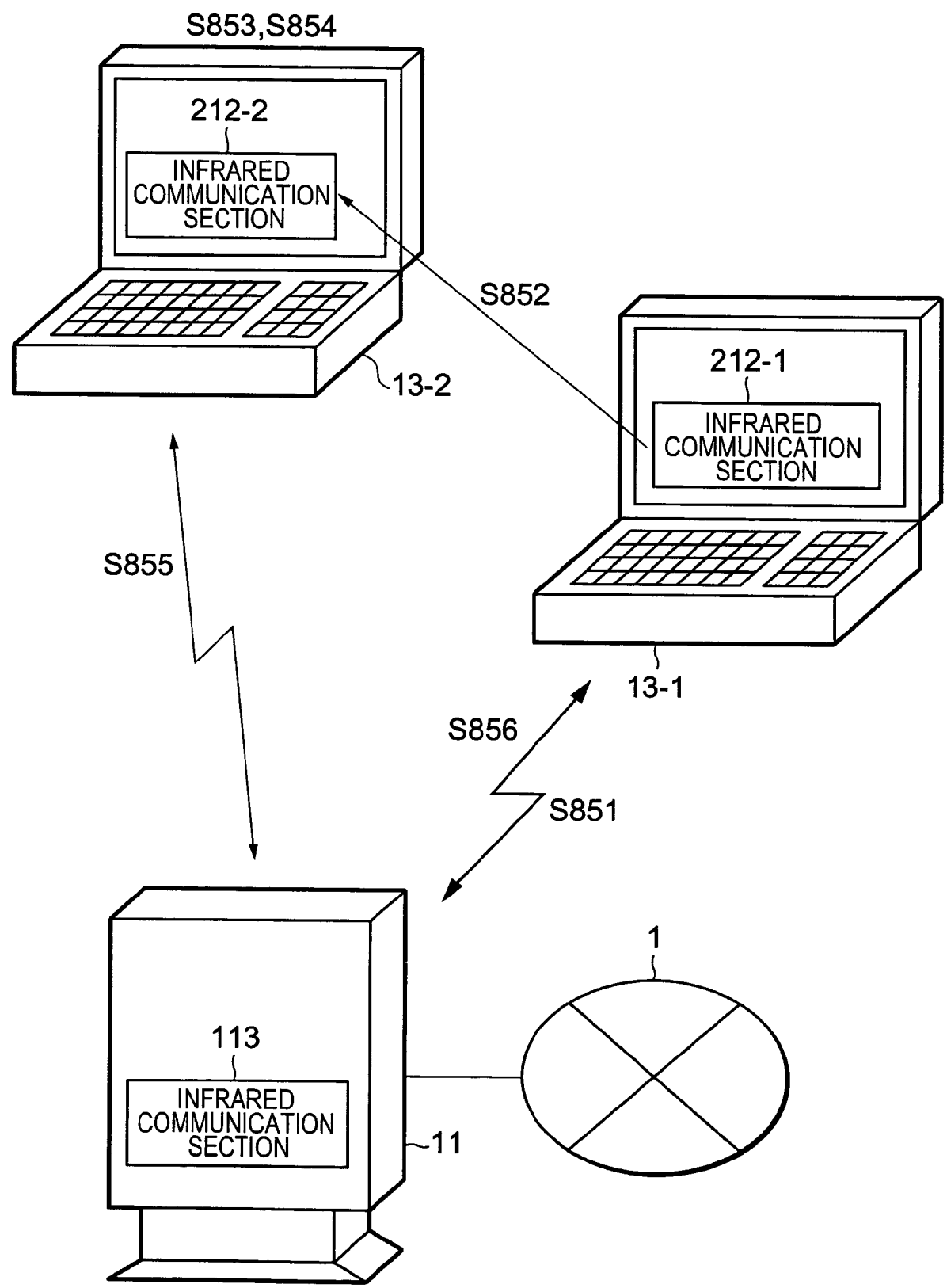
FIG. 44 is a diagram showing the configuration of a communication system in an embodiment to which the present invention is applied.

In FIG. 44, the terminal apparatus 13-1 is assumed to be an apparatus which has already established communication with the access point 11. The terminal apparatus 13-2 is assumed to be an apparatus which is going to perform communication with the terminal apparatus 13-1 via the access point 11.

At step S851 in FIG. 44, the terminal apparatus 13-1 has established communication with the access point 11 and is connected to the Internet 1 via the access point 11, for example.

In this state, when a user of the terminal apparatus 13-2 wishes to perform communication with the terminal apparatus 13-1, the user operates the operation section 206-2 of the terminal apparatus 13-2 to command establishment of communication with the terminal apparatus 13-1. The CPU 201-2 of the terminal apparatus 13-2 receives the input of the command and requests communication setting information from the infrared communication section 212-2 to the terminal apparatus 13-1. When the CPU 201-1 of the terminal apparatus 13-1 receives the request from the terminal apparatus 13-2 thorough the infrared communication section 212-1, it transmits communication setting information from the infrared communication section 212-1 to the terminal apparatus 13-2 at step S852. Communication group formation information included in the communication setting information transmitted at step S852 is similar to that shown in FIGS. 34 and 35. In addition, management conditions included in the communication setting information transmitted at step S852 are similar to the management conditions shown in FIG. 3.

The CPU 201-2 of the terminal apparatus 13-2 receives the communication setting information transmitted from the terminal apparatus 13-1 at step S852 thorough the infrared communication section 212-2, and step S853, stores the received communication setting information in the storage section 209-2.

At step S854, the CPU 201-2 of the terminal apparatus 13-2 reads the communication setting information stored at step S853 from the storage section 209-2 and performs communication setting for connecting the terminal apparatus 13-2 with the terminal apparatus 13-1 via the access point 11 based on the communication setting information.

At step S855, the CPU 201-2 of the terminal apparatus 13-2 performs communication with the access point 11 through wireless communication via the wireless communication section 210. In this event, the terminal apparatus 13-2 requests the access point 11 to transmit the IP address of the terminal apparatus 13-1 and to relay communication between the terminal apparatus 13-1 and the terminal apparatus 13-2.

The access point 11 accesses the terminal apparatus 13-1 based on the IP address at step S856 in accordance with the request from the terminal apparatus 13-2 and establishes communication between the terminal apparatus 13-2 and the terminal apparatus 13-1.

As described above, the terminal apparatus 13-2 is allowed to perform communication with the terminal apparatus 13-1 which has already established the communication with the access point 11.

While description has been made for the wireless communication of the IEEE 802.11 scheme as an example in the description in the specification, this does not mean that the present invention is limited to the wireless communication of the IEEE 802.11 scheme. The present invention can be applied to, for example Bluetooth wireless communication, not the wireless communication of the IEEE 802.11 scheme.

In addition, it goes without saying that the present invention is applied to another arbitrary wireless communication.

The aforementioned series of processing can be executed by hardware and can be executed by software. When the series of processing is executed by software, a program forming the software is installed to a computer (for example, CPUs 101, 201) incorporated in dedicated hardware, or, for example, to a general-purpose personal computer capable of performing various functions by installing various programs, from a program storage medium.

The program storage medium for storing the program installed in a computer and executable by the computer is formed of, for example, the magnetic disk 231 (including a flexible disk), the optical disk 232 (including a CD-ROM (Compact Disk-Read Only Memory), a DVD), the magneto-optical disk 233, or a package media consisting of the semiconductor memories 115, 234 or the like. The storing of the program to the program storage medium is performed through an interface such as a router and a modem, as required, by using a wired or wireless communication medium such as a local area network, the Internet, and digital satellite broadcasting.

In addition, in the specification, the steps for describing the program provided by the media include not only processing performed on the time series in accordance with the described order, but also processing which is not necessarily performed on the time series and performed in parallel or individually.

In the specification, the system refers to the whole apparatus formed of a plurality of apparatuses.

INDUSTRIAL AVAILABILITY

As described above, according to the present invention, communication between apparatuses can be established.

Also, according to the present invention, a user can easily and quickly perform communication setting without performing burdensome entry of the setting information. In addition, the user can understand more intuitively the communication setting being performed between the apparatuses. Furthermore, the user can perform communication setting between desired apparatuses without fail.

The invention claimed is:

1. A communication system comprising:
a first information processing apparatus holding communication setting information for establishing communication; and
a second information processing apparatus for acquiring the communication setting information from the first information processing apparatus and for establishing the communication with the second information processing apparatus,
wherein the first information processing apparatus comprises:
supply means for supplying the communication setting information to the second information processing apparatus; and
first communicating means for communicating with the second information processing apparatus;
wherein the second information processing apparatus comprises:
acquiring means for acquiring the communication setting information from the first information processing apparatus; and
second communicating means for communication with the first information processing apparatus based on the communication setting information acquired by the acquiring means;

wherein the communication setting information includes information indicating whether or not hold permission is granted, and also includes information indicating whether or not to supply the communication setting information of the second information processing apparatus to a third information processing apparatus, and wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

2. An information processing apparatus comprising:

supply means for supplying communication setting information for establishing communication to a second information processing apparatus; and first communicating means for communicating with the second information processing apparatus;

wherein the communication setting information includes information indicating whether or not hold permission is granted, and also includes information indicating whether or not to supply the communication setting information of the second information processing apparatus to a third information processing apparatus, wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

3. The information processing apparatus according to claim 2 wherein the first communicating means wirelessly communicates with the second information processing apparatus.

4. The information processing apparatus according to claim 2 further comorising:

a storage means for storing the communication setting information, wherein the supply means supplies the communication setting information stored by the storage means to the second information processing apparatus.

5. The information processing apparatus according to claim 2 wherein the supply means has a recording means for recording the communication setting information in a record medium; and the second information processing apparatus reads and uses the communication setting information from the record medium.

6. The information processing apparatus according to claim 5 wherein the record medium is a portable card.

7. The information processing apparatus according to claim 5 wherein the recording means records the communication setting information on the record medium by contactless communication.

8. The information processing apparatus according to claim 5 wherein the recording means records the communication setting information on the record medium by contacted communication.

9. The information processing apparatus according to claim 2 wherein the supply means has a second communicating means for performing contactless wireless communication with the second information processing apparatus; and the second communication means supplies the communication setting information to the second information processing apparatus through the contactless wireless communication.

10. The information processing apparatus according to claim 2 wherein the supply means has a second communicating means for performing infrared communication with the second information processing apparatus; and the second communication means supplies the communication setting information to the second information processing apparatus through the infrared communication.

11. The information processing apparatus according to claim 2 wherein the communication setting information includes information on an information validity term for limiting a period in which the second information processing apparatus which has acquired the communication setting information is permitted to hold the communication setting information.

12. The information processing apparatus according to claim 2 wherein the communication setting information includes information on a communication validity term for limiting a period in which the second information processing apparatus is permitted to carry out communication.

13. The information processing apparatus according to claim 2 wherein the communication setting information includes information on whether or not the already acquired communication setting information is to be updated to newly acquired communication setting information when the second information processing apparatus receives the newly acquired communication setting information.

14. The information processing apparatus according to claim 2 wherein the communication setting information includes an IP address of the third information processing apparatus for allowing the second information processing apparatus to perform communication with the third information processing apparatus through the information processing apparatus.

15. The information processing apparatus according to claim 2 wherein the first communicating means connects the second information processing apparatus to the Internet.

16. An information processing method comprising:

supplying communication setting information for establishing communication to a second information processing apparatus; and communicating with the second information processing apparatus, wherein the communication setting information includes information indicating whether or not hold permission is granted, and also includes information indicating whether or not to supply the communication setting information of the second information processing apparatus to a third information processing apparatus, wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

17. A record medium having a computer-readable program recorded thereon for executing a method comprising:
  supplying communication setting information for establishing communication to a second processing apparatus; and
  controlling communication with the second information processing apparatus,
  wherein the communication setting information includes information indicating whether or not hold permission is granted, and also includes information indicating whether or not to supply the communication setting information of the second information processing apparatus to a third information processing apparatus,
  wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

18. An information processing apparatus comprising:
  an acquiring means for acquiring communication setting information for establishing communication from a second information processing apparatus; and
  a first communicating means for communicating with the second information processing apparatus based on the communication setting information acquired by the acquiring means,
  wherein the communication setting information includes information indicating whether or not hold permission is granted, and also includes information indicating whether or not to supply the communication setting information of the information processing apparatus to a third information processing apparatus,
  wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

19. The information processing apparatus according to claim 18, wherein the first communicating means wirelessly communicates with the second information processing apparatus.

20. The information processing apparatus according to claim 18, wherein the acquiring means has a reading means for reading out the communication setting information from a record medium having the communication setting information recorded thereon by the second information processing apparatus.

21. The information processing apparatus according to claim 20 wherein the record medium is a portable card.

22. The information processing apparatus according to claim 20 wherein the reading means reads the communication setting information recorded on the record medium through contactless communication.

23. The information processing apparatus according to claim 20 wherein the reading means reads the communication setting information recorded on the record medium through contacted communication.

24. The information processing apparatus according to claim 20 further comprising a storage means for storing the communication setting information acquired by the acquiring means.

25. The information processing apparatus according to claim 24 further comprising a control means for deleting the communication setting information from the storage means, if information indicating whether or not to hold the communication setting information indicates that holding of the communication setting information is not permitted.

26. The information processing apparatus according to claim 24 wherein the communication setting information includes information on an information validity term for limiting a period in which the second information processing apparatus is permitted to hold the communication setting information; and
  further comprising a control means for deleting the communication setting information from the storage means, if the information validity term has elapsed.

27. The information processing apparatus according to claim 24 further comprising recording means for recording the communication setting information stored by the storage means in a recording medium; and
  wherein the communication setting information recorded on the recording medium by the recording means is read from a the third information processing apparatus.

28. The information processing apparatus according to claim 27 further comprising:
  a control means for performing control such that the recording means does not record the communication setting information on the recording medium, if information indicating whether or not to supply the communication setting information to the third information processing apparatus indicates that supply of the communication setting information is not permitted.

29. The information processing apparatus according to claim 18 wherein the communication setting information includes information on a communication validity term for limiting a period in which the information processing apparatus is permitted to perform the communication; and
  a control means is further provided for performing control such that the first communication means does not perform communication with the second information communication apparatus.

30. The information processing apparatus according to claim 18 wherein the communication setting information includes an IP address of the third information processing apparatus for allowing the information processing apparatus to communicate with the third information processing apparatus through the second information processing apparatus.

31. The information processing apparatus according to claim 18 wherein the acquiring means has a second communication means for performing contactless wireless communication with the second information processing apparatus; and
  the second communication means acquires the communication setting information from the second information processing apparatus through the contactless wireless communication.

32. The information processing apparatus according to claim 18 wherein the acquiring means has a second communication means for performing infrared communication with the second information processing apparatus; and
  the second communication means acquires the communication setting information from the second information processing apparatus through the infrared communication.

33. An information processing method comprising:
- acquiring communication setting information for establishing communication with a second information processing apparatus; and
- communicating with the other information processing apparatus based on the communication setting information,
- wherein the communication setting information includes information indicating whether or not hold permission is granted, and also includes information indicating whether or not to supply the communication setting information to a third information processing apparatus,
- wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

34. A record medium having a computer-readable program recorded thereon for executing a method comprising:
- acquiring communication setting information for establishing communication with a information processing apparatus; and
- controlling communication with the second information processing apparatus based on the communication setting information,
- wherein the communication setting information includes information indicating whether or not hold permission is granted, and also includes information indicating whether or not to supply the communication setting information to a third information processing apparatus,
- wherein hold permission being granted indicates that the second information processing apparatus can hold the communication setting information after setting its own communication settings based on the communication information and communication permission being denied indicates that the second information processing apparatus is to discard the communication setting information after setting its own communication settings based on the communication information.

* * * * *

UNITED STATES PATENT AND TRADEMARK OFFICE
CERTIFICATE OF CORRECTION

PATENT NO.       : 7,565,107 B2
APPLICATION NO.  : 10/512311
DATED            : July 21, 2009
INVENTOR(S)      : Yoriko Komatsuzaki et al.

It is certified that error appears in the above-identified patent and that said Letters Patent is hereby corrected as shown below:

On the title page, item (54), line 2, change "DEVICE," to --APPARATUS,--.

On the title page, item (74), line 2, change "Garett" to --Garrett--.

In claim 4, column 39, line 42, change "comorising:" to --comprising:--.

In claim 27, column 42, line 26, change "from a the" to --from the--.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,565,107 B2 | Page 1 of 1 |
| APPLICATION NO. | : 10/512311 | |
| DATED | : July 21, 2009 | |
| INVENTOR(S) | : Yoriko Komatsuzaki et al. | |

It is certified that error appears in the above-identified patent and that said Letters Patent is hereby corrected as shown below:

On the title page, item (54), line 2 and at column 1, line 2, in the title, change "DEVICE," to --APPARATUS,--.

On the title page, item (74), line 2, change "Garett" to --Garrett--.

In claim 4, column 39, line 42, change "comorising:" to --comprising:--.

In claim 27, column 42, line 26, change "from a the" to --from the--.

This certificate supersedes the Certificate of Correction issued December 15, 2009.

Signed and Sealed this

Twelfth Day of January, 2010

David J. Kappos
*Director of the United States Patent and Trademark Office*